US012700151B2

(12) United States Patent
Choi et al.

(10) Patent No.: US 12,700,151 B2
(45) Date of Patent: Aug. 4, 2026

(54) METHOD FOR DISPLAYING AN IMAGE AND ELECTRONIC DEVICE SUPPORTING THE SAME

(71) Applicant: Samsung Electronics Co., Ltd., Suwon-si (KR)

(72) Inventors: Yoonjung Choi, Suwon-si (KR); Kyuwon Kim, Suwon-si (KR); Jongkyu Kim, Suwon-si (KR); Yeunwook Lim, Suwon-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 229 days.

(21) Appl. No.: 18/593,427

(22) Filed: Mar. 1, 2024

(65) Prior Publication Data

US 2024/0290019 A1     Aug. 29, 2024

Related U.S. Application Data

(63) Continuation of application No. PCT/KR2024/002319, filed on Feb. 22, 2024.

(30) Foreign Application Priority Data

Feb. 28, 2023     (KR) ........................ 10-2023-0026649
Apr. 3, 2023     (KR) ........................ 10-2023-0043840

(51) Int. Cl.
*G06T 11/60*          (2026.01)
*G06T 5/50*          (2006.01)
(Continued)

(52) U.S. Cl.
CPC ................ *G06T 11/60* (2013.01); *G06T 5/50* (2013.01); *G06T 7/194* (2017.01); *G06T 11/40* (2013.01); *G06V 10/26* (2022.01); *G06T 2210/22* (2013.01)

(58) Field of Classification Search
None
See application file for complete search history.

(56) References Cited

U.S. PATENT DOCUMENTS 11,948,308 B2     4/2024    Choi
2005/0153746 A1*   7/2005    Yoon ...................... H04N 5/772
                                                              455/566

(Continued)

FOREIGN PATENT DOCUMENTS

CN          108205398 A       6/2018
KR          10-1303017        9/2013
(Continued)

OTHER PUBLICATIONS

Search Report and Written Opinion dated May 28, 2024 issued in International Patent Application No. PCT/KR2024/002319.

*Primary Examiner* — Tapas Mazumder
(74) *Attorney, Agent, or Firm* — NIXON & VANDERHYE P.C.

(57) ABSTRACT

Disclosed are a method of displaying an image (for example, wallpaper) on a display and an electronic device supporting the same. The electronic device may include a display, a memory, and at least one processor comprising processing circuitry. At least one processor, individually and/or collectively, may be configured to: separate a main object from a background object in an image; determine a display size of a display to display an edited image; edit (modify) each of the main object and the background object based on the display size; combine the edited main object and the edited background object and generate the edited image based on the display size; and display the edited image through the display.

14 Claims, 55 Drawing Sheets

(51) Int. Cl.
    *G06T 7/194*        (2017.01)
    *G06T 11/40*      (2006.01)
    *G06V 10/26*      (2022.01)

(56)              References Cited

U.S. PATENT DOCUMENTS

| | | | |
|---|---|---|---|
| 2012/0280924 A1* | 11/2012 | Kummer | G06F 1/1641 |
| | | | 345/173 |
| 2012/0287164 A1 | 11/2012 | Koh et al. | |
| 2013/0093955 A1* | 4/2013 | Wang | G06F 3/14 |
| | | | 348/584 |
| 2020/0396375 A1 | 12/2020 | Penha | |
| 2022/0148475 A1 | 5/2022 | Park et al. | |
| 2022/0229546 A1 | 7/2022 | Lee et al. | |
| 2023/0334622 A1 | 10/2023 | Jung | |
| 2023/0419452 A1 | 12/2023 | Kim et al. | |

FOREIGN PATENT DOCUMENTS

| | | |
|---|---|---|
| KR | 10-1744141 | 6/2017 |
| KR | 10-2019-0069893 | 6/2019 |
| KR | 10-2022-0061800 | 5/2022 |
| KR | 10-2022-0102396 | 7/2022 |
| KR | 20220102420 A | 7/2022 |
| KR | 10-2022-0124528 | 9/2022 |
| KR | 20220130498 A | 9/2022 |
| KR | 20220161960 A | 12/2022 |
| KR | 10-2596308 | 10/2023 |

* cited by examiner

Each Scene Frame in GIF

2060

2060

2070

METHOD FOR DISPLAYING AN IMAGE AND ELECTRONIC DEVICE SUPPORTING THE SAME

CROSS-REFERENCE TO RELATED APPLICATIONS

This application is a continuation of International Application No. PCT/KR2024/002319 designating the United States, filed on Feb. 22, 2024, in the Korean Intellectual Property Receiving Office and claiming priority to Korean Patent Application Nos. 10-2023-0026649, filed on Feb. 28, 2023, and 10-2023-0043840, filed on Apr. 3, 2023, in the Korean Intellectual Property Office, the disclosures of each of which are incorporated by reference herein in their entireties.

BACKGROUND

Field

The disclosure relates to a method of displaying an image (for example, wallpaper and/or a lock screen) on a display and an electronic device supporting the same.

Description of Related Art

With the development of digital technology, various types of electronic devices, such as smartphones, tablet personal computers (PCs), laptop PCs, and/or wearable devices have come to be widely used. A hardware part and/or a software part of the electronic device is continuously developed to support and expand functions.

The electronic device provides a function of configuring a predetermined image as wallpaper (and/or a lock screen) according to a user's intention as a part of software. For example, the user may configure wallpaper in the electronic device, based on an image captured by the user through the electronic device and/or an image acquired (for example, downloaded) from the outside (for example, a server or another electronic device) through predetermined communication. As described above, the electronic device may support a function of configuring and providing (for example, displaying) an image designated by the user as a lock screen of the electronic device and/or wallpaper designated by the user in the home screen.

Recently, electronic devices of various form factors are being developed. For example, electronic devices may have various sizes of displays (for example, display sizes or screen sizes) according to the form factor. For example, recent electronic devices may have a new form factor such as a foldable device, a rollable device, a slidable device, and/or a foldable & slidable hybrid device. For example, the electronic device may have a flexible display and/or a slidable display, and at least a part of the display may be folded or rolled and used or at least a portion of the display may be unfolded and used. The electronic device may be implemented to expand or reduce the screen of the display in an unfolding type and/or a sliding type.

Meanwhile, when the conventional electronic device provides the wallpaper, fragmentary wallpaper is provided based on an image designated by the user regardless of various form factors of the electronic device and/or the display size according thereto. For example, the electronic device provides a wallpaper configuration fixed to the size of a predetermined image regardless of various display sizes. In other words, the electronic device does not provide wallpaper more suitable for various displays according to form factors of the electronic device. Accordingly, the user experiences the inconvenience of having to perform cumbersome tasks, such as image editing to generate wallpaper more suitable for the electronic device. Accordingly, recent electronic devices have an increasing need to develop user interfaces (UIs) corresponding to various form factors and to operate the same.

The information may be provided to aid in understanding of the disclosure.

SUMMARY

Embodiments of the disclosure provide a method of providing an image (for example, wallpaper) optimized for each display according to the form factor of an electronic device and an electronic device supporting the same.

Embodiments of the disclosure provide a method and an apparatus for editing (or modifying) a predetermined (e.g., specified) image in accordance with a display size of the electronic device and providing wallpaper (and/or lock screen) more optimized for the display size of the electronic device, based on the edited image.

Embodiments of the disclosure provide, when the electronic device supports image editing, a method of supporting displaying an image, of which the quality is improved and which is most optimized for the display size, by editing, rearranging, and calibrating objects within the predetermined image, based on analysis of the predetermined image and the display size of the predetermined display, and an electronic device supporting the same.

An electronic device according to an example embodiment of the disclosure may include: a display, a memory, and at least one processor, comprising processing circuitry, operatively connected to the display and the memory. At least one processor, individually and/or collectively, may be configured to: display an image on a first display; separate the image into a main object and a background object; determine a second display to display an edited image; edit each of the main object and the background object based on a display size of the second display; generate the edited image by combining the edited main object and the edited background object; and display the edited image through the second display.

A method of operating an electronic device according to an example embodiment of the disclosure may include displaying an image on a first display; separating the image into a main object and a background object; determining a second display to display an edited image; editing each of the main object and the background object based on a display size of the second display; generating the edited image by combining the edited main object and the edited background object; and displaying the edited image through the second display.

In order to address various problems in the art, various embodiments of the disclosure may include a non-transitory computer-readable recording medium that records a program causing at least one processor, individually and/or collectively, to control an electronic device to perform the method.

According to an example embodiment, a non-transitory computer-readable storage medium (or computer program product) storing one or more programs is described. According to an example embodiment, one or more programs may include instructions which, when executed by at least one processor, individually and/or collectively, of the electronic device, cause the electronic device to perform operations comprising: displaying an image on a first display, separating the image into a main object and a background object, determining a second display to display an edited image, editing each of the main object and the background object based on a display size of the second display, generating the edited image by combining the edited main object and the edited background object, and displaying the edited image through the second display.

An additional range of applicability of the disclosure may become clear from the following detailed description. However, since various modifications and changes within the spirit and scope of the disclosure may be clearly understood by those skilled in the art, the detailed description and specific embodiments such as various example embodiments of the disclosure should be understood as only examples and are not limiting.

According to various example embodiments, an electronic device, a method of operating the same, and a recording medium, wallpaper (and/or lock screen) more optimized for a corresponding display according to various form factors of the electronic device can be provided. According to various example embodiments, the electronic device may include one or more displays separated according to the form factor and can configure and provide wallpaper (and/or lock screen) suitable for a display size of each display. According to various example embodiments, when configuring wallpaper, the electronic device can automatically edit (or modify) an image designated by a user and improve the quality in accordance with a display size (for example, a screen size) of a predetermine display and provide the image as wallpaper.

According to various example embodiments, when supporting image editing to display an image such as wallpaper and/or a lock screen, the electronic device can provide the image, based on analysis of the predetermined image and the display size of the predetermined display rather than simply resizing the predetermined image. For example, it is possible to support a configuration of wallpaper of which the quality is more improved and which is more optimized for the display size by editing, rearranging, and calibrating objects within the predetermined image. Accordingly, intuition and convenience for the configuration of wallpaper can be provided to the user for each display of the electronic device.

According to various example embodiments, the electronic device can improve the quality of the image (for example, calibrating the resolution and/or the quality) and reduce a capacity of the image to provide the image. For example, the electronic device can reduce the capacity of the image through encoding using a predetermined encoding technology (for example, webp encoding). For example, when the quality of the image is improved (for example, the resolution is calibrated and/or the quality is calibrated) in accordance with the display size, the capacity of the image may increase but the increasing capacity may be improved through a high compression rate based on the predetermined encoding technology.

In addition, various effects directly or indirectly detected through the disclosure can be provided. The effects that can be realized by the disclosure are not limited to the above-described effects, and other effects that have not been mentioned may be clearly understood by those skilled in the art from the following description.

BRIEF DESCRIPTION OF THE DRAWINGS

In connection with the description of drawings, the same or similar reference numerals can be used for the same or similar elements. Further, the above and other aspects, features and advantages of certain embodiments of the present disclosure will be more apparent from the following detailed description, taken in conjunction with the accompanying drawings, in which:

FIG. 1 is a block diagram illustrating an example electronic device in a network environment according to various embodiments;

DETAILED DESCRIPTION

Figure 2:
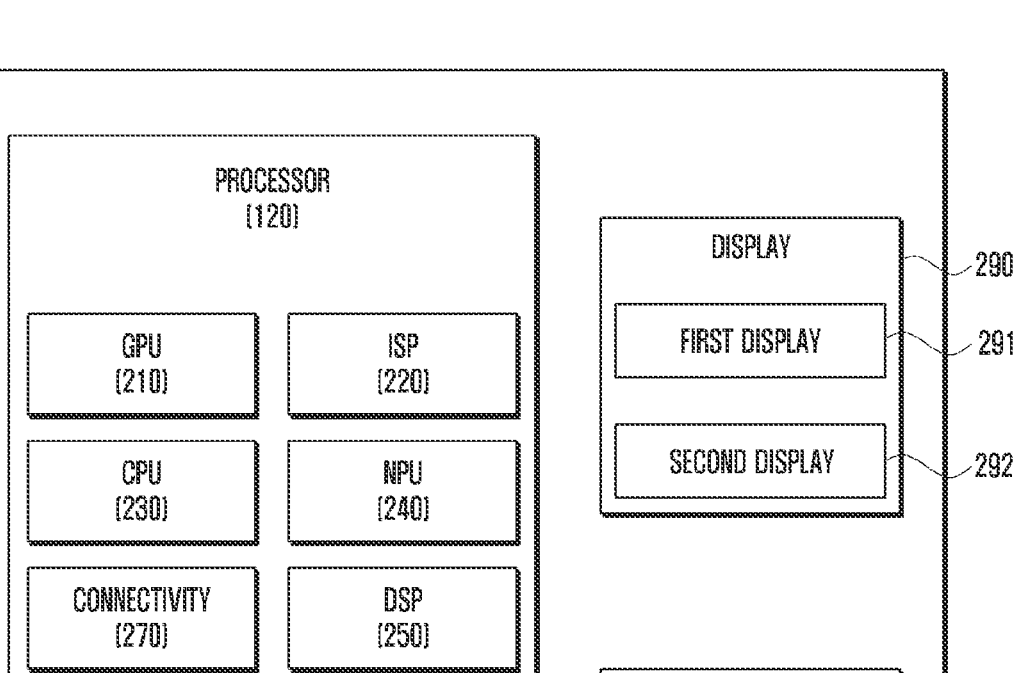
FIG. 2 is a block diagram illustrating an example configuration of an electronic device according to various embodiments.

Hereinafter, various example embodiments of the disclosure are described in greater detail with reference to the drawings. However, the disclosure may be implemented in various different forms and is not limited to various embodiments described herein. In connection with description of the drawings, the same or similar reference numerals can be used for the same or similar elements. Further, in drawings and relevant description, description of well known functions and configurations may be omitted for clarity and brevity.

Figure 1:
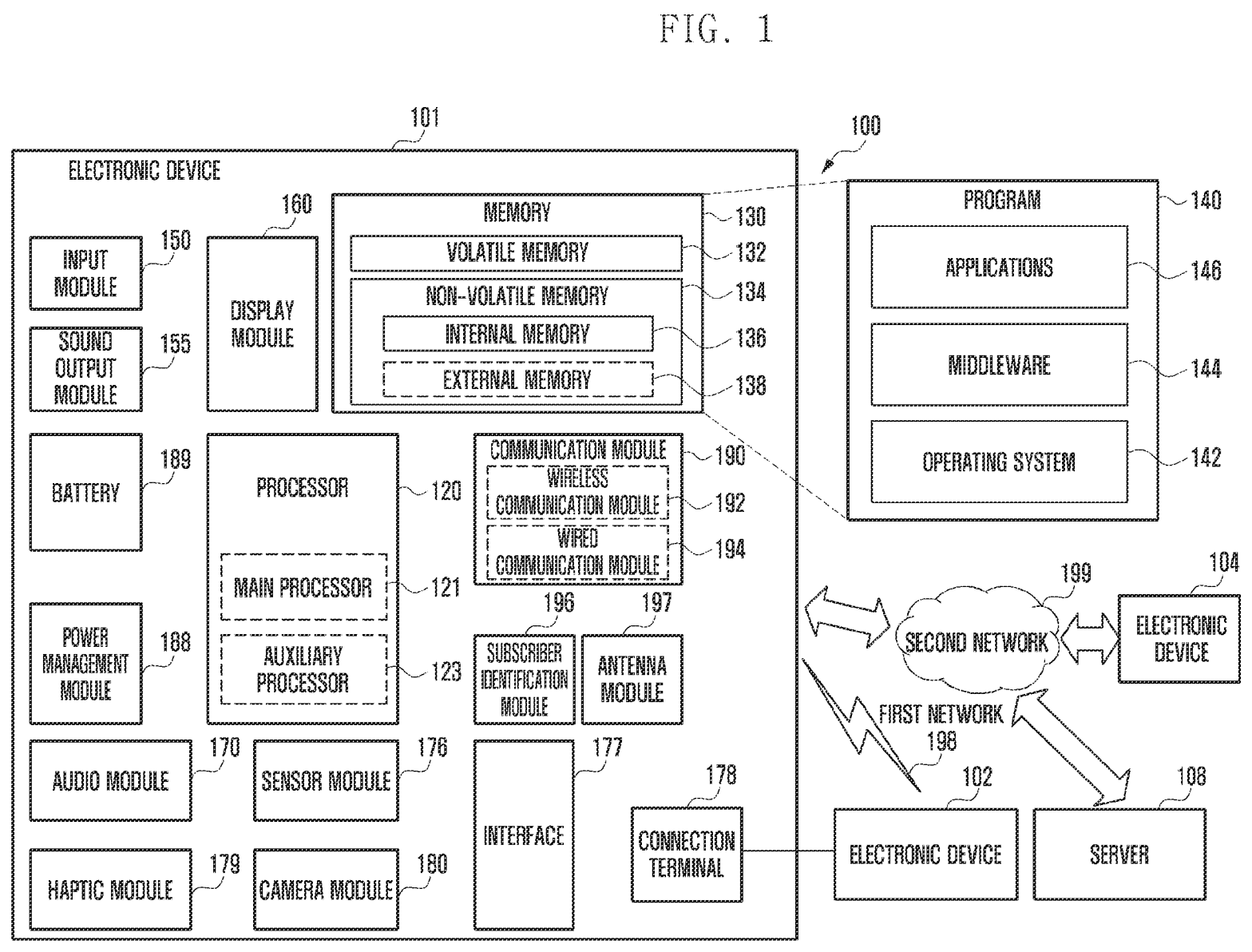

FIG. 1 is a block diagram illustrating an example electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may include various processing circuitry and/or multiple processors. For example, as used herein, including the claims, the term "processor" may include various processing circuitry, including at least one processor, wherein one or more of at least one processor, individually and/or collectively in a distributed manner, may be configured to perform various functions described herein. As used herein, when "a processor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed functions, e.g., in a distributed manner. At least one processor may execute program instructions to achieve or perform various functions. The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

FIG. 2 is a block diagram illustrating an example configuration of an electronic device according to various embodiments.

Referring to FIG. 2, the electronic device 101 according to an embodiment of the disclosure may include a display 290 (for example, the display module 160 of FIG. 1), a memory 130 (for example, the memory 130 of FIG. 1), and/or a processor (e.g., including processing circuitry) 120 (for example, the processor 120 of FIG. 1). According to an embodiment, the electronic device 101 may include all or at least some of the elements of the electronic device 101 as described in the part with reference to FIG. 1.

According to an embodiment, the display 290 may include a configuration which is the same as or similar to the display module 160 of FIG. 1. According to an embodiment, the display 290 may include one or more displays (for example, a first display 291 and/or a second display 292) according to a form factor the electronic device 101, and visually provide various pieces of information to the outside (for example, a user) of the electronic device 101 through a corresponding display. According to an embodiment, the display 290 may visually provide an executed application (for example, the application 146 of FIG. 1) and various pieces of information (for example, contents, images (for example, still images, videos, animation images (for example, graphics interchange format (GIF) images), and webp images)) related to the use thereof according to the control of the processor 120.

According to an embodiment, the display 290 may be coupled with a touch sensor, a pressure sensor for measuring an intensity of a touch, and/or a touch panel (for example, a digitizer) for detecting a stylus pen in a magnetic field type. According to an embodiment, the display 290 may detect a touch input and/or a hovering input (or a proximity input) by measuring a change in a signal (for example, a voltage, an amount of light, resistance, an electromagnetic signal, and/or an amount of charge) for a specific location of the display 290, based on the touch sensor, the pressure sensor, and/or the touch panel. According to an embodiment, the display 290 may include a liquid crystal display (LCD), an organic light emitted diode (OLED), and/or an active matrix organic light emitted diode (AMOLED). According to an embodiment, the display 290 may include a flexible display.

According to an embodiment, the first display 291 and the second display 292 may be implemented in various shapes according to the form factor of the display 101.

According to an embodiment, when the electronic device 101 has the form factor of a foldable device, the first display 291 may include a main display having a first display size to allow the electronic device 101 to operate in a first state (for example, an unfolded state or an open state). According to an embodiment, when the electronic device 101 has the form factor of a foldable device, the second display 292 may include a cover display having a second display size different from the first display size to allow the electronic device

101 to operate in a second state (for example, a folded state or a closed state) and/or the first state.

According to an embodiment, when the electronic device 101 has the form factor of a rollable/slidable device, the first display 291 may include a main display having a third display size to allow the electronic device 101 to operate in a third state (for example, a closed state or a slide-in state). According to an embodiment, when the electronic device 101 has the form factor of a rollable/slidable device, the second display 292 may include an expanded display having a fourth display size different form the third display size to allow the electronic device 101 to operate in a four state (for example, an open state or a slide-out state).

In an embodiment, the type, shape, and/or size of the display 290 are not limited to the above-described examples, and may be variously implemented according to the form factor of the electronic device 101.

According to an embodiment, the memory 130 may correspond to the memory 130 of FIG. 1. According to an embodiment, the memory 130 may store various pieces of data used by the electronic device 101. In an embodiment, data may include, for example, an application (for example, the program 140 of FIG. 1) and input data or output data for commands related to the application. In an embodiment, the data may include various types of image data acquired through the camera module 180 or acquired from an external device (for example, another electronic device and/or a server). In an embodiment, the image data may include still images, videos, and/or animation images (for example, graphics interchange format (GIF) images and/or webp images). In an embodiment, the data may include information on various configurations for supporting an operation according to a wallpaper (and/or lock screen) configuration in the electronic device 101.

In an embodiment, the information no various configu-rations may include information (for example, a screen resolution for each display 290) related to the display size of the display 290 (for example, the first display 291 and the second display 292) of the electronic device 101 and/or information related to rearrangement of a main object within the image (for example, margin for a separation distance between the object within the image and edge of the display 290). In an embodiment, the information on various con-figurations may include reference information (for example, resize of the object within the image and reference infor-mation for determining whether cut and/or align is per-formed) corresponding to one or more predetermined con-ditions for analyzing and/or determining the object within the image.

In an embodiment, the data may include various pieces of learning data and parameters acquired based on user learn-ing through interaction with the user. In an embodiment, the data may include various schemas (or algorithms, models, networks, or functions) for supporting an operation related to an image configuration, such as wallpaper and/or a lock screen.

For example, schemas for supporting the operation related to the image configuration such as the wallpaper and/or lock screen may include a neural network. In an embodiment, the neural network may include a neural network model based, for example, and without limitation, on at least one of an artificial neural network (ANN), a convolution neural net-work (CNN), a region with convolution neural network (R-CNN), a region proposal network (RPN), a recurrent neural network (RNN), a stacking-based deep neural net-work (S-DNN), a state-space dynamic neural network (S-SDNN), a deconvolution network, a deep belief network (DBN), restricted Boltzmann machine (RBM), a long short-term memory (LSTM) network, a classification network, a plain residual network, a dense network, a hierarchical pyramid network, and/or a fully convolutional network. According to an embodiment, the types of neural network models are not limited to the above examples.

According to an embodiment, when executed, the memory 130 may store instructions causing the processor 120 to operate. For example, the application may be stored as software (for example, the program 140 of FIG. 1) in the memory 130 and can be executed by the processor 120. According to an embodiment, the application may be vari-ous applications through which the electronic device 101 can provide various functions or services (for example, wallpaper and/or a lock screen configuration function).

According to an embodiment, the processor 120 may include various processing circuitry and/or multiple proces-sors. For example, as used herein, including the claims, the term "processor" may include various processing circuitry, including at least one processor, wherein one or more of at least one processor, individually and/or collectively in a distributed manner, may be configured to perform various functions described herein. As used herein, when "a proces-sor", "at least one processor", and "one or more processors" are described as being configured to perform numerous functions, these terms cover situations, for example and without limitation, in which one processor performs some of recited functions and another processor(s) performs other of recited functions, and also situations in which a single processor may perform all recited functions. Additionally, the at least one processor may include a combination of processors performing various of the recited/disclosed func-tions, e.g., in a distributed manner. At least one processor may execute program instructions to achieve or perform various functions. The processor 120 may, for example, perform an application layer processing function required by the user of the electronic device 101. According to an embodiment, the processor 120 may provide the control and commands for functions of various blocks of the electronic device 101. According to an embodiment, the processor 120 may perform calculations or data processing for the control and/or communication of respective elements of the elec-tronic device 101. For example, the processor 120 may include at least some of the configurations and/or functions of the processor 120 of FIG. 1. According to an embodiment, the processor 120 may be operatively connected to the elements of the electronic device 101. According to an embodiment, the processor 120 may load commands or data received from other elements of the electronic device 101 to the memory 130, process the commands or data stored in the memory 130, and store resultant data.

According to an embodiment of the disclosure, the pro-cessor 120 may include a processing circuitry and/or execut-able program elements. According to an embodiment, the processor 120 may control (or process) the overall operation related to displaying of an image (for example, supporting a configuration of an image such as wallpaper and/or a lock screen) to fit the display size of the electronic device 101, based on the processing circuitry and/or the executable program elements.

According to an embodiment, the processor 120 may perform an operation of separating a main object and a background object in the given image. According to an embodiment, the processor 120 may perform an operation of determining the display size of a display designated to display an image. According to an embodiment, the proces-sor 120 may perform an operation of editing (or modifying)

the main object and the background object in accordance with the display size. According to an embodiment, the processor 120 may perform an operation of generating an image edited to correspond to the display size of the predetermined display by combining the edited main object and the edited background object. According to an embodiment, the processor 120 may perform an operation of displaying the edited image through the predetermined display.

According to an embodiment, the processor 120 may perform an operation of displaying an image designated by the user on the display. According to an embodiment, the processor 120 may perform an operation of detecting a user input for configuring wallpaper based on the predetermined image. According to an embodiment, the processor 120 may perform an operation of determining the display size of the predetermined display on which the wallpaper is configured. According to an embodiment, the processor 120 may perform an operation of editing the predetermined image in accordance with the display size. According to an embodiment, the processor 120 may perform an operation of configuring the edited image as the wallpaper of the predetermined display. According to an embodiment, the display for displaying the predetermined image and the predetermined display may include the same display or different displays having different display sizes.

According to an embodiment, the processor 120 may perform an operation of analyzing entire image frames of the image. According to an embodiment, the processor 120 may perform an operation of determining the main object, based on the entire image frames. According to an embodiment, when the main object is determined in the image, the processor 120 may perform an operation of identifying the remaining objects except for the main object in the image as the background objects. According to an embodiment, the processor 120 may perform an operation of separating the main object and the background objects as independent objects in the image.

According to an embodiment, detailed operations of the processor 120 of the electronic device 101 are described in greater detail below with reference to drawings.

According to an embodiment, the processor 120 may include an application processor (AP). According to an embodiment, the processor 120 may include a system semiconductor performing calculation and a multimedia driving function of the electronic device 101. According to an embodiment, the processor 120 may be configured in the form of a system-on-chip (SoC), and may integrate several semiconductor technologies into one and include a technology-intensive semiconductor chip for implementing system blocks by one chip. According to an embodiment, the system blocks of the processor 120 may include blocks of a graphics processing unit (GPU) 210, an image signal processor (ISP) 220, a central processing unit (CPU) 230, a neural processing unit (NPU) 240, a digital signal processor 250, a modem 260, connectivity 270, and/or security 280 as illustrated in FIG. 2. Each of the blocks may include various processing circuitry, including at least one processor as described above with reference to processor 120.

According to an embodiment, the GPU 210 may perform graphics processing. According to an embodiment, the GPU 210 may receive a command from the CPU 230 and perform graphics processing for expressing shapes, locations, colors, shades, movements, and/or textures of objects (or things) on the display.

According to an embodiment, the ISP 220 may perform image processing and calibration of images and videos. According to an embodiment, the ISP 220 may serve to calibrate non-processed data (for example, raw data) transmitted by an image sensor of the camera module 180 and generate an image which the user more prefers. According to an embodiment, the ISP 220 may control partial brightness of the image and perform postprocessing such as highlighting a detailed part. For example, the ISP 220 may generate results which the user prefers by performing a process of tuning a picture quality of the image and calibrating the image acquired through the camera module 180.

According to an embodiment, the ISP 220 may support a scene segmentation (for example, image segmentation) technology for recognizing and/or classifying parts of the scene captured through a link with the NPU 240. For example, the ISP 220 may include a function of applying different parameters to objects such as the sky, grass, and/or skin to process the same. According to an embodiment, when capturing an image through an artificial intelligence function, the ISP 220 may detect and display a human face and control brightness, focus, and/or color of the image using coordinates and information of the face.

According to an embodiment, the CPU 230 may play a role corresponding to the processor 120. According to an embodiment, the CPU 230 may interpret a command of the user and play a role of arithmetic and logical operations, and/or data processing. For example, the CPU 230 may perform a function of memory, interpretation, calculation, and control. According to an embodiment, the CPU 230 may control the overall functions of the electronic device 101. For example, the CPU 230 may execute all software (for example, applications) of the electronic device 101 in the operating system (OS) and control hardware devices.

According to an embodiment, the CPU 230 may include a single processor core or multiple processor cores (multi-core). According to an embodiment, the CPU 230 may control the overall operations of the processor 120 to execute an application and perform tasks based on a neural network required according to the execution of the application.

According to an embodiment, the NPU 240 may serve to perform processing optimized for a deep-learning algorithm of artificial intelligence. According to an embodiment, the NPU 240 is a processor optimized for deep-learning algorithm operation (for example, artificial intelligence operation) and may rapidly and efficiently process big data like a human's neural network. For example, the NPU 240 may be mainly used for artificial intelligence calculation. According to an embodiment, the NPU 240 may recognize objects, environments, and/or people in the background to automatically control the focus when capturing an image through the camera module 180 or may automatically switch a shooting mode of the camera module 180 to a food mode and/or process erasing of only unnecessary subjects from the captured result when taking a food photo.

According to an embodiment, the electronic device 101 may interact with all processors such as the GPU 210, the ISP 220, the CPU 230, and the NPU 240 and support integrated machine learning processing.

According to an embodiment, the DSP 250 may indicate an integrated circuit that helps for rapid processing of a digital signal. According to an embodiment, the DSP 250 may perform a function of converting an analog signal into a digital signal and performing high-speed processing.

According to an embodiment, the modem 260 may allow the electronic device 101 to use various communication functions. For example, the modem 260 may support communication such as a phone call and data transmission and reception while exchanging a signal with the BS. According to an embodiment, the modem 260 may include an integrated modem (for example, a cellular modem, an LTE modem, a 5G modem, a 5G-advanced modem, and a 6G modem) supporting a communication technology such as LTE and 2G to 5G. According to an embodiment, the modem 260 may include an artificial intelligence modem to which an artificial intelligence algorithm is applied.

According to an embodiment, the connectivity 270 may support wireless data transmission based on IEEE 802.11. According to an embodiment, the connectivity 270 may support a communication service based on IEEE 802.11 (for example, Wi-Fi) and/or 802.15 (for example, Bluetooth, ZigBee, or UWB). For example, the connectivity 270 may support a communication service for an unspecified number of people in a localized area, such as the indoors, using an unlicensed band.

According to an embodiment, the security 280 may provide an independent security execution environment between data or services stored in the electronic device 101. According to an embodiment, when providing a service such as biometric recognition of the electronic device 101, a mobile ID, and/or payment, the security 280 may serve to prevent and/or reduce the generation of hacking from the outside through security on software and hardware during a process of user authentication. For example, the security 280 may provide device security for security enhancement of the electronic device 101 itself and an independent security execution environment in a security service of the electronic device 101 based on user information such as a mobile ID, payment, or a car key.

According to an embodiment, operations performed by the processor 120 may be implemented by executing instructions stored in a recording medium (or a computer program product). For example, the recording medium may include a non-transitory computer-readable recording medium which records a program for performing various operations performed by the processor 120.

The various embodiments of the disclosure may be implemented in a recording medium, which can be read through a computer or a device similar thereto, using software, hardware, or a combination thereof. According to the hardware implementation, operations described in an embodiment may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, micro-processors, and electrical units for performing other functions.

In an embodiment, a computer-readable recording medium (or a computer program product) recording a program which, when executed, causes the electronic device to perform various operations is provided. The operations may include an operation of separating a main object from background objects in a given image, an operation of determining a display size of a predetermined display to display the image, an operation of editing (or modifying) each of the main object and the background objects in accordance with the display size, an operation of generating the edited image in accordance with the display size of the predetermined display by combining the edited main object and the edited background objects, and an operation of displaying the edited image through the predetermined display.

Figure 3A:
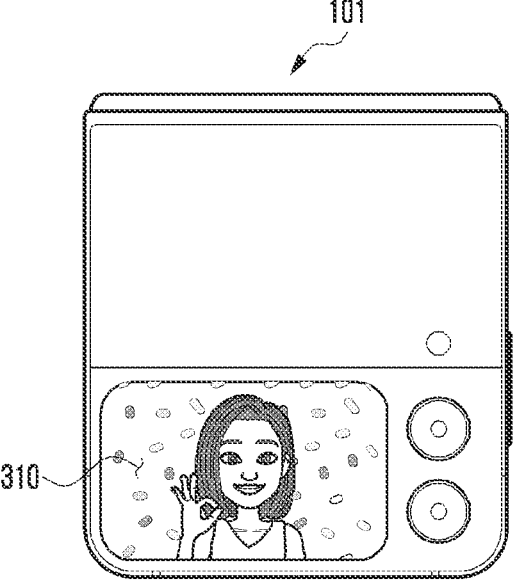
FIGS. 3A, 3B, and 3C are diagrams illustrating examples of various form factors of the electronic device according to various embodiments.
Figure 3B:
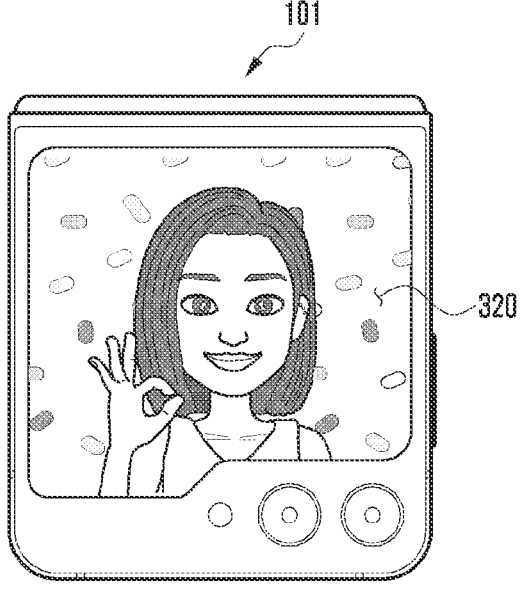
Figure 3C:
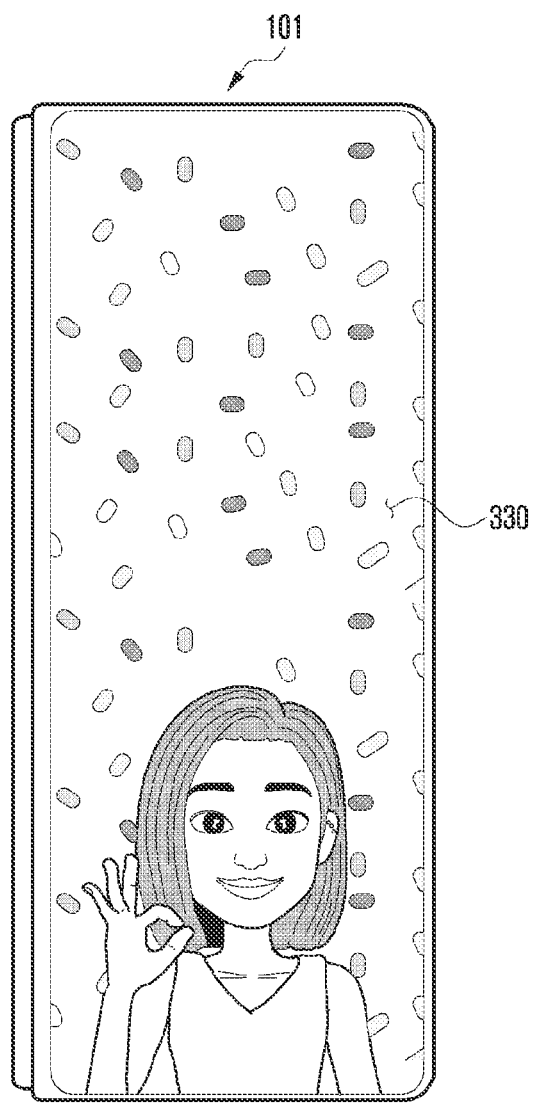

FIGS. 3A, 3B, and 3C are diagrams illustrating examples of various form factors of the electronic device according to various embodiments.

According to an embodiment, FIGS. 3A, 3B, and 3C may illustrate examples of various form factors of the electronic device 101 according to various display shapes. According to an embodiment, the electronic device 101 may include various form factors such as bar type, plat type, foldable, rollable, and/or slidable form factor. According to an embodiment, as illustrated in, FIGS. 3A, 3B, and 3C, the electronic device 101 may be implemented in various forms, and a display (for example, the display module 160 of FIG. 1 or the display 290 of FIG. 2) may be provided in various ways according to an implementation type of the electronic device 101.

The electronic device 101 (for example, a foldable device) having the form factor in a foldable type is described as an example of the electronic device 101 according to an embodiment of the disclosure, but the electronic device 101 according to various embodiments and an operation thereof are not limited thereto. For example, the electronic device 101 may operate according to various form factors such as bar type, plate type, rollable, and/or slidable form factor. For example, the illustrated electronic device 101 may be a part of a bar-type or plate-type device, a foldable device, a rollable device, or a slidable device.

According to an embodiment, the electronic device 101 illustrated in FIGS. 3A, 3B, and 3C may indicate an electronic device including a main display (for example, the display module 160 of FIG. 1 or the display 290 of FIG. 2) having different two areas are foldable in a facing direction, which is not illustrated. In general, when carrying the electronic device 101, the user may fold the display of the electronic device 101 so that two different areas face each other, and may unfold the display so that the two different areas become a substantially flat panel in the actual use state of the electronic device 101. According to an embodiment, the electronic device 101 may include cover displays 310, 320, and 330 (for example, the display module 160 of FIG. 1 or the display 290 of FIG. 2) as illustrated in the examples of FIGS. 3A, 3B, and 3C.

According to an embodiment, the electronic device 101 may include a form factor including at least two display surfaces (for example, a first display surface and a second display surface), based on at least one folding axis. Various embodiments are not limited thereto, and this is only an example and the number of folding axes of the electronic device 101 is not limited. According to an embodiment, the electronic device 101 may have a display which is folded or unfolded in various types (for example, in-folding, out-folding, or in/out-folding) according to an implementation form.

According to an embodiment, FIGS. 3A and 3B illustrate examples of the vertical foldable type electronic device 101. FIGS. 3C may show an example of the horizontal foldable type electronic device 101 according to an embodiment. According to an embodiment, as illustrated in the examples of FIGS. 3A, 3B, and 3C, the display of the electronic device 101 may have various display specifications (for example, a main display and/or a cover display) according to the form factor of the electronic device 101.

According to an embodiment, the display of the electronic device 101 may have various display screen size (for example, the diagonal length of the screen), a resolution, an aspect ratio (for example, a screen ratio according to a resolution), a display type (for example, width/height ratio), but is not limited to the above-described examples. In an embodiment, the "display size" used in connection with editing of an image in the following description may be used as a meaning including at least one display specification in the above example. For example, hereinafter, the "display size" may include hardware specifications (for example, screen size) of the display and/or software specifications (for example, a resolution, an aspect ratio, and a width/height ratio). For example, the "display size" can be used interchangeably with terms such as a display screen size, a resolution, an aspect ratio, and a display type.

According to an embodiment, when the electronic device 101 has the form factor of a foldable device as illustrated in the examples of FIGS. 3A, 3B, and 3C, the electronic device 101 may include a main display having a first display size (for example, a first screen size and a first aspect ratio) which can operate in a first state (for example, an unfolded state or an open state). According to an embodiment, when the electronic device 101 has the form factor of the foldable device, the electronic device 101 may include cover displays 310, 320, and 330 having a second display size (for example, a second screen size and a second aspect ratio) different from the first display size which can operate in a second state (for example, a folded state or a closed state) and/or the first state.

According to an embodiment, FIGS. 3A, 3B, and 3C illustrate examples in which the cover displays 310, 320, and 330 of the electronic device 101 operate in the second state. For example, examples of a state in which wallpaper configured by the user is displayed through the cover displays 310, 320, and 330 may be illustrated. According to an embodiment, the cover displays 310, 320, and 330 may have different display types and display sizes according to the form factor of the electronic device 101. For example, as illustrated in FIGS. 3A, 3B, and 3C, different forms (for example, the size of an image for wallpaper and an align reference location of an object within an image) may be provided according to display sizes (or aspect ratios) of the cover displays 310, 320, and 330 of the electronic device 101.

According to an embodiment, although not illustrated in FIGS. 3A, 3B, and 3C, when the electronic device 101 has the form factor of a foldable/slidable device, the electronic device 101 may include a main display having a third display size which can operate in a third state (for example, a closed state or a slide-in state). According to an embodiment, when the electronic device 101 has the form factor of a rollable/slidable device, the electronic device 101 may include an expanded display having a fourth display size different from the third display size which can operate in a fourth state (for example, an open state or a slide-out state).

In an embodiment, the form factor of the electronic device 101 and the type, the shape, and/or the size of the display (for example, the main display, the cover display, and/or the expanded display) according to the form factor are not limited to the above-described examples, and may be variously implemented according to the form factor of the electronic device 101. According to an embodiment, the electronic device 101 may include the form factor of a foldable & slidable hybrid device.

According to an embodiment, when wallpaper of the electronic device 101 is configured, the electronic device 101 may display (for example, provide as wallpaper) an image edited (or modified) to fit the display size according to the form factor of the electronic device 101 (for example, various form factors as illustrated in FIGS. 3A, 3B, and 3C). According to an embodiment of the disclosure, the displaying of the image (supporting of the configuration of wallpaper) to fit the display size will be described in detail with reference to the drawings.

The electronic device according to an example embodiment of the disclosure may include: a display (for example, the display module 160 of FIG. 1 or the display 290 of FIG. 2), a memory (for example, the memory 130 of FIG. 1 or FIG. 2), and at least one processor, comprising processing circuitry (for example, the processor 120 of FIG. 1 or FIG. 2), operatively connected to the display and the memory.

According to an example embodiment, at least one processor, individually and/or collectively, may be configured to separate a main object and background objects in the given image. According to an example embodiment, at least one processor, individually and/or collectively, may be configured to determine the display size of a specified display to display the image. According to an example embodiment, at least one processor, individually and/or collectively, may be configured to edit (or modifying) each of the main object and the background objects in accordance with the display size. According to an example embodiment, at least one processor, individually and/or collectively, may be configured to combine the edited main object and the edited background objects to generate an image edited to fit the display size of the specified display. According to an example embodiment, at least one processor, individually and/or collectively, may be configured to display the edited image through the specified display.

According to an example embodiment, at least one processor, individually and/or collectively, may be configured to display an image on a first display. According to an example embodiment, at least one processor, individually and/or collectively, may be configured to separate the image into a main object and a background object. According to an example embodiment, at least one processor, individually and/or collectively, may be configured to determine a second display to display an edited image. According to an example embodiment, at least one processor, individually and/or collectively, may be configured to edit each of the main object and the background object based on a display size of the second display. According to an example embodiment, at least one processor, individually and/or collectively, may be configured to generate the edited image by combining the edited main object and the edited background object. According to an example embodiment, at least one processor, individually and/or collectively, may be configured to display the edited image through the second display.

According to an example embodiment, based on the edited image being generated, at least one processor, individually and/or collectively, may be configured to improve the quality of the edited image, based on execution of a predetermined function for improving the image quality.

According to an example embodiment, at least one processor, individually and/or collectively, may be configured to display an image designated on the display (e.g., the first display), detect an input for configuring wallpaper based on the specified image, determine a display size of the specified display (e.g., the second display) in which the wallpaper is to be configured, edit the specified image in accordance with the display size, and configure the edited image as the wallpaper of the specified display.

According to an example embodiment, the display (e.g., the first display) displaying the image and the specified display (e.g., the second display) displaying the edited image comprise the same display or different displays having different display sizes.

According to an example embodiment, at least one processor, individually and/or collectively, may be configured to determine a display size of a selected display, based on an input of selecting a display to display an image.

According to an example embodiment, at least one processor, individually and/or collectively, may be configured to analyze entire image frames of the image and determine the main object, based on the entire image frames.

According to an example embodiment, at least one processor, individually and/or collectively, may be configured to, based on the main object being determined in the image, identify remaining objects other than the main object as background objects in the image, and separate the main object and background objects as independent objects in the image.

According to an example embodiment, at least one processor, individually and/or collectively, may be configured to separate the image into the main object and the background object and independently edit the objects.

According to an example embodiment, the editing the main object includes first adjusting of the main object based on the display size. According to an example embodiment, the editing the background object includes second adjusting of the background object based on the display size.

According to an example embodiment, at least one processor, individually and/or collectively, may be configured to edit resizing of the main object and/or controlling a location of the main object so that the main object is display within the second display and edit drawing or cropping the background object based on the main object.

According to an example embodiment, at least one processor, individually and/or collectively, may be configured to separate the main object from the background object in the image and independently edit the objects and combine back the edited main object and the edited background object and store the objects.

According to an example embodiment, at least one processor, individually and/or collectively, may be configured to: determine whether the main object is an animation object, determine whether the main object is entirely included in the screen based on the main object not being the animation object, process disposition of the object, based on a first processing scheme based on the main object being entirely included in the screen, and process disposition of the object, based on a second processing scheme based on the main object not being entirely included in the screen.

According to an example embodiment, at least one processor, individually and/or collectively, may be configured to: determine whether the background object includes a specified condition based on the main object being the animation object, determine whether the background object is animated with the main object based on the background object not including the specified condition, process disposition of the object, based on a third processing scheme based on the background object not being animated with the main object, and process disposition of the object, based on a fourth processing scheme based on background object being animated with the main object.

According to an example embodiment, at least one processor, individually and/or collectively, may be configured to: determine whether the main object is entirely included in the screen based on the background object including the specified condition, process disposition of the object, based on a fifth processing scheme based on the main object being entirely included in the screen, process disposition of the object, based on a sixth processing scheme based on the main object not being entirely included in the screen.

According to an example embodiment, the first processing scheme may include a processing scheme of designating a location of the main object to a center of the screen. According to an example embodiment, the second processing scheme may include a processing scheme of aligning the location of the main object, based on a side on which the main object is in contact with an edge of the screen.

According to an example embodiment, at least one processor, individually and/or collectively, may be configured to dispose the location of the main object at the center of the screen according to the display size, based on determination of the first processing scheme. According to an example embodiment at least one processor, individually and/or collectively, may be configured to align the main object with a cross section with which the main object is in contact, based on determination of the second processing scheme and dispose the main object.

According to an example embodiment, the specified condition may include a condition in which the background object has a feature point such as a specified color and/or pattern. According to an example embodiment, the third processing scheme may include a processing scheme of designating the location of the main object. According to an example embodiment, the fourth processing scheme may include a processing scheme of processing an image including the main object and the background object, based on a specified image processing technology and filling the image in an entire screen of the display size.

According to an example embodiment, at least one processor, individually and/or collectively, may be configured to determine that there is no background object, based on determination of the third processing scheme and designate the location of the main object. According to an example embodiment, at least one processor, individually and/or collectively, may be configured to fill the image in accordance with the display size through an outpainting technology, based on determination of the fourth processing scheme.

According to an example embodiment, the fifth processing scheme and the sixth processing scheme may include a processing scheme of processing the main object and the background object together.

According to an example embodiment, at least one processor, individually and/or collectively, may be configured to: dispose the location of the main object at a center of the screen according to the display size, based on determination of the fifth processing scheme and control a color and a pattern of the background object in accordance with the display size in areas other than the main object, based on the location of the main object. According to an example embodiment, at least one processor, individually and/or collectively, may be configured to dispose the main object to be aligned with a cross section with which the main object is in contact and control the color and the pattern of the background object in accordance with the display size in the areas other than the main object, based on the location of the main object.

Hereinafter, a method of operating the electronic device 101 according to various example embodiments is described in greater detail. Operations performed by the electronic device 101 according to various embodiments may be performed by the processor 120 including various processing circuitry (various processing circuitries) of the electronic device 101 and/or executable program elements. According to an embodiment, the operations performed by the electronic device 101 may be stored in the memory 130 and may be executed by at least one processor, individually and/or collectively (for example, the processor 120 of FIG. 1 or FIG. 2), to perform the operations.

Figure 4:
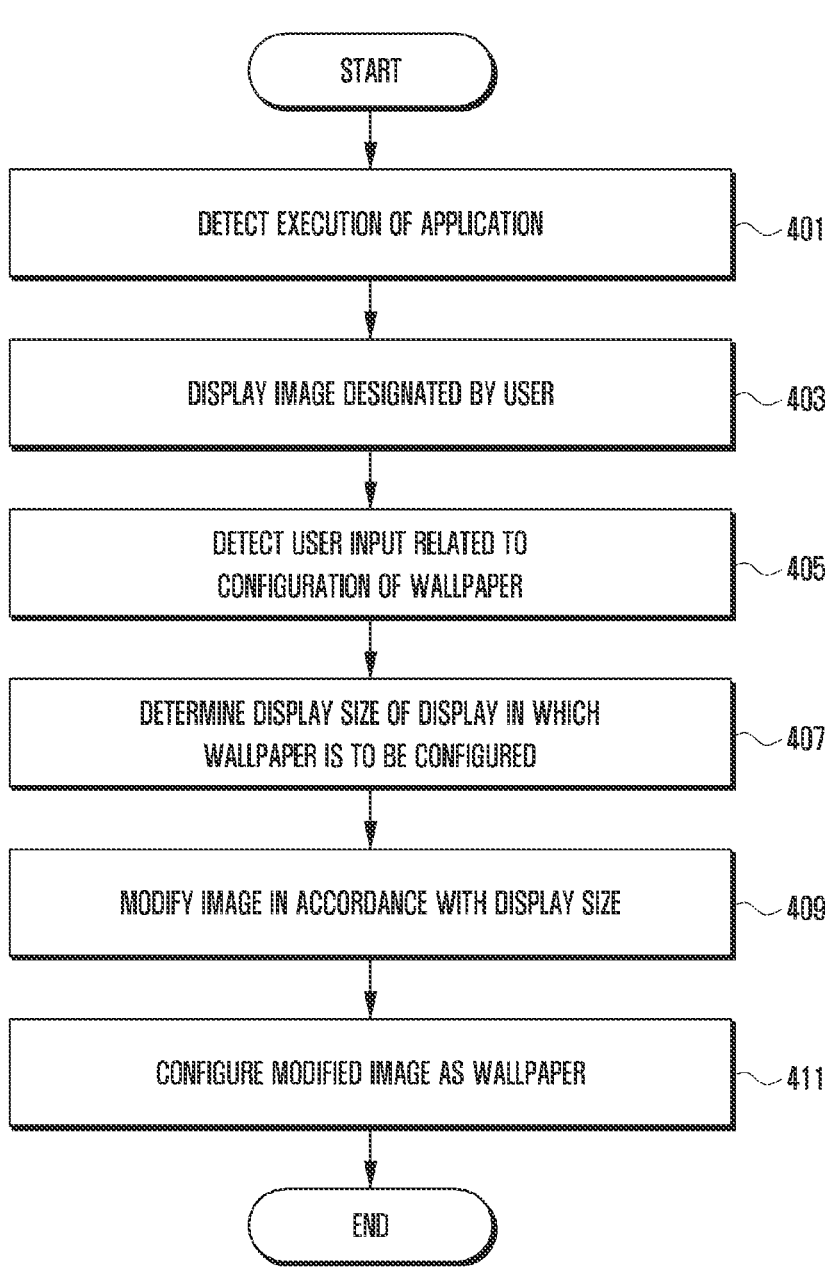
FIG. 4 is a flowchart illustrating an example method of operating the electronic device according to various embodiments.

FIG. 4 is a flowchart illustrating an example method of operating the electronic device according to various embodiments.

Figure 5A:
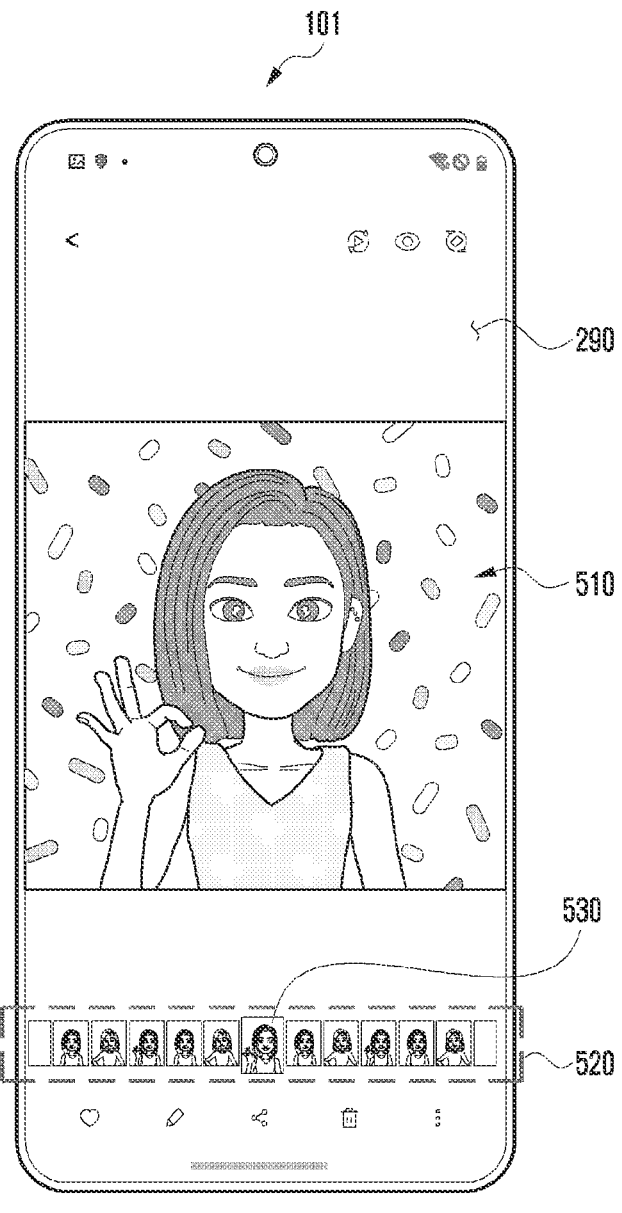
FIGS. 5A, 5B, and 5C are diagrams illustrating examples in which the electronic device supports image configurations according to various embodiments.
Figure 5B:
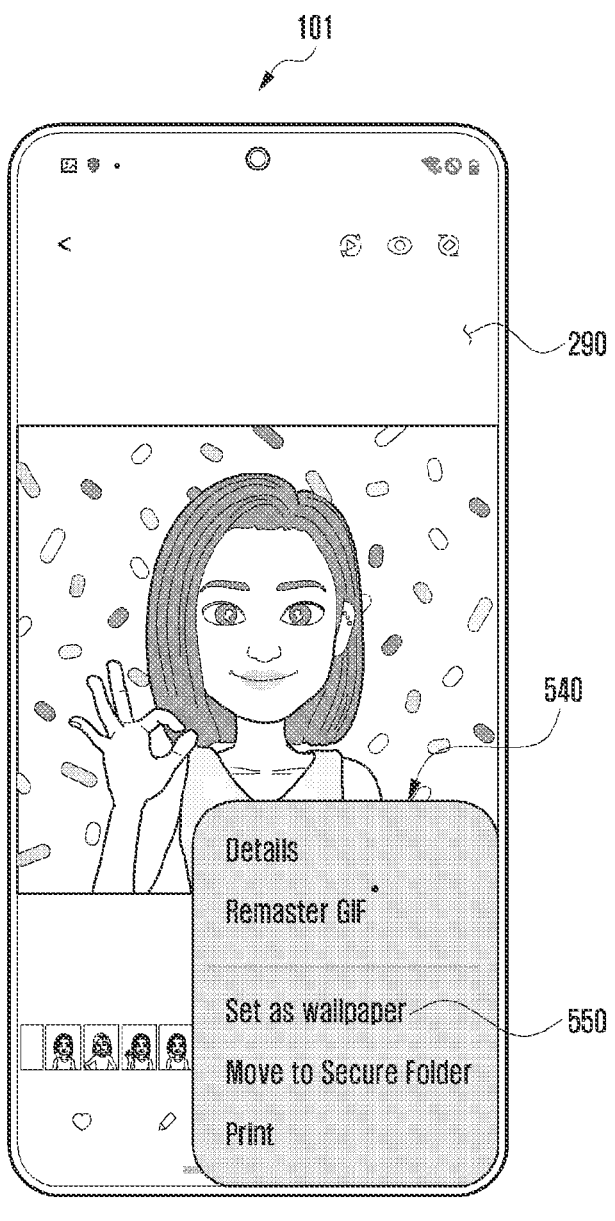
Figure 5C:
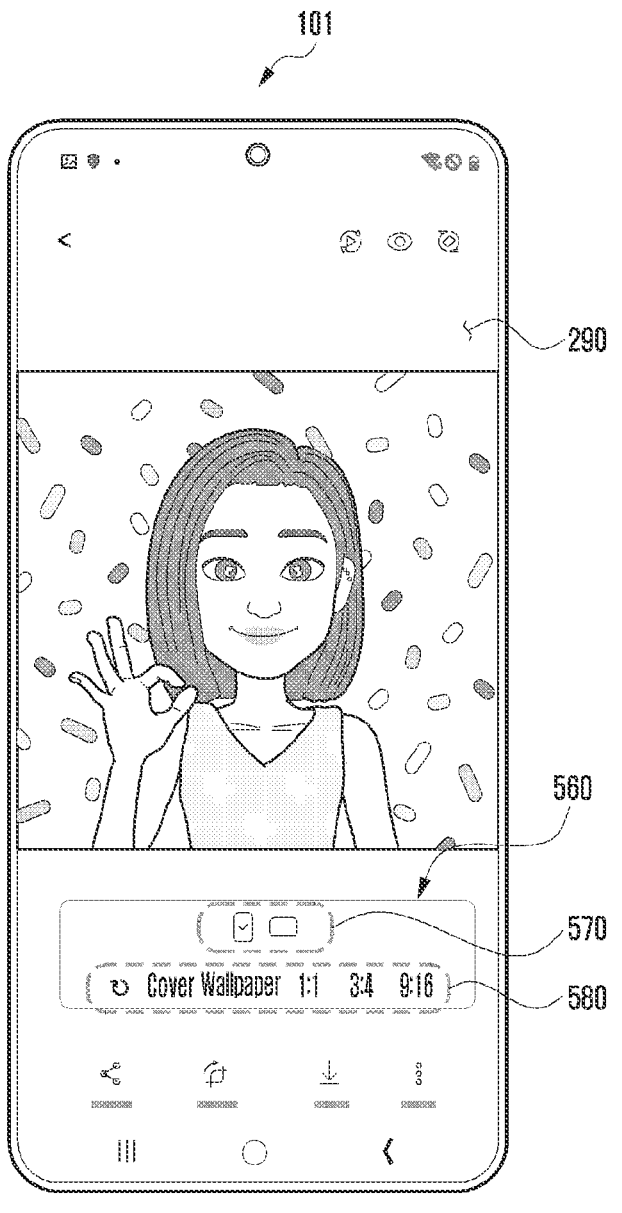

FIGS. 5A, 5B, and 5C are diagrams illustrating examples in which the electronic device supports image configurations according to various embodiments.

According to an embodiment, FIG. 4 illustrates an example of a method by which the electronic device 101 supports a configuration of an image to fit the display size of the electronic device 101 according to various embodiments. According to an embodiment, FIGS. 5A, 5B, and 5C are diagrams illustrating screen examples related to an operation of supporting a configuration of an image (for example, a configuration of wallpaper and/or a lock screen) to fit the display size of the electronic device 101.

The method of supporting the image configuration may be performed by an electronic device (for example, the electronic device 101 of FIG. 1 or 2) according to the flowchart illustrated in FIG. 4 according to an embodiment of the disclosure. The flowchart illustrated in FIG. 4 is merely an example according to an embodiment of the operation of the electronic device 101, and the order of at least some operations may be changed or performed in parallel or performed as independent operations, or at least some other operations may be performed to compensate for at least some operations. According to an embodiment of the disclosure, operation 401 to operation 411 may be performed by at least one processor, individually and/or collectively (for example, the processor 120 of FIG. 1 or 2), of the electronic device 101.

As illustrated in FIG. 4, the method performed by the electronic device 101 according to an embodiment may include operation 401 of detecting execution of an application, operation 403 of displaying an image designated by the user on the display, operation 405 of detecting a user input related to a configuration of wallpaper, operation 407 of determining a display size of a display in which wallpaper is to be configured, operation 409 of editing (or modifying) an image in accordance with the display size, and operation 411 of configuring the edited image as wallpaper of the display.

Referring to FIG. 4, in operation 401, the processor 120 of the electronic device 101 may detect execution of the application. According to an embodiment, the user may make a user input (for example, selecting an icon of the application) of instructing execution of the predetermined application (for example, a gallery application) to configure wallpaper by controlling (for example, user input) the electronic device 101. According to an embodiment, the processor 120 may execute the application (for example, the gallery application), based on a user input.

In operation 403, the processor 120 may perform an operation of displaying the image designated by the user on the display. According to an embodiment, the processor 120 may provide thumbnails related to an image stored in the memory 130 of the electronic device 101 and an image (for example, an image (for example, a recent image) having a higher priority according to the arrangement order of the thumbnails) related to one thumbnail according to the configuration of the electronic device 101 among the thumbnails through the display (for example, the display 290 of FIG. 2), based on the execution of the application. According to an embodiment, the predetermined image may include various formats of images (for example, still images (for example, joint photographic experts groups (JPEG) images, portable network graphics (PNG) images, and bitmap (BMP) images), animation images (for example, graphics interchange format (GIF) images and webp images), and various formats of videos (for example, moving picture experts group (MPEG)-4 (MP4) videos, audio visual interleave (AVI) videos, and Matroska multimedia container for video (MKV) videos. In an embodiment, the image is not limited to the above-described formats.

According to an embodiment, the user may make a user input of selecting a thumbnail of the image to be edited from among the thumbnails. For example, the user may select a thumbnail of an image to be edited (or modified) in accordance with the display of the electronic device 101. According to an embodiment, the user may store the image edited to fit the display of the electronic device 101, share the image with another user, and/or configure the image as wallpaper of the electronic device 101. According to an embodiment, the processor 120 may control the display to display an image of a thumbnail designated (or selected) according to the user input. The example thereof is illustrated in FIG. 5A.

According to an embodiment, FIG. 5A illustrates an example of an execution screen of the gallery application after the gallery application is executed in the electronic device 101. As illustrated in FIG. 5A, thumbnails 520 (or a thumbnail list) of the image stored in the memory 130 of the electronic device 101 and an image 510 corresponding to a thumbnail 530 selected by the user from among the thumbnails 520 may be provided on the display 290 of the electronic device 101.

In operation 405, the processor 120 may perform an operation of detecting a user input related to editing of the image. According to an embodiment, the processor 120 may receive a user input of performing an operation of editing the displayed image in accordance with the display. The example thereof is illustrated in FIG. 5B.

According to an embodiment, FIG. 5B illustrates an example of a relevant screen provided in response to the user input of allowing the electronic device 101 to edit an image (for example, the image 510 of FIG. 5A). As illustrated in FIG. 5B, a menu 540 for selecting (or performing) a function which can be performed based on the predetermined image (for example, the image 510 of FIG. 5A) may be provided on the execution screen (for example, the execution screen of FIG. 5A) displayed on the display 290 of the electronic device 101. According to an embodiment, the menu 540 may include predetermined objects (for example, text and/or icons) related to a first function (for example, Details) of providing detailed information related to the image, a second function (for example, Remaster GIF) of calibrating the quality of the image, a third function (for example, Set as wallpaper) of configuring wallpaper based on the image, a fourth function (for example, Move to Secure Folder) of moving a storage path of the image (for example, moving to a secure folder), and/or a fifth function (for example, Print) of printing the image. In an embodiment, the menu 540 may be provided through a pop-up window. According to an embodiment, the pop-up window for the menu 540 may be provided in an overlapping, overlaying, or superimposing manner on the execution screen.

According to an embodiment, the user may make a user input of selecting (for example, touching) an object 550 related to the function (for example, the third function) of editing the currently displayed image (for example, the image 510 of FIG. 5A) in accordance with display and configuring the same as wallpaper, based on the menu 540. According to an embodiment, the processor 120 may perform the operation of editing the displayed image in accordance with the display, based on a user input of selecting the object 550 in the menu 540.

In operation 407, the processor 120 may perform an operation of determining a display size of the display on which the image is to be provided (or displayed). For example, the processor 120 may determine the display size of the display in which the image is to be configured as wallpaper. According to an embodiment, the processor 120 may perform an operation of automatically and/or manually determining the display size according to the configuration of the electronic device 101. According to an embodiment, the processor 120 may identify the display size designated for each of all the displays (for example, the main display and the cover displays) configured according to the form factor of the electronic device 101.

According to an embodiment, the processor 120 may identify the predetermined display size of one predefined display (for example, the main display or the cover display) related to displaying of the image (for example, configuring of wallpaper) among all displays. According to an embodiment, the processor 120 may identify the predetermined display size of the display (for example, the main display or the cover display) currently being operated. According to an embodiment, the processor 120 may receive a user input based on the menu for selecting the display to display the image (for example, configure wallpaper based on the image) and identify the display size of the display corresponding to the user input. According to an embodiment, an example of identifying the display size, based on a user input, is illustrated in FIG. 5C.

According to an embodiment, FIG. 5C illustrates an example of a relevant screen in which the electronic device 101 supports selection of a display to display an image, a display mode, and/or a display size. As illustrated in FIG. 5C, a menu 560 for selecting (or executing) an option related to editing of an image such as an operation mode (for example, a portrait mode or a landscape mode) of a display to display a predetermined image (for example, the image 510 of FIG. 5D), a display (for example, cover or wallpaper) to display an image, an aspect ratio (or a resolution) of an image to be displayed (for example, 1:1, 3:4, 9:16, or Full) may be provided on the display 290.

According to an embodiment, the menu 560 may include a first sub menu 570 related to a configuration of the operation mode (for example, the portrait mode or the landscape mode) of the display (for example, cover or wallpaper) to display the image and/or a second sub menu 580 related to a configuration of the aspect ratio (for example, 1:1, 3:4, 9:16, or Full) of the image to be displayed. In an embodiment, the menu 560 may be provided in place of thumbnails, based on an area in which the thumbnails (for example, the thumbnails 520 of FIG. 5A) are provided.

According to an embodiment, the user may select at least one object (for example, text and/or icon) of the option related to editing based on the currently displayed image (for example, the image 510 of FIG. 5A), based on the menu 560. According to an embodiment, the user may select an object (for example, a vertical shape icon or a horizontal shape icon) of the operation mode for displaying the image, select a display (for example, cover text or wallpaper text) to display the image, and/or make a user input of selecting (for example, touching) an aspect ratio (or a resolution) of the image (for example, 1:1 text, 3:4 text, 9:16 text, or Full text). According to an embodiment, the processor 120 may perform an operation of determining the display size of the display to display the image, based on a user input of selecting at least one object in the menu 560.

According to an embodiment, although not illustrated, the electronic device 101 may provide a screen for configuring the option for image editing, including an interface related to a function (for example, an image improvement function (for example, a remaster function) of improving the quality of the predetermined image (for example, revising the quality) as illustrated in FIG. 5C. For example, the image improvement function (for example, the remaster function) may indicate a function of automatically analyzing and revising a resolution, brightness, a color, definition, backlight, and/or shaking of the image through AI in the electronic device 101.

In operation 409, the processor 120 may perform an operation of editing the image in accordance with the display size. According to an embodiment, the processor 120 may separate the main object from background objects in the image. According to an embodiment, the processor 120 may edit (for example, resize) the main object of the image in accordance with the display size. According to an embodiment, the processor 120 may edit (for example, outpaint, draw, or fill in) the background objects of the image in accordance with the display size. According to an embodiment, the processor 120 may further perform a calibration operation (for example, the image improvement function) for improving the quality of the image, based on the edited main object and background objects. According to an embodiment, the operation of editing the image in accordance with the display size is described with reference to the following drawings.

In operation 411, the processor 120 may perform an operation of providing the edited image. According to an embodiment, the processor 120 may display the edited image through a predetermined display, store the image edited to fit the predetermined display, transmit (for example, share) the edited image to at least one predetermined external device (for example, other electronic devices and/or cloud servers), and/or configuring the edited image as wallpaper of the predetermined display of the electronic device 101. According to an embodiment, the processor 120 may display an image (for example, the edited image) optimized for the display size of the predetermined display through the predetermined display and provide the image to the user. According to an embodiment, the processor 120 may configure the image (for example, the edited image) optimized for the display size of the predetermined display as wallpaper of the predetermined display and provide the image to the user. According to an embodiment, the processor 120 may perform an operation of storing the edited image in the memory 130 and, when storing the edited image in the memory 130, may perform an operation of mapping the edited image to wallpaper of the predetermined display and storing the image.

Figure 6:
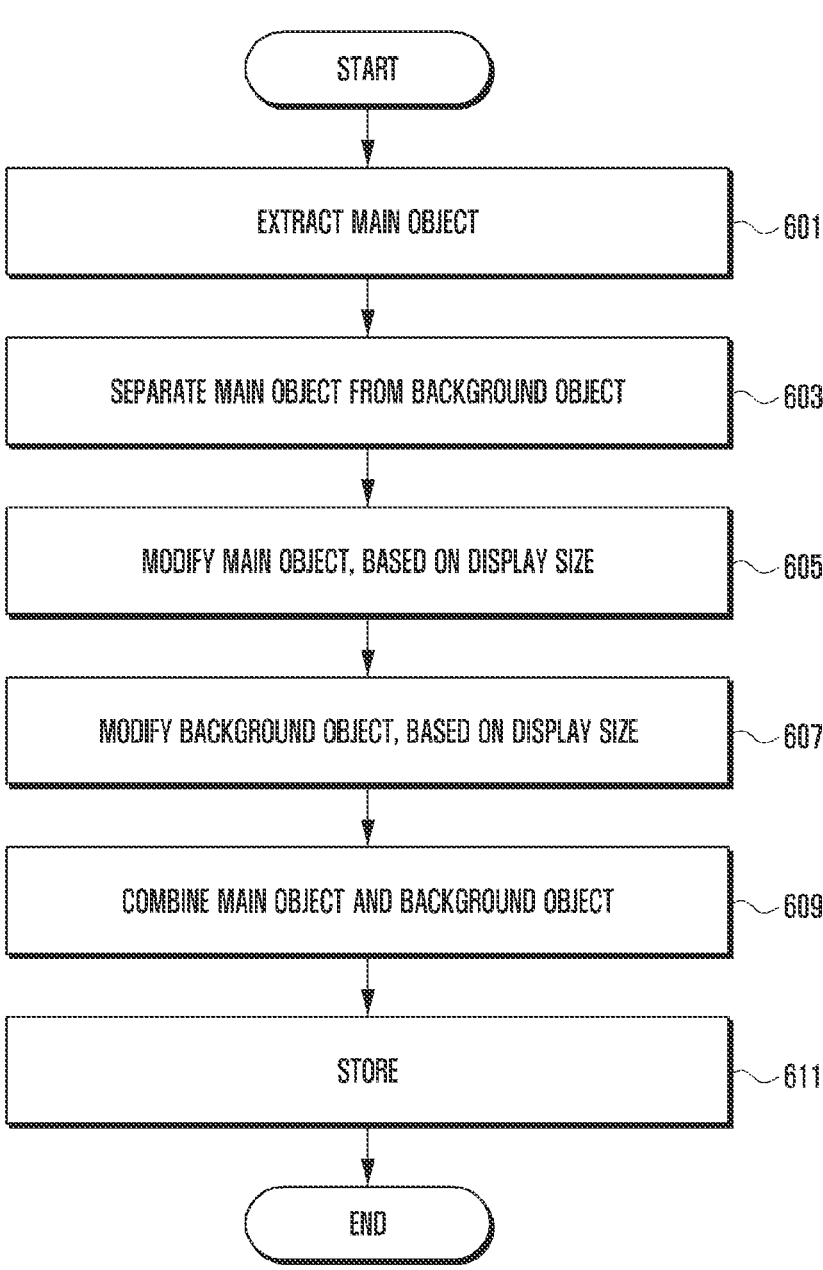
FIG. 6 is a flowchart illustrating an example method of operating the electronic device according to an various embodiments.

FIG. 6 is a flowchart illustrating an example method of operating the electronic device according to various embodiments.

According to an embodiment, FIG. 6 illustrates an example of a method by which the electronic device 101 supports a configuration of wallpaper in accordance with the display size of the electronic device 101 according to an embodiment. According to an embodiment, FIG. 6 illustrates an example of a method by which the electronic device 101 edits an image in accordance with the display size of the predetermined display in order to configure wallpaper.

The method by which the electronic device 101 supports the configuration of wallpaper according to an embodiment of the disclosure may be performed according to, for example, the flowchart illustrated in FIG. 6. The flowchart illustrated in FIG. 6 is merely an example according to an embodiment of the operation of the electronic device 101, and the order of at least some operations may be changed or performed in parallel or performed as independent operations, or at least some other operations may be performed to compensate for at least some operations. According to an embodiment of the disclosure, operation 601 to operation 611 may be performed by at least one processor, individually and/or collectively (for example, the processor 120 of FIG. 1 or 2), of the electronic device 101.

According to an embodiment, the operation described in FIG. 6 may be combined with, for example, the operations described in FIGS. 4 to 5C and heuristically performed or may be heuristically performed as a detailed operation of at least some operations of the described descriptions.

As illustrated in FIG. 6, the method performed by the electronic device 101 according to an embodiment may include operation 601 of extracting a main object, operation 603 of separating the main object from background objects, operation 605 of editing (e.g., modifying) the main object, based on a display size, operation 607 of editing (e.g., modifying) the background objects, based on the display size, operation 609 of combining the main object and the background objects, and operation 611 of storing the image.

Referring to FIG. 6, in operation 601, the processor 120 of the electronic device 101 may perform an operation of extracting a main object. According to an embodiment, the processor 120 may perform an operation of analyzing all image frames (for example, analyzing the quality and/or scene (for example, the outdoors, foods, things, or people)) of the image (for example, the image 510 of FIG. 5A). According to an embodiment, the processor 120 may extract the main object (for example, an anchoring object) from all image frames of the image during the analyzing operation. According to an embodiment, the processor 120 may select the main object, based on at least one predetermined image processing technology (for example, object detection and/or saliency object detection). According to an embodiment, in the method of selecting the main object, for example, when there are various objects in the given image, a condition satisfying a predetermined condition rather than all objects may be selected as the main object. For example, there are various objects in the image, plants or trees in the background are objects but may have difficulty in being classified as the main object. Accordingly, when selecting the main object, the processor 120 may select the main object, based on the object detection and/or saliency object detection technology using machine learning (ML) based on AI.

According to an embodiment, various types of objects may be defined based on the object detection technology. For example, and without limitation, various types of objects such as 'car', 'motorcycle', 'bus', 'truck', 'traffic light', 'stop sign', 'parking meter', 'bench', 'bird', 'cat', 'dog', 'horse', 'sheep', 'cow', 'elephant', 'bear', 'zebra', 'giraffe', 'backpack', 'umbrella', 'handbag', 'tie', 'suitcase', 'frisbee', 'skis', 'snowboard', 'sports ball', 'kite', 'baseball bat', 'baseball glove', 'tennis racket', 'bottle', 'wine glass', 'cup', 'fork', 'knife', 'spoon', 'bowl', 'banana', 'sandwich', 'broccoli', 'carrot', 'pizza', 'donut', 'cake', 'couch', 'bed', 'dining table', 'toilet', 'tv', 'mouse', 'keyboard', 'person', 'microwave', 'oven', 'toaster', 'sink', 'refrigerator', 'book', 'clock', 'vase', 'scissors', 'teddy bear', 'hair drier', 'toothbrush', 'bicycle', 'airplane', 'train', 'boat', 'fire hydrant', 'skateboard', 'apple', 'orange', 'hot dog', 'chair', 'potted plant', 'laptop', 'remote', 'cell phone', 'surfboard', or the like, may be defined based on the object detection technology.

Accordingly, the electronic device 101 may predetermine which type of object is selected from among the various types of objects and store the determined object, and/or may pre-designate a type of object to be selected by the user. For example, types of main objects mainly used by the user may include 'person', 'car', 'airplane', 'cat', 'dog', 'sheep', 'cow', 'elephant', 'bear', 'zebra', 'giraffe', 'sports ball', 'kite', 'baseball glove', 'apple', 'cell phone', 'bicycle', 'bird', 'horse', 'frisbee', 'baseball bat', and 'orange', the designated (or selected) objects may be selected as the main object.

According to an embodiment, the saliency object detection technology may indicate a technology for finding objects in which the user is interested (for example, objects in interest) in the image. For example, a machine learning model may be learned by receiving an input of various users' eyes, spaces where the user frequently stays, and/or information that the user considers important, and the main object may be selected based on objects corresponding to the learning.

According to an embodiment, the main object may be selected based on the object size, a color change and motion of the object, and/or user intervention in addition to a main object selection method based on the object detection and/or saliency object detection technology In an embodiment, in a scheme using the object size, a ratio of the object in the image may indicate a scheme of determining importance of the object. For example, in the scheme using the object size, whether the number of pixels of the object detected in the image is larger than about p % (for example, p is a natural number) of the number of entire pixels may be used for selecting the corresponding object as the main object. For example, about p % may be selected as about 10%.

In an embodiment, in a scheme using the color change and motion of the object, the case in which the color change of the object in each image frame of the image is about α% (for example, α is a natural number) or more or when the location of the object moves by β pixels (for example, β is a natural number) or more may indicate a scheme of selecting the main object.

In an embodiment, in a selection scheme based on user intervention, the case in which an error in selection of the main object occurs in the above-described automation scheme (for example, the scheme based on object detection, center object detection, object size, and/or color change and motion of the object) may indicate a scheme of receiving direct designation of the main object from the user.

In operation 603, the processor 120 may perform an operation of separating the main object from background objects. According to an embodiment, when the main object is determined in the image, the processor 120 may identify the remaining objects except for the main object as background objects in the image. According to an embodiment, the processor 120 may separate the main object extracted from the image and the identified background objects as objects independent from each other.

In operation 605, the processor 120 may perform an operation of editing the main object, based on the display size. According to an embodiment, the processor 120 may perform an operation of resizing the main object to a predetermined size in accordance with the display size (for example, controlling (for example, increasing or decreasing) the size of the main object) and/or controlling the location of the main object in accordance with the display size. For example, the processor 120 may resize the main object to fit the display so that the main object is not cut. According to an embodiment, the operation of editing the main object in accordance with the display size is described with reference to the following drawings.

In operation 607, the processor 120 may perform an operation of editing the background objects, based on the display size. According to an embodiment, the processor 120 may perform an operation of drawing and/or filling in the background objects in accordance with the display size. For example, the processor 120 may fill background objects in areas other than the main object in the image in accordance with the display size. According to an embodiment, the operation of editing the background objects in accordance with the display size is described with reference to the following drawings.

In operation 609, the processor 120 may perform an operation of combining the main object and the background objects. According to an embodiment, the processor 120 may perform an operation of editing the image and combining the edited main object and background objects (for example, object capturing (or object segmentation)) as illustrated in FIG. 6. For example, the processor 120 may separate the main object from the background objects in the image, independently edit the main object and the background objects, and combine again the edited main object and the edited background objects.

In operation 611, the processor 120 may perform an operation of storing the image. According to an embodiment, the processor 120 may store a new image (for example, an image edited to fit the display size) in which the edited main object and the edited background objects are combined in the memory 130. According to an embodiment, when storing the edited image, the processor 120 may execute an image improvement function (for example, execute a remaster function) to calibrate the image (for example, calibrate the resolution and/or the quality) and store the calibrated image.

Figure 7:
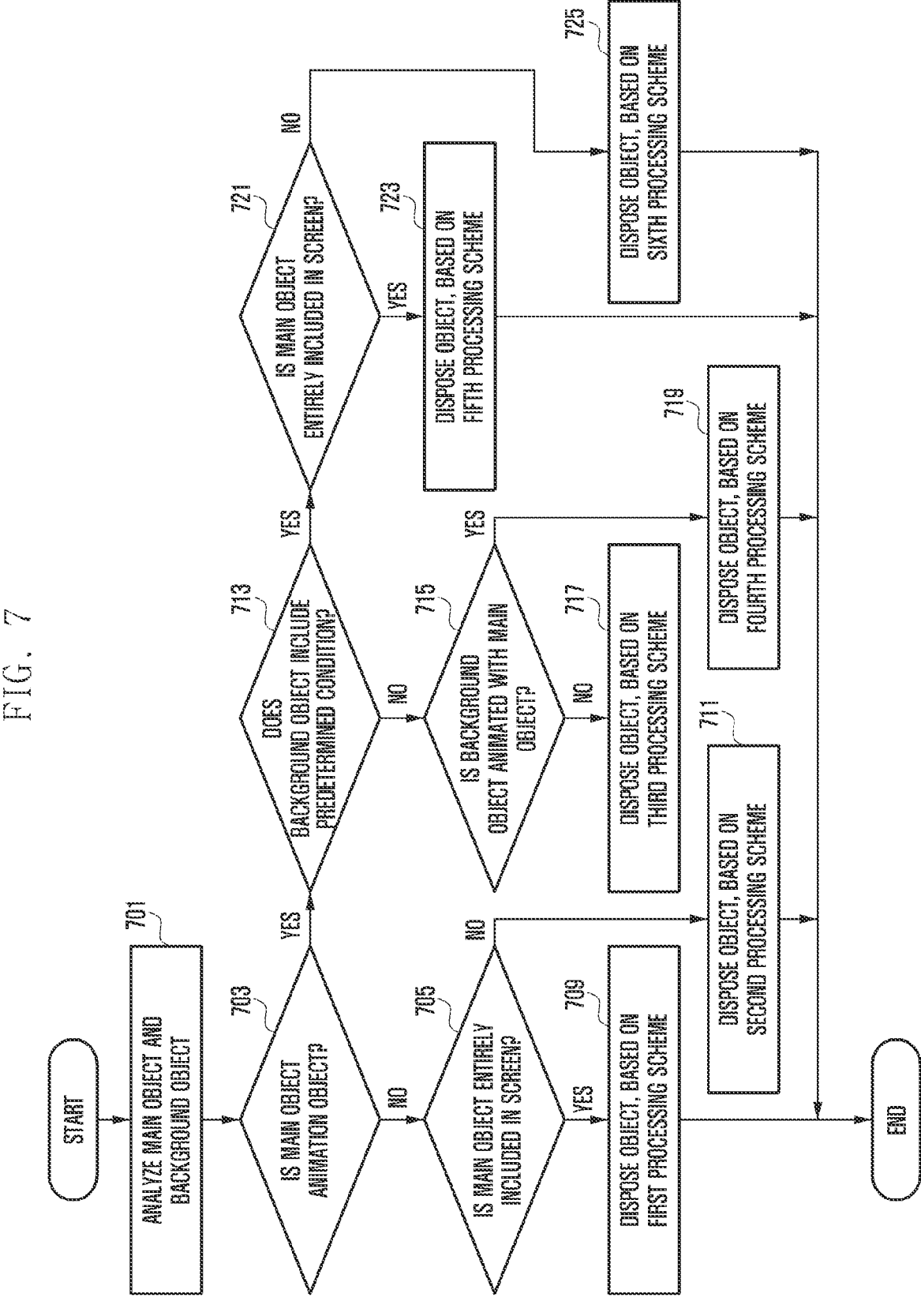
FIG. 7 is a flowchart illustrating an example method of operating the electronic device according to various embodiments.

FIG. 7 is a flowchart illustrating an example method of operating the electronic device according to various embodiments.

According to an embodiment, FIG. 7 illustrates an example of a method by which the electronic device 101 supports a configuration of background objects in accordance with the display size of the electronic device 101. According to an embodiment, FIG. 7 illustrates an example of a method by which the electronic device 101 edits an image in accordance with a display size of a predetermined display to configure wallpaper.

The method which the electronic device 101 supports the configuration of background objects according to an embodiment of the disclosure may be performed, for example, according to the flowchart illustrated in FIG. 7. The flowchart illustrated in FIG. 7 is merely an example according to an embodiment of the operation of the electronic device 101, and the order of at least some operations may be changed or performed in parallel or performed as independent operations, or at least some other operations may be performed to compensate for at least some operations. According to an embodiment, operation 701 to operation 725 may be performed by at least one processor (for example, the processor 120 of FIG. 1 or 2) of the electronic device 101.

According to an embodiment, the operation described in FIG. 7 may be combined with, for example, the operations described in FIGS. 4 to 6 and heuristically performed or may be heuristically performed as a detailed operation of at least some operations of the described descriptions.

As illustrated in FIG. 7, the operation method performed by the electronic device 101 according to an embodiment may include operation 701 of analyzing a main object and background objects, operation 703 of determining whether the main object is an animation object, operation 705 of determining whether the entire main object is included in the screen when the main object is not the animation object, operation 709 of processing disposition of objects, based on a first processing scheme when the entire main object is included in the screen, operation 711 of processing disposition of objects, based on a second processing scheme when the entire main object is not included in the screen, operation 713 of determining whether the background objects include a predetermined condition when the main object is the animation object, operation 715 of determining whether the background objects are animated with the main object when the background objects do not include the predetermined condition, operation 717 of processing disposition of objects, based on a third processing scheme when the background objects are not animated with the main object, operation 719 of processing disposition of objects, based on a fourth processing scheme when the background objects are animated with the main object, operation 721 of determining whether the entire main object is included in the screen when the background objects include a predetermined condition, operation 723 of processing disposition of the object, based on a fifth processing scheme when the entire main object is included in the screen, and operation 725 of processing disposition of the object, based on a sixth processing scheme when the entire main objects is not included in the screen.

Referring to FIG. 7, in operation 701, the processor 120 of the electronic device 101 may perform an operation of analyzing the main object and the background objects. According to an embodiment, the processor 120 may perform an operation of first analyzing all image frames (for example, analyzing the quality and/or scene (for example, the outdoors, foods, things, or people)) of the image. According to an embodiment, the processor 120 may perform an operation of distinguishing and separating the main object and the background objects in all image frames of the image during the analyzing operation. According to an embodiment, the processor 120 may separate the main object from the background objects, based on various image processing technologies for extracting the main object as described above. According to an embodiment, the processor 120 may individually analyze the separated main object and background objects. For example, the processor 120 may analyze objects for the image to determine sizes of objects, locations, whether there is a background, whether there motion of the objects (for example, whether animation exists), colors of the objects, and/or patterns of the objects.

In operation 703, the processor 120 may perform an operation of determining whether the main object is an animation object. According to an embodiment, the processor 120 may determine whether the main object extracted from the given image is an animation object which provides animation moving based on a plurality of image frames.

When the main object is not the animation object in operation 703 (for example, 'No' of operation 703), the processor 120 may perform an operation of determining whether the entire main object is included in the screen in operation 705. According to an embodiment, the processor 120 may determine whether the entire main object is shown through (or included in) the screen according to a predetermined display size. According to an embodiment, the processor 120 may determine whether at least a part of the main object is aligned with an edge of the screen (for example, at least one of the top, bottom, left, and right sides of the screen) according to the edge detection based on the main object.

According to an embodiment, when a pixel coordinate of the main object is in contact with the edge of the screen, the processor 120 may determine that the entire main object is not included in the screen and the main object is cut. According to an embodiment, when the pixel coordinate of the main object is not in contact with the edge of the screen, the processor 120 may determine that the entire main object is included in the screen. According to an embodiment, when a predetermined distance 'α' (for example, α is about 3 pixels by default) is configured and a boundary (or edge) of the image exists within the predetermined 'α' distance, the processor 120 may determine that the main object is a cut image. For example, when the image is an image having the height of about 180 pixels and a y coordinate of the pixels of the main object corresponds to about 179 pixels, it may be determined that the main object is cut. According to an embodiment, the operation of determining whether the entire main object is included in the screen will be described with reference to the following drawings.

When the entire main object is included in the screen in operation 705 (for example, 'Yes' of operation 705), the processor 120 may perform an operation of processing disposition of the object, based on a first processing scheme in operation 709. In an embodiment, the first processing scheme may include a processing scheme of designating the location of the main object to the center of the screen. For example, the processor 120 may position the main object at the center of the screen (for example, the center of the screen according to the display size), based on determination by the first processing scheme.

When the entire main object is not included in the screen in operation 705 (for example, 'No' of operation 705), an operation of processing disposition of the object, based on a second processing scheme may be performed in operation 711. In an embodiment, the second processing scheme may include a processing scheme of aligning the main object, based on the side on which the main object is in contact with the edge of the screen. For example, when the main object is aligned or cut based one least one side of the screen, the processor 120 may position the main object to be aligned with the cross section with which the main object is in contact, based on determination of the second processing scheme.

When the main object is the animation object in operation 703 (for example, 'Yes' of operation 703), the processor 120 may perform an operation of determining whether the background objects include a predetermined condition in operation 713. In an embodiment, the predetermined condition may include a condition in which the background objects have feature points such as a predetermined color and/or pattern. According to an embodiment, the processor 120 may determine whether the backgrounds are objects included in the predetermined condition, based on whether the background objects have the predetermined color or pattern.

When the background objects do not include the predetermined condition (for example, 'No' of operation 713) in operation 713, the processor 120 may perform an operation of determining whether the background objects and the main object are together animated in operation 715. According to an embodiment, the processor 120 may determine whether the background objects extracted from the given image are animation objects which provide animation moving based on a plurality of image frames.

When the background objects and the main object are not together animated in operation 717 (for example, 'No' of operation 715), the processor 120 may perform an operation of processing disposition of the object, based on a third processing scheme in operation 717. In an embodiment, the third processing scheme may include a processing scheme designating the location of the main object. For example, the third processing scheme may correspond to the first processing scheme or the second processing scheme. According to an embodiment, when the background objects do not include the predetermined condition and the background objects and the main object are not together animated, the processor 120 may determine that there is no background and operate to designate only the location of the main object.

When the background objects and the main object are together animated in operation 715 (for example, 'Yes' of operation 715), the processor 120 may perform an operation of processing disposition of the object, based on a fourth processing scheme in operation 719. In an embodiment, the fourth processing scheme may include a processing scheme of filling the image in the entire screen of the display size by processing the image including the main object and the background objects according to a predetermined image processing technology (for example, outpainting technology). According to an embodiment, the processor 120 may perform image processing for filling the entire image according to the display size through the outpainting technology. In an embodiment, the outpainting technology may include an AI-based (for example, deep learning-based) image generation technology for completing a new image by filling the outside of the image, based on the given image (for example, the original image).

When the background objects include the predetermined condition in operation 713 (for example, 'Yes' of operation 713), the processor 120 may perform an operation of determining whether the entire main object is included in the screen in operation 721. According to an embodiment, the processor 120 may determine whether the entire main object is shown through (or included in) the screen according to a predetermined display size. According to an embodiment, the processor 120 may determine whether at least a part of the main object is aligned with an edge of the screen (for example, at least one of the top, bottom, left, and right sides of the screen) according to the edge detection based on the main object. According to an embodiment, when the pixel coordinate of the main object is in contact with the edge of the screen, the processor 120 may determine that the entire main object is not included in the screen and the main object is cut. According to an embodiment, when the pixel coordinate of the main object is not in contact with the edge of the screen, the processor 120 may determine that the entire main object is included in the screen. According to an embodiment, the operation of determining whether the entire main object is included in the screen will be described with reference to the following drawings.

When the entire main object is included in the screen in operation 721 (for example, 'Yes' of operation 721), the processor 120 may perform an operation of processing disposition of the object, based on a fifth processing scheme in operation 723. In an embodiment, the fifth processing scheme may include a processing scheme of processing the main object and the background objects together. For example, the processor 120 may position the main object at the center of the screen (for example, the center of the screen according to the display size), based on determination by the fifth processing scheme and control (for example, outpaint, draw, or fill in) colors and patterns of the background objects to fit the display size in areas except for the main object, based on the location of the main object.

When the entire main object is not included in the screen in operation 721 ('No' of operation 721), the processor 120 may perform an operation of processing disposition of the object, based on a sixth processing scheme in operation 725. In an embodiment, the sixth processing scheme may include a processing scheme of processing the main object and the background objects together. For example, when the main object is aligned or cut based one least one side of the screen, the processor 120 may position the main object to be aligned with the cross section with which the main object is in contact, based on determination of the sixth processing scheme and control (for example, outpaint, draw, or fill in) colors and patterns of background objects in areas except for the main object, based on the location of the main object, in accordance with the display size.

Figure 8A:
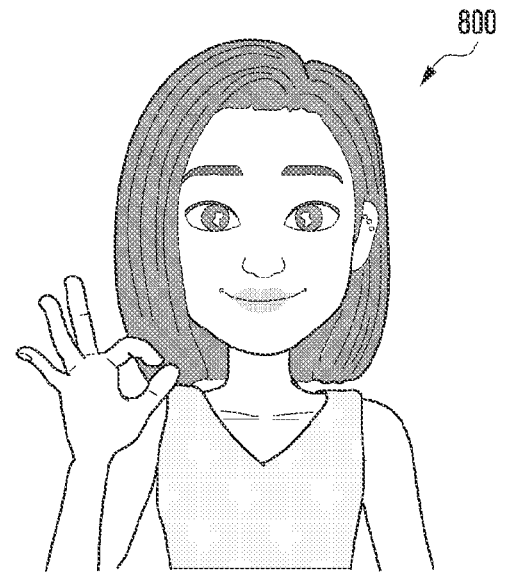
FIGS. 8A. 8B, 8C, 8D, and 8E are diagrams illustrating examples in which the electronic device provides wallpaper according to a display size according to various embodiments.

FIGS. 8A. 8B, 8C, 8D, and 8E are diagrams illustrating examples in which the electronic device provides wallpaper according to a display size according to various embodiments.

In an embodiment, FIG. 8A illustrates an example of a main object 800 extracted from the image. For example, FIG. 8A illustrates an example of the main object 800 separated from background objects in the image. In an embodiment, the main object 800 may be a moving animation object in an example. In an embodiment, the main object 800 may be an object aligned or cut based on at least a partial cross section (for example, the bottom surface) of the screen.

Figure 8B:
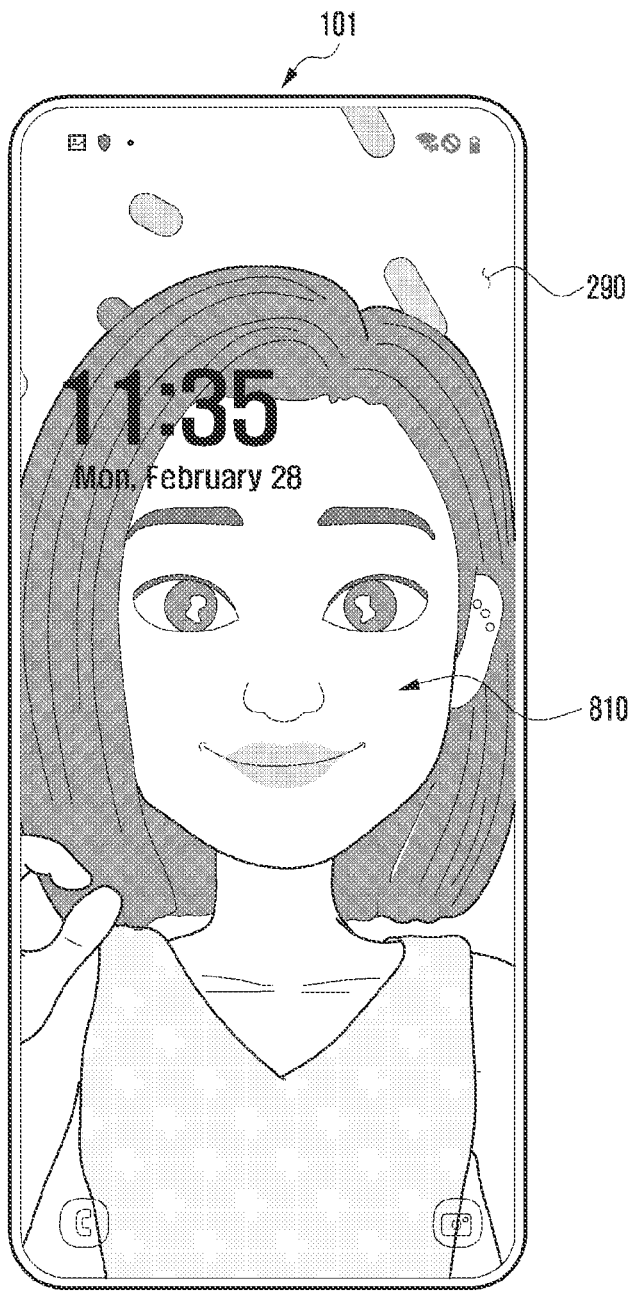

In an embodiment, FIG. 8B illustrates an example of a screen on which wallpaper is configured in a lock screen of the electronic device 101 according to the existing scheme. As illustrated in FIG. 8B, the main object 800 is simply resized according to a height value of the display in the existing scheme, and thus a motion (or animation) operation of the resized main object 810 may be cut and not shown well.

Figure 8C:
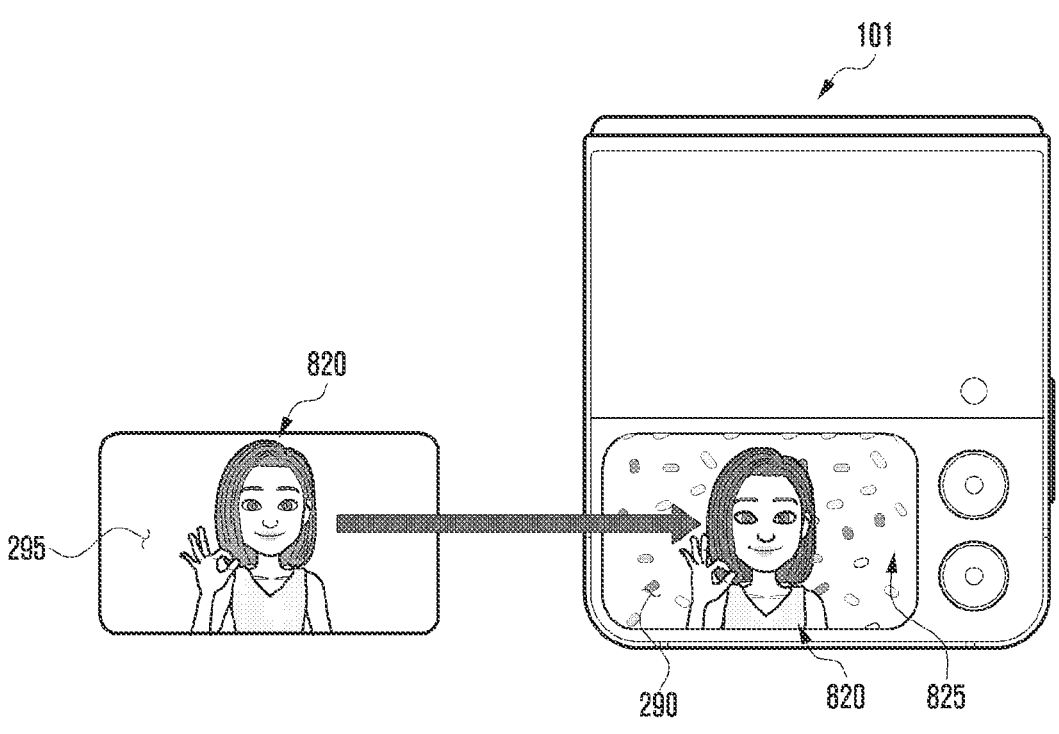
Figure 8D:
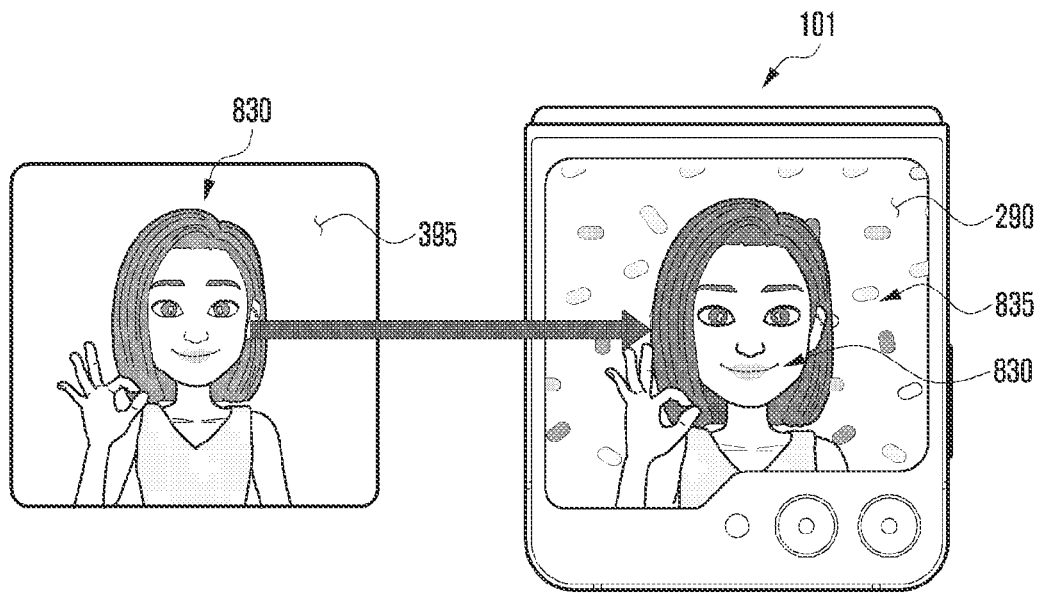
Figure 8E:
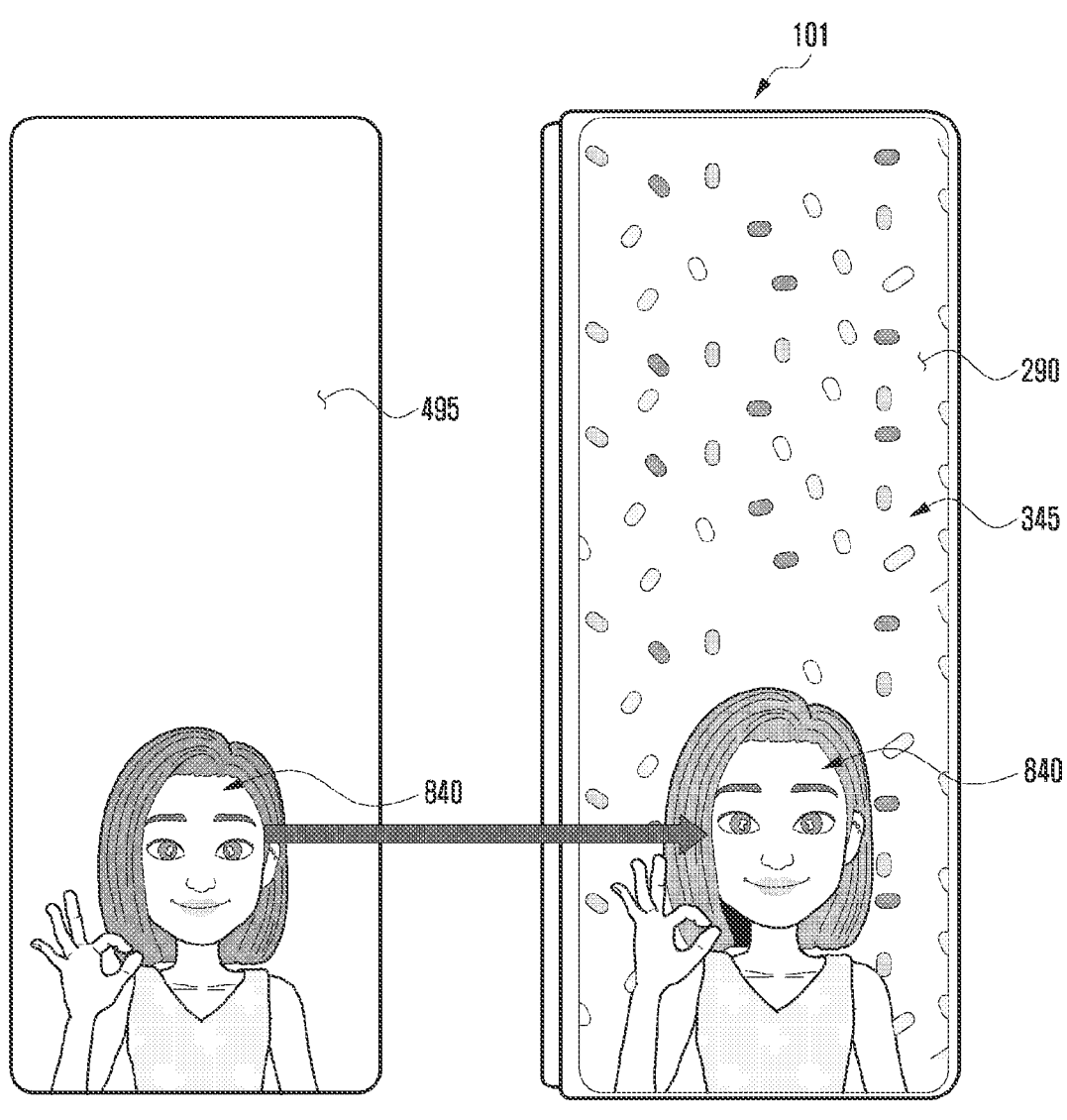

In an embodiment, FIGS. 8C, 8D, and 8E illustrate examples of a screen in which wallpaper is configured in the electronic device 101 in accordance with a display size according to an embodiment of the disclosure. According to an embodiment, FIGS. 8C, 8D, and 8E illustrate examples in which the main object 800 is resized in accordance with the display size in the electronic device 101 having different display sizes and resized main objects 820, 830, and 840 are aligned with the cross section (for example, bottom side) of the display 290. For example, in FIGS. 8C, 8D, and 8E, elements 295, 395, and 495 may indicate display areas 295, 395, and 495 having different sizes in which wallpaper can be displayed through the display 290 having different display sizes according to the form factor of the electronic device 101. For example, as illustrated FIGS. 8C, 8D, and 8E, sizes of the display areas 295, 395, and 495 for displaying wallpaper may be different in accordance with the display sizes.

Referring to FIG. 8C, the electronic device 101 may resize and dispose the main object 800 extracted from the image in accordance with a first display size. According to an embodiment, unlike the example of FIG. 8B, a motion (or animation) operation of the main object 820 resized and disposed in accordance with the display size may be all displayed within the display area 295. According to an embodiment, in the display area 295 of the wallpaper of the display 290, the electronic device 101 may fill the remaining areas except for the resized main object 820 with background objects 825 and provide wallpaper optimized for the first display size.

Referring to FIG. 8D, the electronic device 101 may resize and dispose the main object 800 extracted from the image in accordance with a second display size. According to an embodiment, unlike the example of FIG. 8B, a motion (or animation) operation of the main object 830 resized and disposed in accordance with the display size may be all displayed within the display area 395. According to an embodiment, in the display area 395 of the wallpaper of the display 290, the electronic device 101 may fill the remaining areas except for the resized main object 830 with background objects 835 and provide wallpaper optimized for the second display size.

Referring to FIG. 8E, the electronic device 101 may resize and dispose the main object 800 extracted from the image in accordance with a third display size. According to an embodiment, unlike the example of FIG. 8B, a motion (or animation) operation of the main object 840 resized and disposed in accordance with the display size may be all displayed within the display area 495. According to an embodiment, in the display area 495 of the wallpaper of the display 290, the electronic device 101 may fill the remaining areas except for the resized main object 840 with background objects 845 and provide wallpaper optimized for the third display size.

FIGS. 9A, 9B, 9C, and 9D are diagrams illustrating examples in which the electronic device provides wallpaper according to a display size according to various embodiments.

Figure 9A:
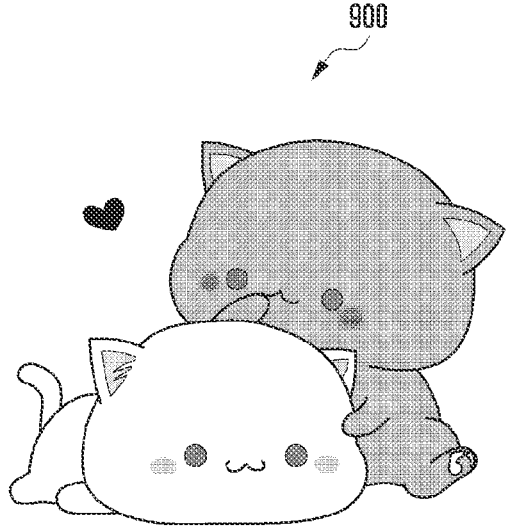
FIGS. 9A, 9B, 9C and 9D are diagrams illustrating examples in which the electronic device provides wallpaper according to a display size according to various embodiments.

In an embodiment, FIG. 9A illustrates an example of a main object 900 extracted from the image. For example, FIG. 9A illustrates an example of the main object 900 separated from background objects in the image. In an embodiment, the main object 900 may be a moving animation object in an example. In an embodiment, the main object 900 may be an object which is entirely included in the screen in an example.

Figure 9B:
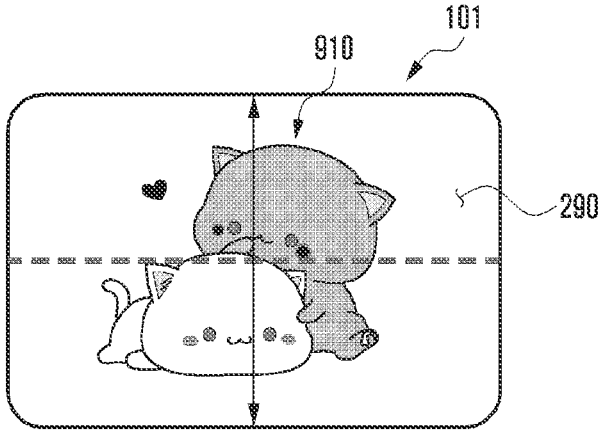
Figure 9C:
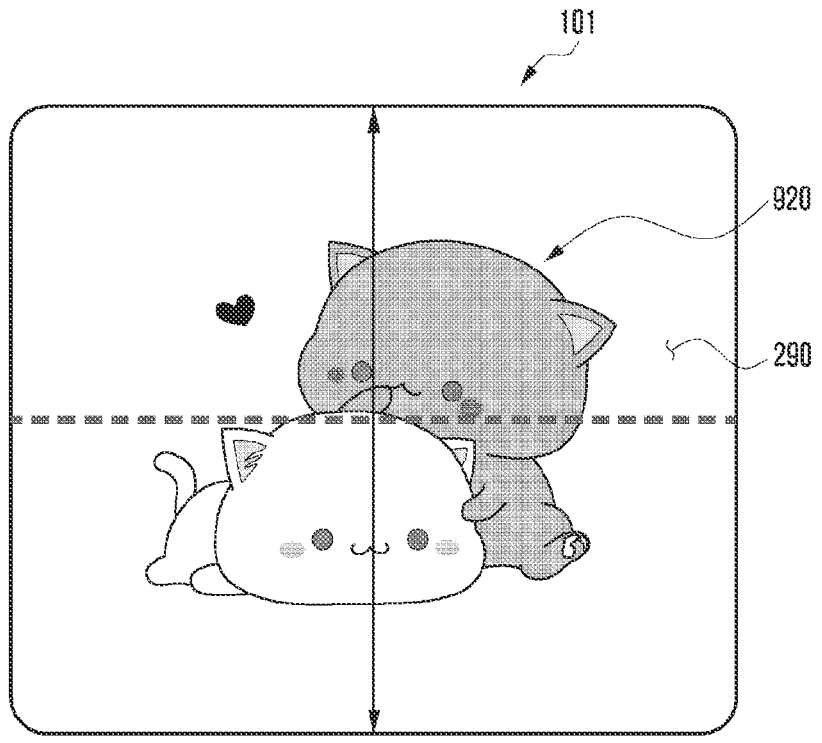
Figure 9D:
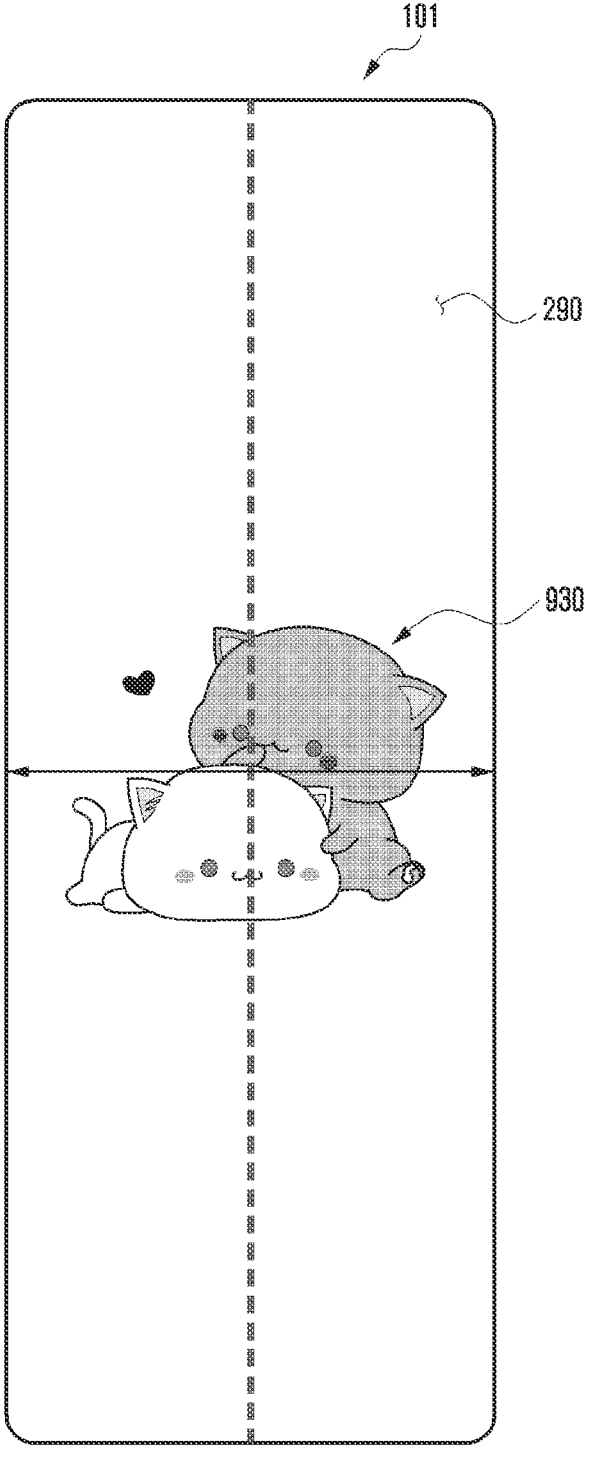

In an embodiment, FIGS. 9B, 9C, and 9D illustrate examples of a screen on which wallpaper is configured in the electronic device 101 in accordance with a display size according to an embodiment of the disclosure. According to an embodiment, FIGS. 9B, 9C, and 9D illustrates examples in which the main object 900 is resized in accordance with difference display sizes in the electronic device 101 having different display sizes and resized main objects 910, 920, and 930 are disposed at the center of the screen (for example, the center of the screen according to the display size) of different displays 290.

Referring to FIG. 9B, the electronic device 101 may resize the main object 900 extracted from the image in accordance with a first display size and dispose the resized main object 910 at the center of the screen according to the first display size. According to an embodiment, in the display area of wallpaper of the display 290, the electronic device 101 may fill the remaining areas except for the resized main object 910 with background objects and provide wallpaper optimized for the first display size.

Referring to FIG. 9C, the electronic device 101 may resize the main object 900 extracted from the image in accordance with a second display size and dispose the resized main object 920 at the center of the screen according to the second display size. According to an embodiment, in the display area of wallpaper of the display 290, the electronic device 101 may fill the remaining areas except for the resized main object 920 with background objects and provide wallpaper optimized for the second display size.

Referring to FIG. 9D, the electronic device 101 may resize the main object 900 extracted from the image in accordance with a third display size and dispose the resized main object 930 at the center of the screen according to the third display size. According to an embodiment, in the display area of wallpaper of the display 290, the electronic device 101 may fill the remaining areas except for the resized main object 930 with background objects and provide wallpaper optimized for the third display size.

Figure 10A:
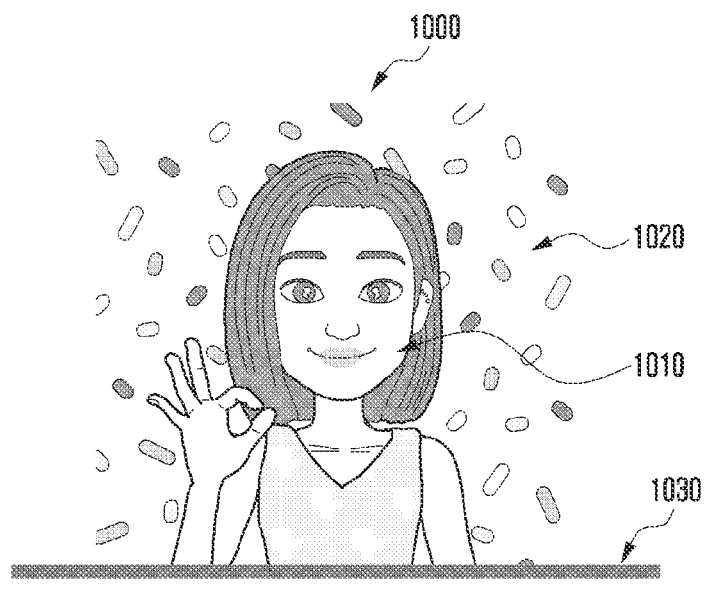
FIGS. 10A and 10B are diagrams illustrating examples in which the electronic device separates a main object from background objects in an image according to various embodiments.
Figure 10B:
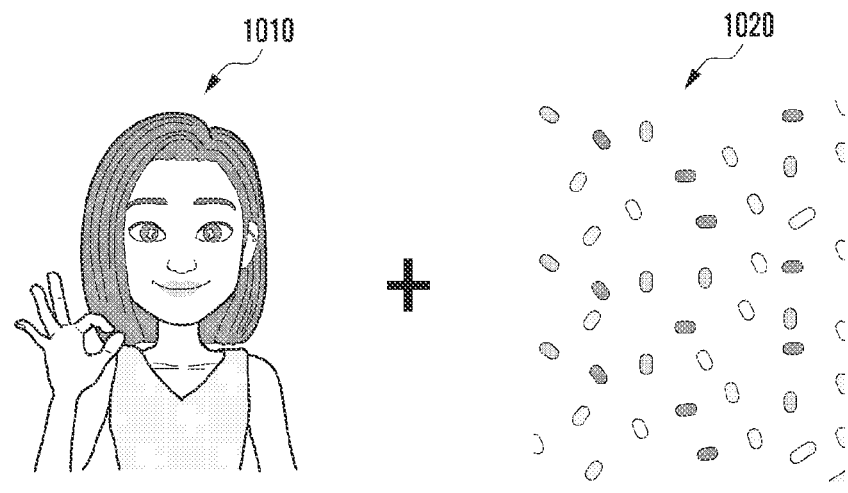

FIGS. 10A and 10B are diagrams illustrating examples in which the electronic device separates a main object from background objects in an image according to various embodiments.

According to an embodiment, FIG. 10B illustrates an example of an image 1000 including a main object 1010 and background objects 1020. According to an embodiment, FIG. 10A illustrates an example of the case in which the main object 1010 is not entirely included in the screen and the main object 1010 which is aligned or cut based on the cross section (for example, a bottom side 1030) of the screen is provided. For example, FIG. 10A illustrates an example of the case in which the main object 1010 moving in the image 1000 is aligned based on the bottom side 1030 and the main object 1010 is all not shown (for example, the case in which the main object 1010 is cut). In an embodiment, the state in which the main object 1010 is cut may be determined based on whether at least a part of the main object 1010 is aligned with an edge of the screen (for example, the bottom side 1030 of the screen) according to edge detection based on the main object 1010. For example, when a pixel coordinate of the main object 1010 is in contact with the edge of the screen, it may be defined as the case in which the main object 1010 is not entirely included in the screen and is cut. According to an embodiment, when a predetermined distance 'α' (for example, α is about 3 pixels by default) is configured and a boundary of the image exists within the predetermined 'α' distance from the pixels of the image, it may be defined that the main object 1010 is a cut image. For example, when a height of the image is about 180 pixels and a y coordinate of the pixel of the main object is about 179 pixels, it may be defined that the main object is in the cut state.

As illustrated in FIG. 10B, the main object 1010 may be extracted based on the cross section with which the main object 1010 is aligned and the main object 1010 may be separated from background objects 1020 in the image 1000. According to an embodiment, the main object 1010 may be separated from the background objects 1020 in the image 1000 and may be individually analyzed and edited. According to an embodiment, when the main object 1010 is determined in the image 1000, the electronic device 101 may distinguish the remaining objects except for the main object 1010 from the background objects 1020 in the image 1000. According to an embodiment, the electronic device 101 may separate the main object 1010 and the background objects 1020 as independent objects in the image 1000.

According to an embodiment, the electronic device 101 may edit the separated main object 1010 and background objects 1020 and combine the edited main object 1010 and the edited background objects 1020 using an object capture (or object segmentation) technology. For example, the electronic device 101 may separate the main object 1010 from the background objects 1020 in the image 1000, independently edit the objects, and combine back the edited main object 1010 and the edited background objects 1020.

Figure 11A:
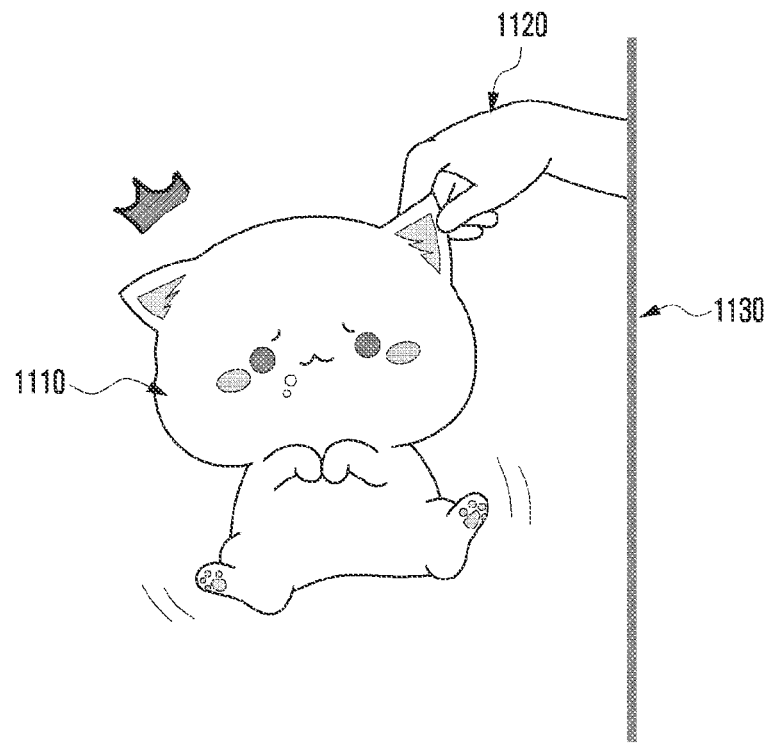
FIGS. 11A and 11B are diagrams illustrating examples in which the electronic device identifies an aligning state for a main object within the image according to various embodiments.
Figure 11B:
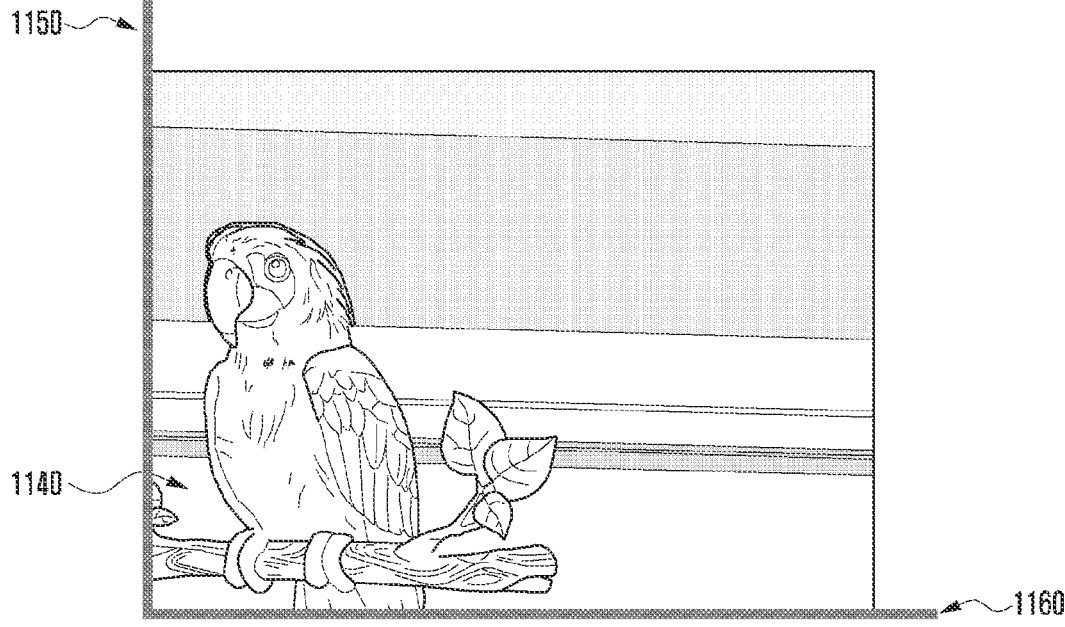

FIGS. 11A and 11B are diagrams illustrating examples in which the electronic device identifies an aligning state for a main object within the image according to according to various embodiments.

According to an embodiment, FIGS. 11A and 11B illustrate examples of an operation for determining whether the main object identified from the image is aligned based on the screen. For example, FIGS. 11A and 11B illustrate examples of a state in which at least a part of the moving main object is cut based on one or more of the top, bottom, left, and right cross sections.

According to an embodiment, FIG. 11A illustrates an example of the case in which a first object 1110 and a second object 1120 are selected as main objects, and at least a part of the main object (for example, the second object 1120) is not included in the screen and is aligned with a cross section (for example, the right side 1130) of the screen. According to an embodiment, the electronic device 101 may operate to rearrange the main objects (for example, the first object 1110 and the second object 1120), based on the cross section with which the main object is aligned. According to an embodiment, FIG. 11A illustrates an example in which the first object 1110 and the second object 1120 are provided as the main objects, but when the first object 1110 is selected as the main object, it may be determined that the main object is included in the screen and an arrangement operation for positioning the main object (for example, the first object 1110) at the center of the screen may be processed.

According to an embodiment, FIG. 11B illustrates an example of the case in which at least a part of the moving main object 1140 is not included in the screen and is aligned based on two cross sections (for example, the left side 1150 and the bottom side 1160) of the screen. According to an embodiment, the electronic device 101 may operate to rearrange the main object 1140, based on the cross sections with which the main object 1140 is aligned.

According to an embodiment of the disclosure, a moving image may include a plurality of image frames. Accordingly, in the above-described embodiments, a reference image for configuring wallpaper may be selected based on one of a plurality of image frames.

According to an embodiment, the electronic device 101 may analyze entire image frames of the image (analyze the image quality and/or analyze scenes (for example, outdoors, foods, things, or people)) and distinguish and separate the main object from background objects in the entire image frames of the image, based on the analysis result. According to an embodiment, the electronic device 101 may separate the main object from background objects, based on various image processing technologies for extracting the main object. According to an embodiment, the electronic device 101 may select a target image frame (or a representative image frame) to be edited, based on a plurality of main objects for all image frames. According to an embodiment, the electronic device 101 may process an operation of supporting a configuration of wallpaper by separating the main object from background objects in the target image frame. According to an embodiment, selection of the target image frame (or representative image frame) to be edited may be selected based on a priority (for example, based on learning or based on user intervention) according to user designation. According to an embodiment, in selection of the target image frame (or representative image frame) to be edited, an image frame including an object having significant movement in all image frames may be selected. For example, the object having significant movement may be included in an image frame in which at least a part of the main object included in every image frame is cut according to movement (or animation). Accordingly, the image frame including the main object which is not cut in all image frames may be selected as an image frame including the object having significant movement.

Figure 12A:
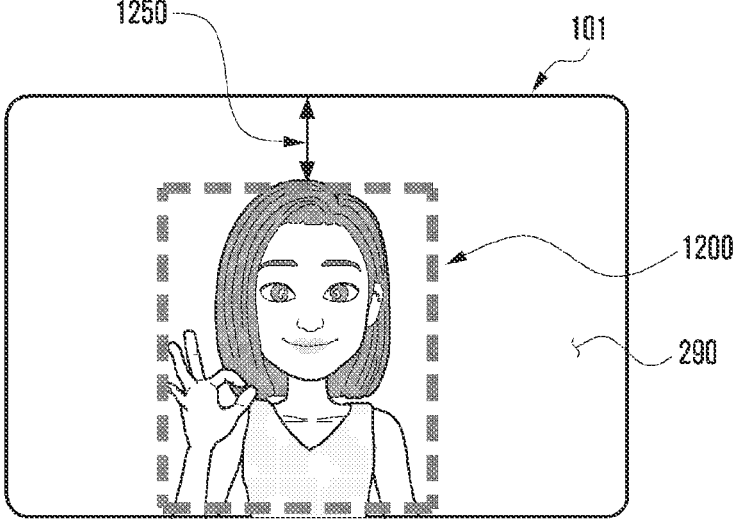
FIGS. 12A, 12B, and 12C are diagrams illustrating examples in which the electronic device designates the location of the main object within the image according to various embodiments.
Figure 12B:
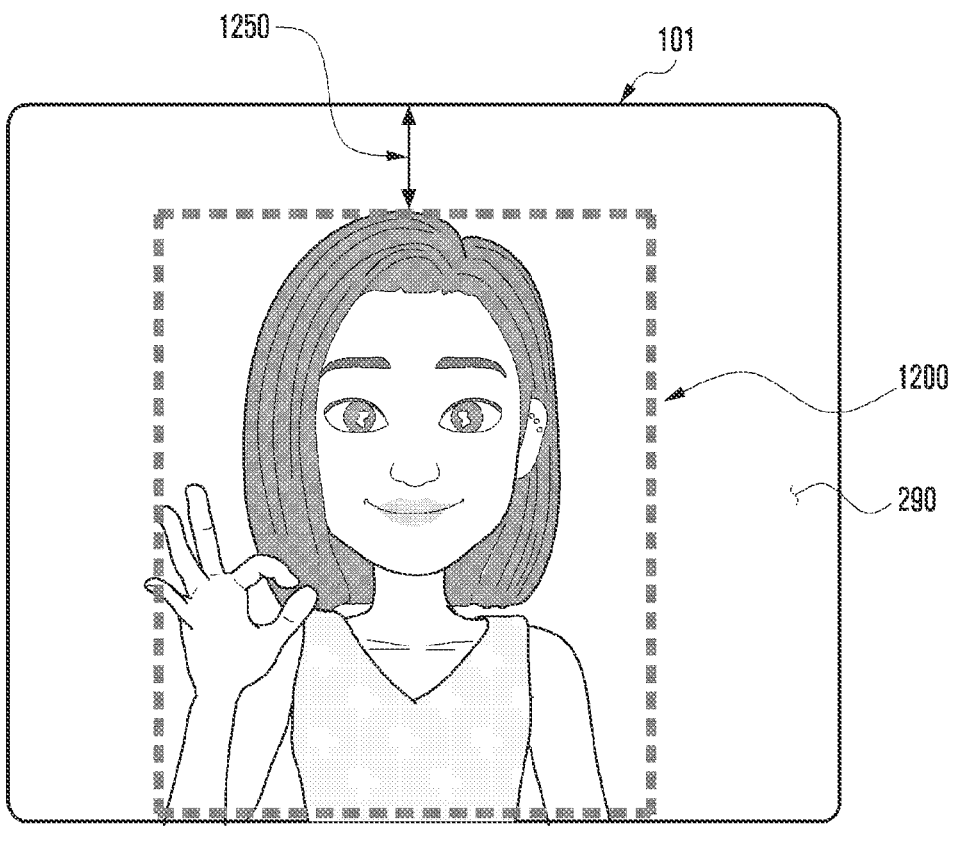
Figure 12C:
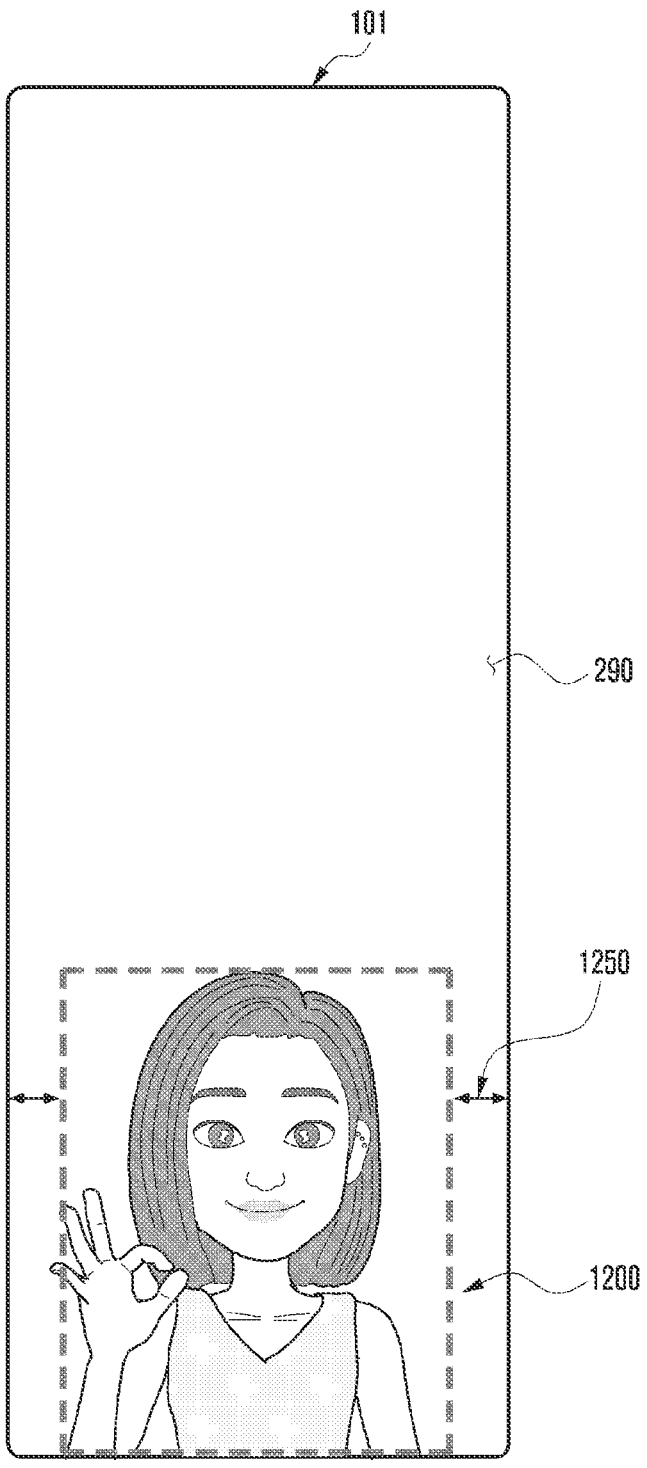

FIGS. 12A, 12B, and 12C are diagrams illustrating examples in which the electronic device designates the location of the main object within the image according to various embodiments.

In an embodiment, FIGS. 12A, 12B, and 12C illustrate examples of a screen on which wallpaper is configured in accordance with a display size in the electronic device 101. According to an embodiment, FIGS. 12A, 12B, and 12C illustrates examples in which a main object 1200 is an object which is aligned or cut based on at least some cross sections (for example, the bottom side) of the screen. According to an embodiment, FIGS. 12A, 12B, and 12C illustrate examples in which the main object 1200 is resized in accordance with a display size in the electronic device 101 having different display sizes and the resized main object 1200 are disposed on a cross section (for example, the bottom side) of the display 290.

According to an embodiment, designation of the location of the main object 1200 may be performed to fill areas of about 90% of the screen, based on the cross section (for example, the bottom side) with which the main object 1200 is aligned such that the main object 1200 is cut and thus movement thereof is not shown well. For example, the electronic device 101 may dispose the main object 1200 with a predetermined margin 1250 (for example, N pixels), based on a cross section having the shortest separation distance among separation distances between the edge part of the main object 1200 and four cross sections of the display 290.

According to an embodiment, as illustrated in FIGS. 12A and 12B, an example of the case in which a vertical height from the edge part of the main object 1200 is shorter than a horizontal width may be described. As illustrated in FIGS. 12A and 12B, the electronic device 101 may configure a predetermined margin 1250 (for example, N pixels), based on the top side along a vertical direction. For example, the electronic device 101 may resize the main object 1200 up to the separation height (for example, up to areas of about 90% of the screen in a vertical direction) by the predetermined margin 1250 from the top side, based on the bottom side with which the main object 1200 is aligned.

According to an embodiment, as illustrated in FIG. 12C, an example of the case in which a horizontal width from the edge part of the main object 1200 is shorter than a vertical height may be described. As illustrated in FIG. 12C, the electronic device 101 may configure the predetermined margin 1250, based on each of the left side and the right side along a horizontal direction. For example, the electronic device 101 may resize the main object 1200 up to the separation width (for example, up to areas of about 90% of the screen in a horizontal direction) by the predetermined margin 1250 from the left side and the right side, based on the bottom side with which the main object 1200 is aligned.

Figure 13A:
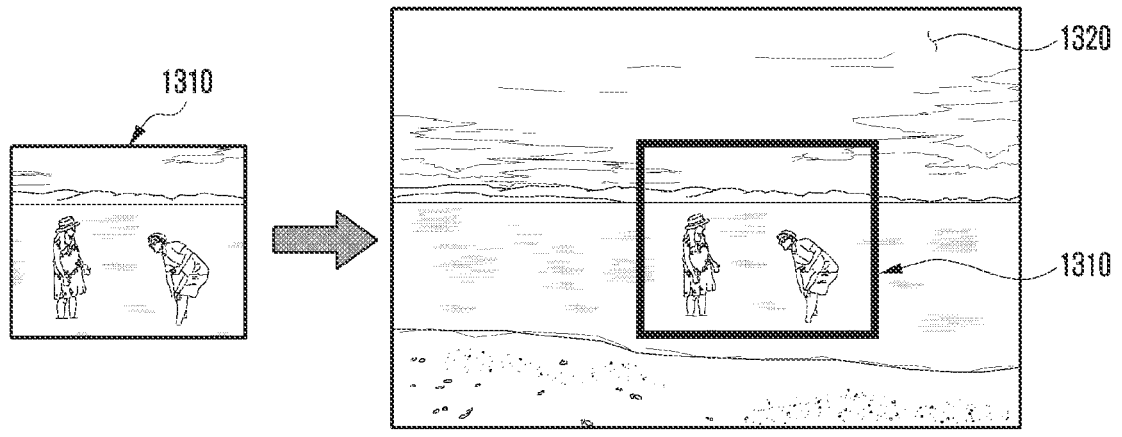
FIGS. 13A and 13B are diagrams illustrating examples in which the electronic device provides wallpaper, based on editing of the main object according to various embodiments.
Figure 13B:
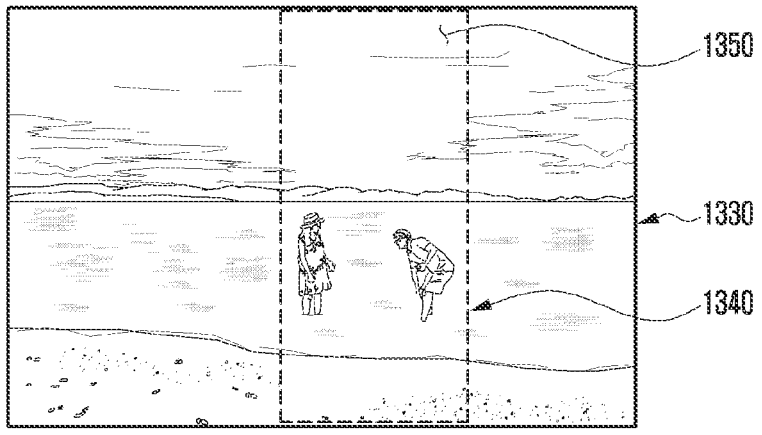

FIGS. 13A and 13B are diagrams illustrating examples in which the electronic device provides wallpaper, based on editing of the main object according to various embodiments.

According to an embodiment, FIGS. 13A and 13B illustrate examples in which both a main object and a background object are moving animation objects and the entire main object is included in the screen.

In an embodiment, as illustrated in FIG. 13A, the electronic device 101 may dispose the main object extracted from the image 1310 at the center of the screen. According to an embodiment, the electronic device 101 may fill the remaining areas except for the main object with the background object 1320. According to an embodiment, the electronic device 101 may perform editing (for example, drawing or filling in) of filling the background object 1320 of the image 1310 in accordance with the display size, based on an outpainting technology. According to an embodiment, the electronic device 101 may provide wallpaper corresponding to the display size using an image in which the main object and the background object according to the outpainting are combined.

In an embodiment, FIG. 13B illustrates an example of configuring an image for wallpaper, based on an image retargeting (or seam carving) technology using a given image 1330 (for example, the original image). In an embodiment, as illustrated in FIG. 13B, the electronic device 101 may crop the given image 1330, based on the main object in the given image 1330 (for example, the original image) as indicated by reference numeral 1340. According to an embodiment, the electronic device 101 may configure the cropped image 1350 having a size corresponding to the crop 1340 as an image for wallpaper. According to an embodiment, the electronic device 101 may provide the wallpaper corresponding to the display size using the cropped image 1350.

Figure 14:
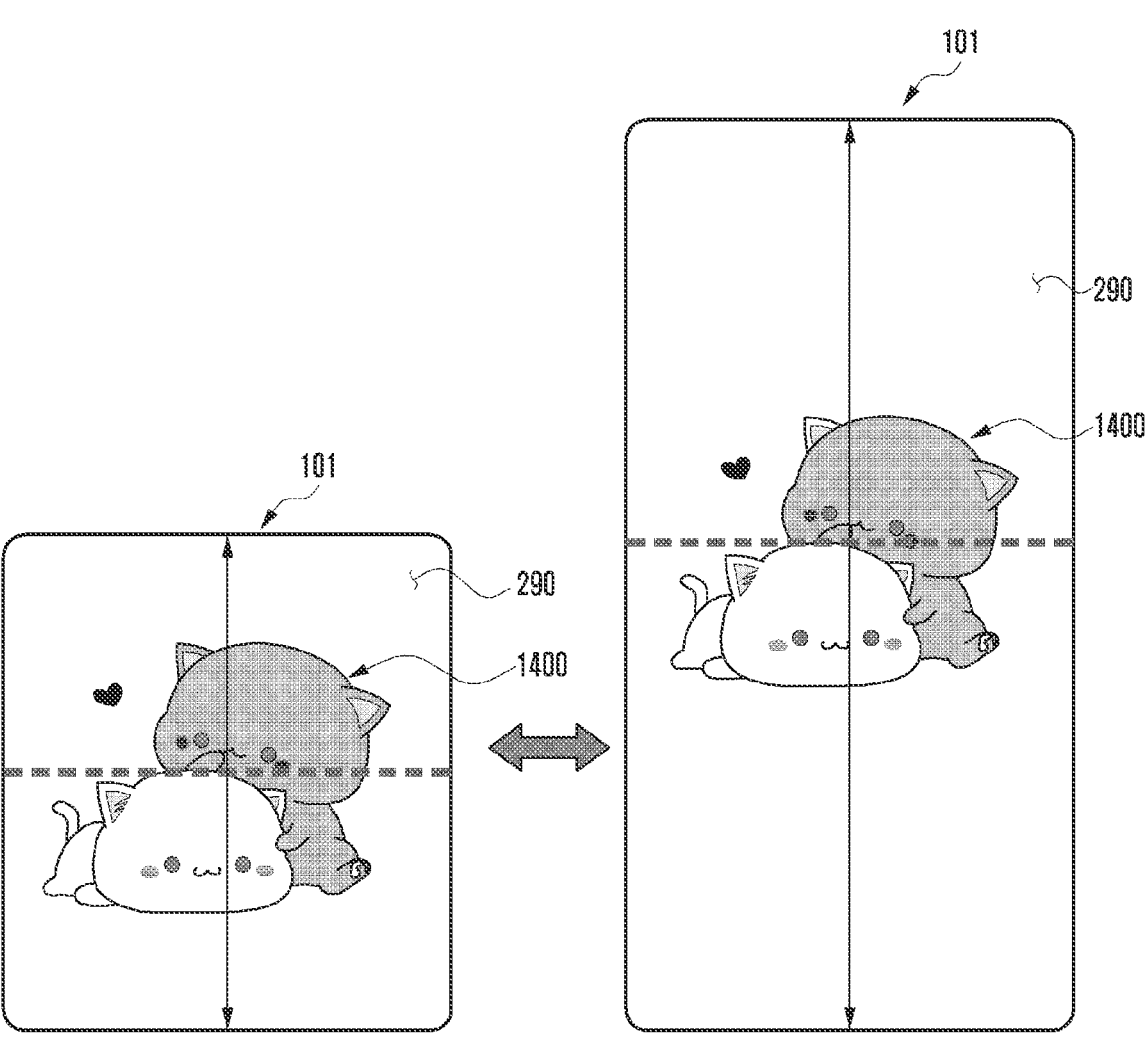
FIG. 14 is a diagram illustrating an example in which the electronic device provides wallpaper according to a display size change according to various embodiments.

FIG. 14 is a diagram illustrating an example in which the electronic device provides wallpaper according to a display size change according to various embodiments.

According to an embodiment, FIG. 14 illustrates an example in which the electronic device 101 corresponds to the form factor of a rollable/slidable device. According to an embodiment, FIG. 14 illustrates an example of adaptively arranging and displaying an image according to a state change of the electronic device 101. For example, FIG. 14 illustrates an example of changing and providing a location of an image in accordance with a state change between a first state (for example, a closed state or a slide-in state) and a second state (for example, an open state or a slide-out state) of the electronic device 101.

According to an embodiment, as illustrated in FIG. 14, when a display size (or a screen size) is flexible changed (for expanded or reduced) like the electronic device 101 (for example, a rollable/slidable device), an image may be rearranged and displayed in accordance with a real-time change of screen layout. According to an embodiment, when the size of the display 290 is expanded or reduced in a sliding manner, the electronic device 101 may continuously identify a varying resolution of the display 290 and adaptively arrange and display the image according to the resolution change. For example, the electronic device 101 may display the optimized image in accordance with the display size change.

According to an embodiment, when a main object 1400 is entirely shown by a screen corresponding to a display size of a first state (for example, a closed state or a slide-in state) or a second state (for example, an open state or a slide-out state) in the first state or the second state, the electronic device 101 may dispose the main object 1400 at the center of the screen (for example, the center of the screen according to the display size of the first state or the second state).

According to an embodiment, when the main object 1400 is shown as being aligned with the cross section of the screen in the first state or the second state, the electronic device 101 may dispose the main object 1400 to be aligned with the corresponding cross section.

FIGS. 15A, 15B, 15C, 15D, 15E, and 15F are diagrams illustrating examples in which the electronic device provides an image according to a display size change according to various embodiments.

According to an embodiment, FIGS. 15A, 15B, 15C, 15D, 15E, and 15F illustrate examples of editing and displaying an image (or content) in accordance with a display size of the electronic device 101. For example, FIGS. 15A, 15B, 15C, 15D, 15E, and 15F illustrate examples of editing and providing an original image in accordance with a display change of the electronic device 101.

Figure 15A:
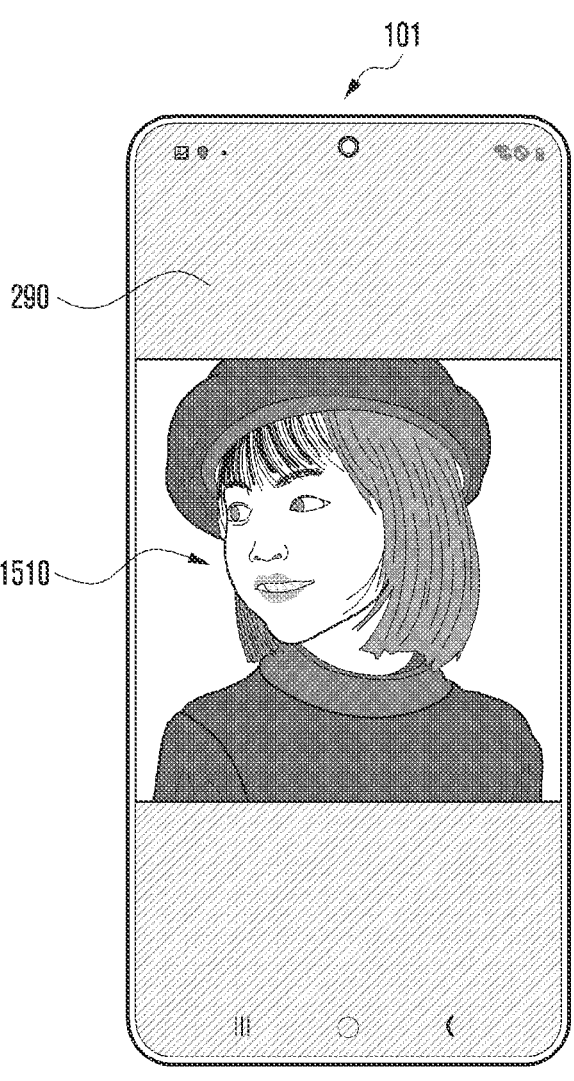
FIGS. 15A, 15B, 15C, 15D, 15E, and 15F are diagrams illustrating examples in which the electronic device provides an image according to a display size change according to various embodiments.
Figure 15B:
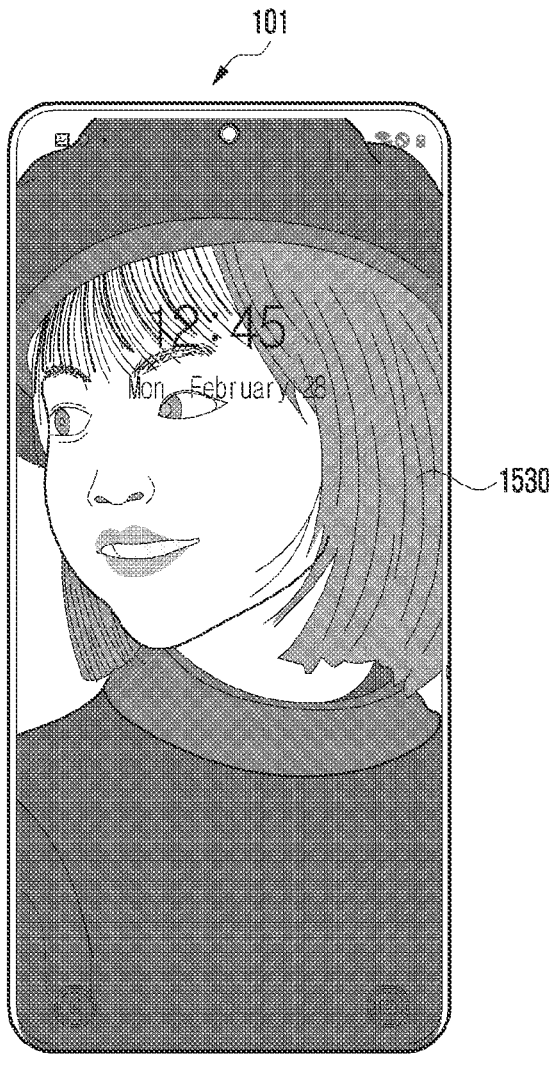
Figure 15C:
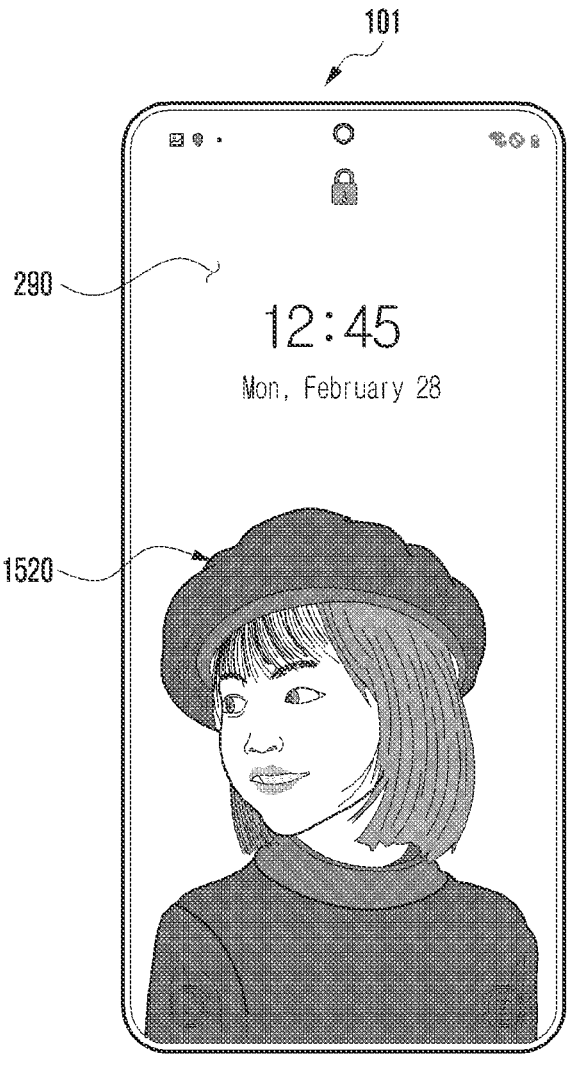
Figure 15D:
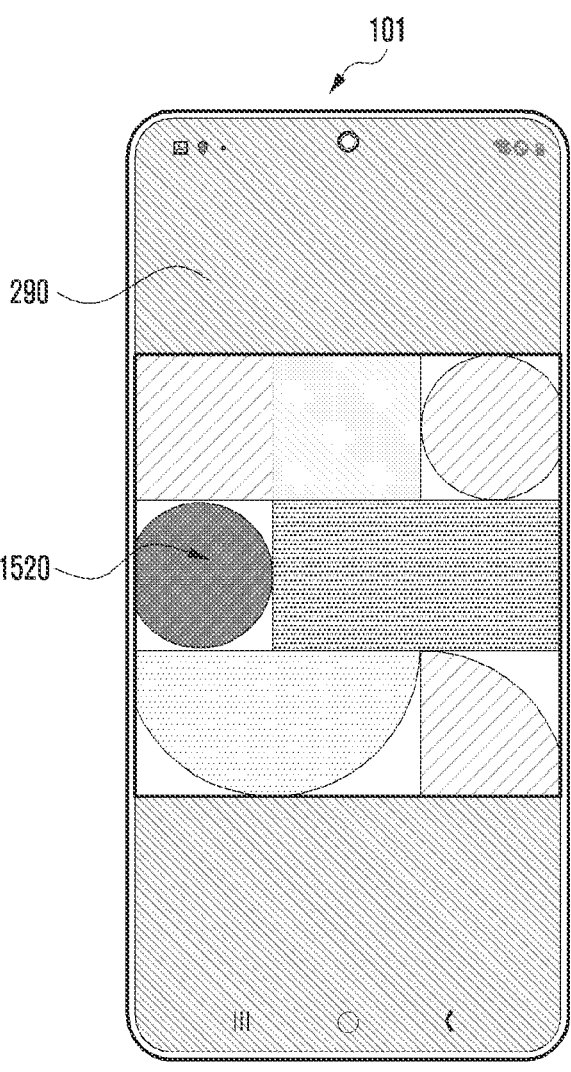

According to an embodiment, FIG. 15A or 15D illustrate an example of displaying an original image 1510 or 1530 provided by the electronic device 101 through the display 290.

Figure 15E:
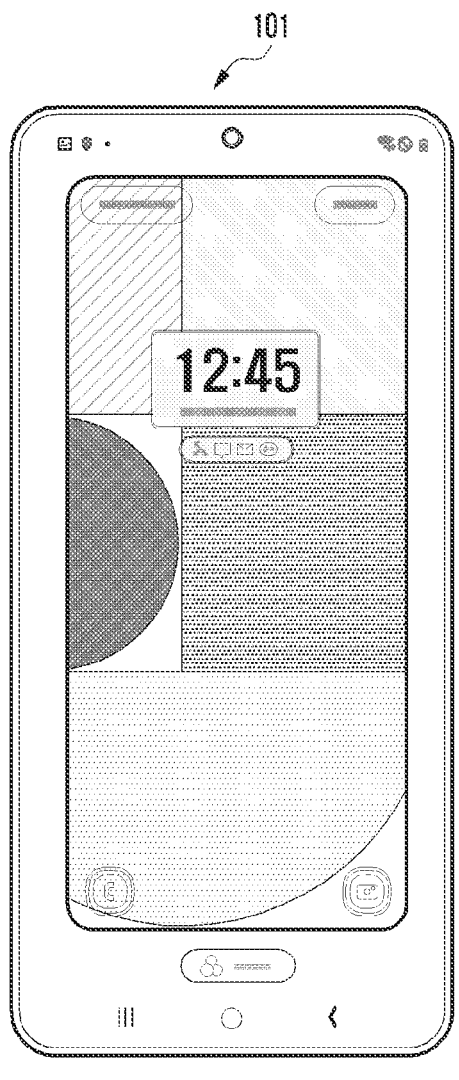

According to an embodiment, FIG. 15B or 15E illustrate an example of simply resizing and displaying the original image 1510 or 1530 to fill the screen of the electronic device 101 according to the existing scheme. As illustrated in FIG. 15B or 15E, when the image is provided (for example, wallpaper is provided) in the prior art, the original image 1510 or 1530 may be simply resized to fixedly the size of the original image 1510 or 1530 and provided regardless of the display size (for example, the aspect ratio of the display) of the electronic device 101.

Figure 15F:
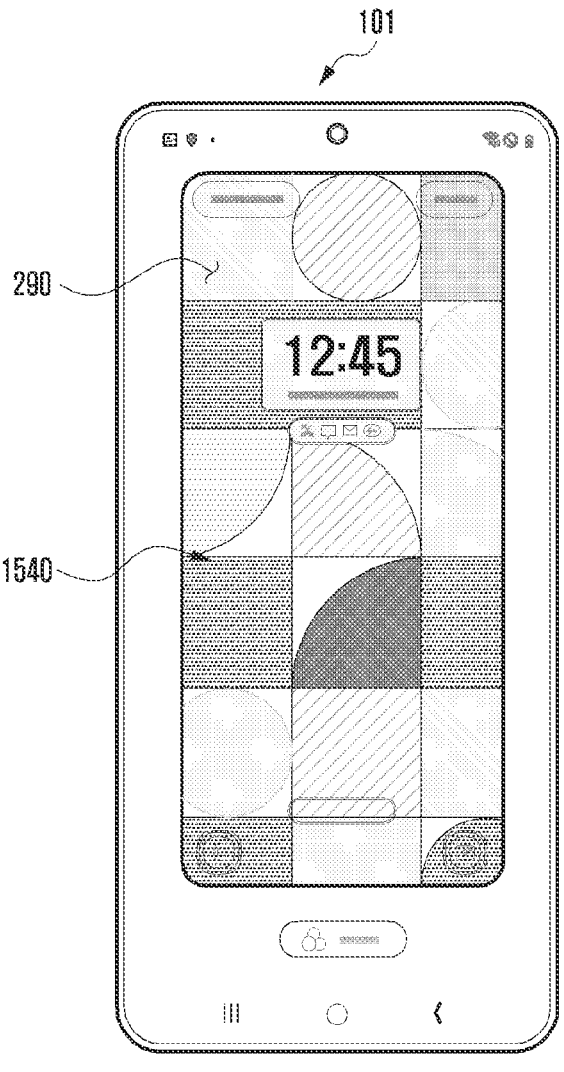

According to an embodiment, FIG. 15C or 15F illustrates an example of editing and rearranging the original image 1510 or 1530 in accordance with the display size (for example, the aspect ratio of the display) using AI and displaying the edited and rearranged image according to an embodiment of the disclosure rather than simply resizing the original image 1510 or 1530. According to an embodiment, the electronic device 101 may display the edited image 1520 or 1540 in accordance with (for example, more suitable for) the display size (for example, the display ratio) through the display 290 by applying a predetermined image processing technology to the original image 1510 or 1530 using AI for the original image 1510 or 1530. For example, for the original image 1510 or 1530, the electronic device 101 may configure and provide the image 1520 or 1540 (for example, background image) optimized for the display ratio, based on the outpainting technology of filling and rearranging the surroundings of the original image 1510 or 1530 using AI.

According to an embodiment, it is possible to fill the image in the entire screen of the display size by processing the original image 1510 or 1530 of the electronic device 101 according to the outpainting technology. According to an embodiment, the electronic device 101 may perform image processing of filling the entire image in accordance with the display size using the outpainting technology. In an embodiment, the outpainting technology may include an AI-based (for example, deep-learning-based) image generation technology of completing a new image 1520 or 1540 by filling the outside of the image, based on the given image (for example, the original image 1510 or 1530).

According to an embodiment, in the prior art, when the original image (for example, person and/or pattern) is configured as wallpaper (and/or a lock screen), a part of the original image was cropped and used. For example, as illustrated in FIG. 15B, when an image including a person is configured as wallpaper or a lock screen, the configuration can be conventionally performed through a function of cutting the corresponding image in accordance with a specific ratio. Accordingly, in the prior art, the size of the configured image is reduced compared to the original image, and thus a satisfactory screen cannot be provided. In an embodiment of the disclosure, an image larger than the original image may be generated through image processing. In an embodiment, the image may be generated through a predetermined image processing technology (for example, the outpainting technology) and may be additionally applied through a generative AI technology.

In an embodiment, generative AI may indicate a method of analyzing data through a deep-learning technology generally such as a neural network and making a new image (or content) similar to input data. According to an embodiment, the electronic device 101 may generate an additional area using the original image as source data through generative AI. According to an embodiment, the electronic device 101 may use generative adversarial networks (GAN) and/or various algorithms such as an auto-encoder (AE) or a variational auto-encoder (VAE).

According to an embodiment, as illustrated in FIG. 15F, a pattern may be expanded or added. For example, in the prior art, the cropped image was used as illustrated in FIG. 15E, but a similar pattern may be generated (or expanded) through generative AI according to an embodiment. For example, the existing pattern may be expanded or a pattern similar to the existing pattern may be redrawn. This may be changed according to a shape and a policy of the pattern.

According to an embodiment, as illustrated in FIGS. 15C and 15F, the electronic device 101 may use different algorithms according to data characteristics (for example, pattern or actual image) of the original image. For example, when a new pattern is generated, GAN may be used or expansion of the actual image may select and use a predetermined algorithm according to a condition of the original image such as the use of the VAE. The disclosure is not limited thereto, and the use of the algorithm may be changed according to user generation information and a policy of a server (for example, a cloud server).

FIGS. 16A, 16B, 16C, and 16D are diagrams illustrating examples in which the electronic device dispose objects within the image according to various embodiments.

According to an embodiment, FIGS. 16A, 16B, 16C, and 16D illustrate examples of editing and displaying the image in accordance with a display size of the electronic device 101. For example, FIGS. 16A, 16B, 16C, and 16D illustrate examples of editing and providing an image (or content) 1600 (for example, a GIF image) in accordance with the display of the electronic device 101.

According to an embodiment, FIGS. 16A, 16B, 16C, and 16D illustrate examples of analyzing a point of interest (POI) range (and/or a region of interest (ROI) range) (for example, a movement range) of the main object (for example, a person object) within the image (or content) 1600 (for example, the GIF image) and rearranging and providing the image in accordance with a display size (for example, a display ratio) of the display to display the image, based on the analysis result.

Figure 16A:
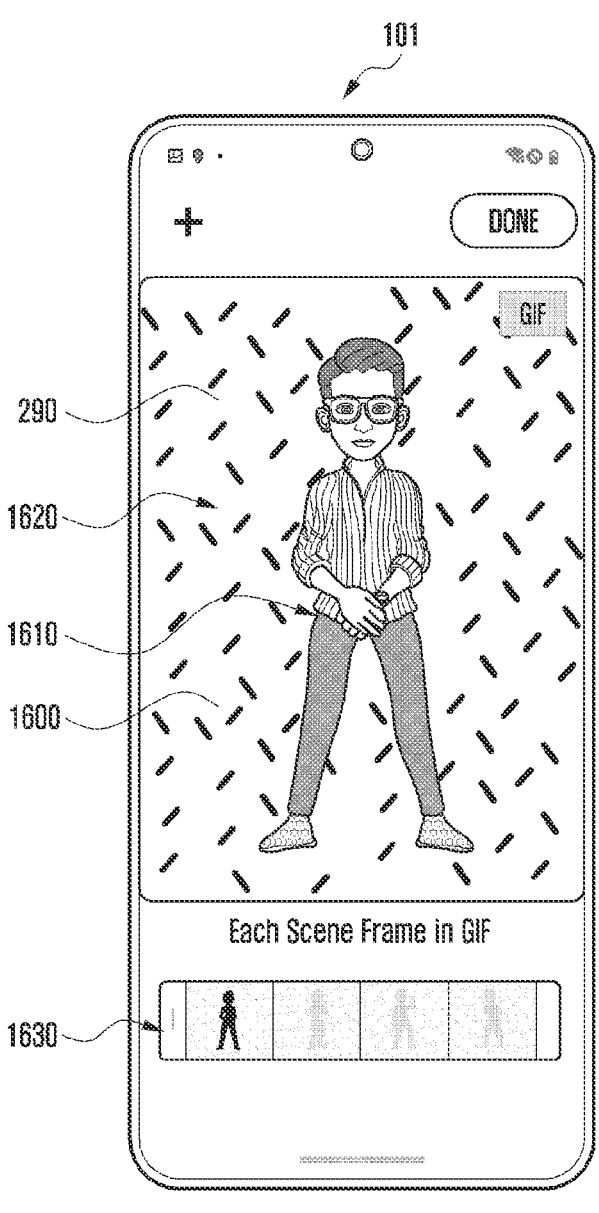
FIGS. 16A, 16B, 16C, and 16D are diagrams illustrating examples in which the electronic device dispose objects within the image according to various embodiments.

In an embodiment, FIG. 16A illustrates an example of a user interface (for example, an execution screen of a GIF image editing function (for example, GIF editing)) related to image editing of the electronic device 101. In an embodiment, FIG. 16A illustrates an example of displaying an image 1600 provided by the electronic device 101 through the display 290. According to an embodiment, FIG. 16A illustrates a moving image (for example, a GIF image) in which a main object 1610 and a background object 1620 are distinguished. According to an embodiment, when providing the image 1600, for the GIF image, the electronic device 101 may provide a sub image 1630 (for example, a scene frame) related to the corresponding GIF image through a predetermined area of the display 290. According to an embodiment, the sub image 1630 may indicate each scene frame included in the GIF image.

Figure 16B:
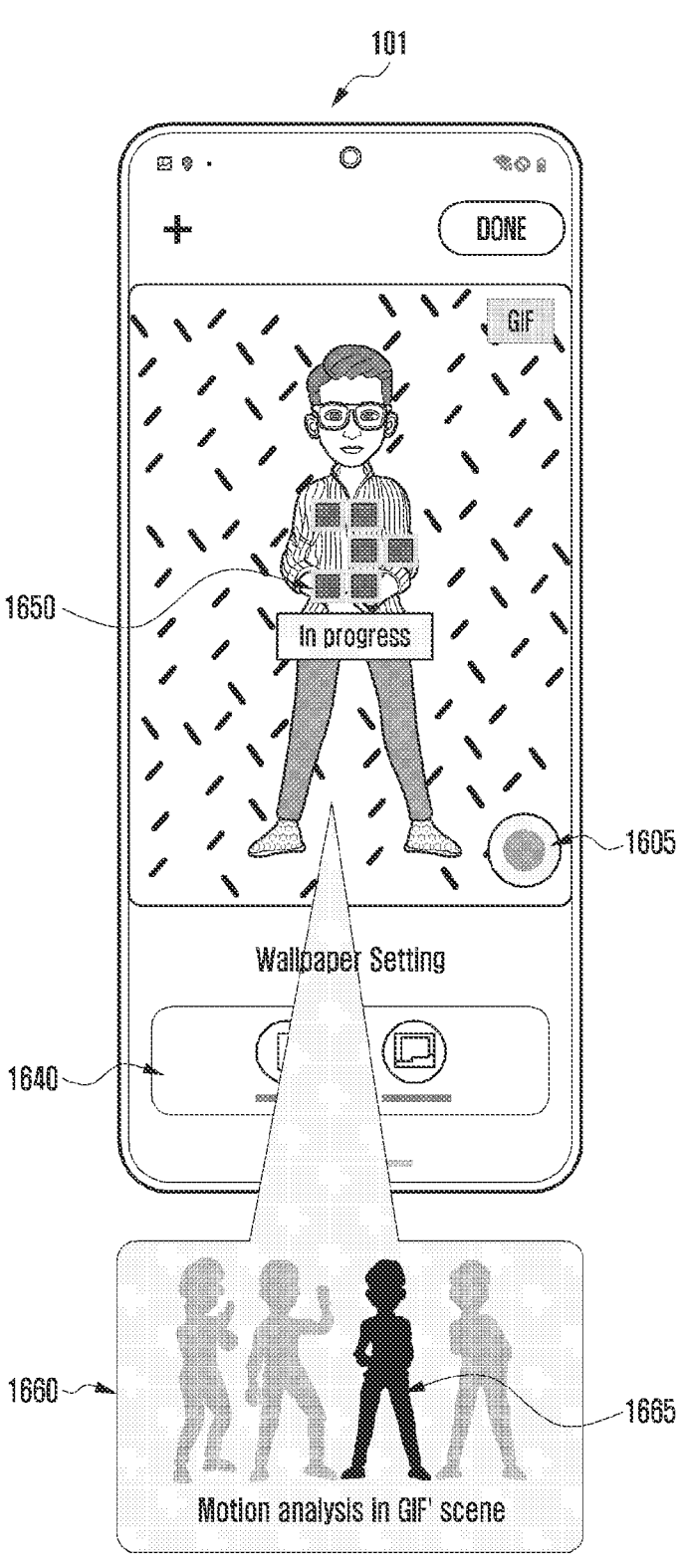
Figure 16C:
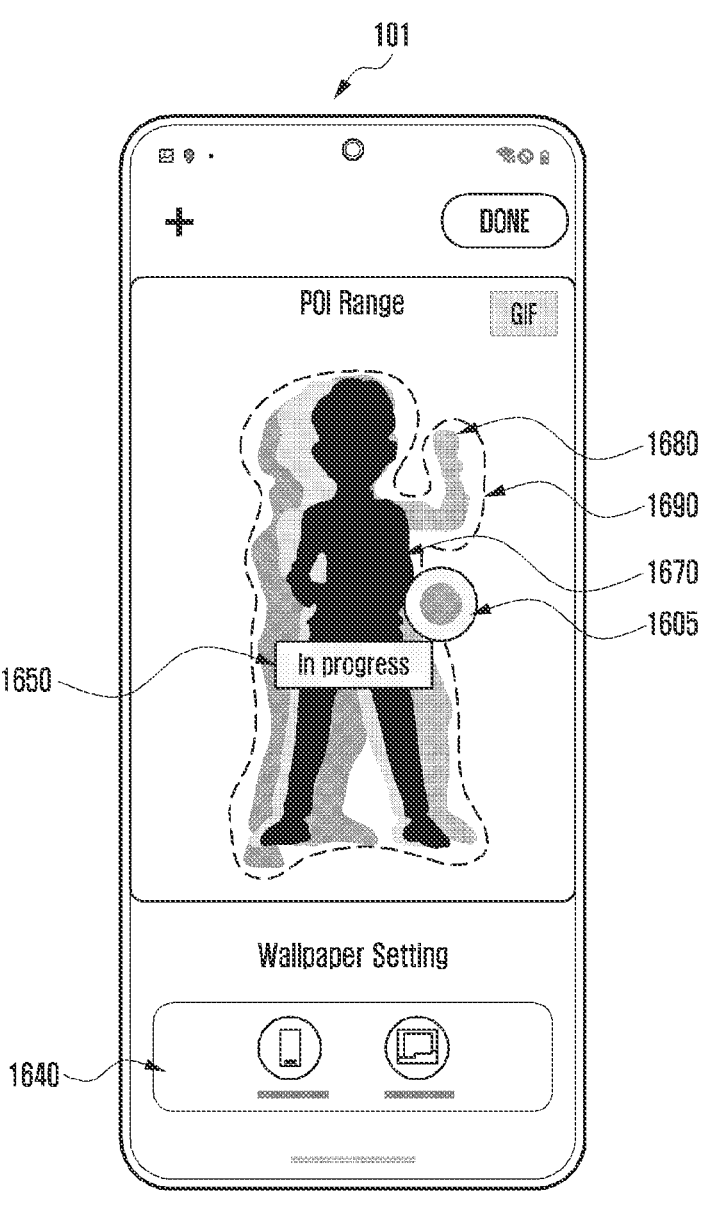

According to an embodiment, FIGS. 16B and 16C illustrate examples of a screen on which image editing is executed. According to an embodiment, FIG. 16B illustrates an example of a screen while a first editing operation (for example, motion analysis) is performed among the image editing operations. According to an embodiment, FIG. 16C illustrates an example while a second editing operation (for example, scene analysis) is performed among the image editing operations.

According to an embodiment, FIG. 16B illustrates an example of a relevant image provided in response to a user input of editing an image (for example, the image 1600 of FIG. 16A) in the electronic device 101. As illustrated in FIG. 16B, when executing image editing, the electronic device 101 may provide a menu 1640 for selecting a display (for example, a display size) of the electronic device 101 to display an image (for example, to configure wallpaper). According to an embodiment, the electronic device 101 may receive a user input of selecting a display to display an image, based on the menu 1640 and execute image editing in response to the user input.

According to an embodiment, when executing image editing, the electronic device 101 may provide a progress object 1650 (for example, text and/or a moving icon) indicating a state of progress of image editing on the screen. According to an embodiment, based on execution of image editing, the electronic device 101 may perform motion analysis based on a sub image (for example, a scene frame) of the image 1600 (for example, the GIF image) as illustrated in an element 1660. According to an embodiment, the motion analysis based on the sub image may be processed in a background (or internally) by the electronic device 101. In an embodiment, the motion analysis may be performed based on the main object 1610 of the image 1600. According to an embodiment, the electronic device 101 may select representative motion (for example, a representative motion image 1665) in various scenes of the image 1600, based on the motion analysis.

Figure 16D:
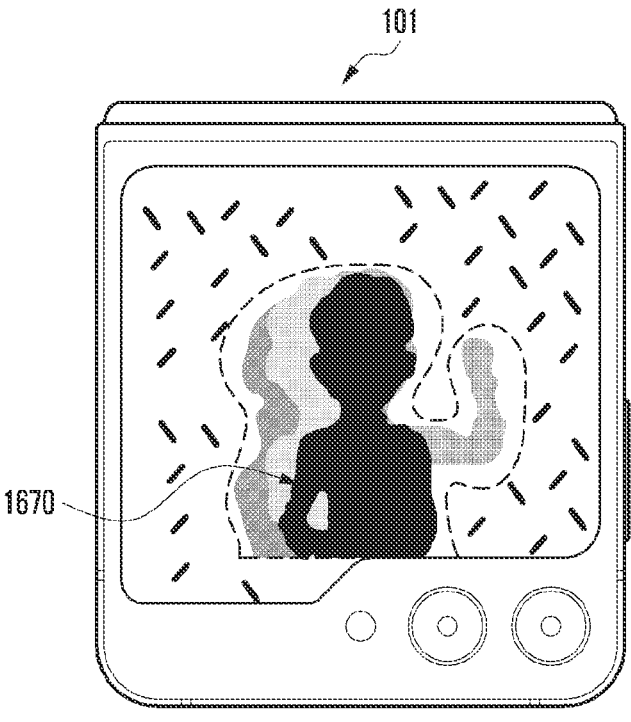

According to an embodiment, the electronic device 101 may perform the motion analysis and display the edited image on the selected display (for example, configure the edited image as wallpaper of the corresponding display) in response to a user input based on an execution object 1605 (or an application object) to display the edited image on the selected display (for example, configure the edited image as wallpaper). According to an embodiment, the electronic device 101 may edit (for example, resize) the representative motion (for example, the representative motion image 1665) selected according to the motion analysis to fit the display selected by the user in response to a user input based on the execution object 1605. According to an embodiment, an example of displaying the image edited in accordance with the display is illustrated in FIG. 16D below.

According to an embodiment, FIG. 16C illustrates an example of a relevant screen provided in response to a user input of editing an image (for example, the image 1600 of FIG. 16A) in the electronic device 101. According to an embodiment, when executing image editing, the electronic device 101 may provide a progress object 1650 (for example, text and/or a moving icon) indicating a state of progress of image editing on the screen. According to an embodiment, the electronic device 101 may perform scene analysis based on a sub image (for example, a scene frame) of the image 1600 (for example, the GIF image) according to execution of image editing.

According to an embodiment, when analyzing the scene analysis based on the sub image, the electronic device 101 may display a relevant user interface through the display 290 as illustrated in FIG. 16C. In an embodiment, the scene analysis may be performed based on the main object 1610 of the image 1600. According to an embodiment, the electronic device 101 may select a representative scene (or a central scene) (for example, the representative scene image 1670) and surrounding scenes dynamically varying (or moving) based on the representative scene from among various scenes of the image 1600 according to the scene analysis. According to an embodiment, the electronic device 101 may determine a POI range 1690, based on the outermost boundary on which the surrounding scenes 1680 are located around the representative scene 1670. For example, the electronic device 101 may reframe the object which can be cut in each scene. For example, the electronic device 101 may analyze a POI range (for example, a movement range) of the main object 1610 within the image 1600 (for example, the GIF image) and rearrange and provide the main object 1610 in accordance with the display size (for example, the display ratio) of the display to display the image, based on the analysis result.

According to an embodiment, the electronic device 101 may perform scene analysis and display the edited image (for example, configure the edited image as wallpaper of the corresponding display) on the selected display in response to a user input based on an execution object 1605 (for example, an application object) for displaying the edited image on the selected display (for example, configuring the edited image as wallpaper). According to an embodiment, the electronic device 101 may edit (for example, frame and resize) the image reframed according to the scene analysis to fit the display selected by the user in response to a user input based on the execution object 1605. According to an embodiment, an example of displaying the image edited in accordance with the display is illustrated in FIG. 16D.

According to an embodiment, FIG. 16D illustrates an example in which, for example, a given image is edited in accordance with a display designated by the user and the edited image is arranged and provided in accordance with the designated display. As illustrated in FIG. 16D, the image may be optimally reconfigured and provided according to the display (for example, the display ratio) to display the image (for example, configure the image as wallpaper), based on the main object 1610 (for example, person object) within the image 1600. For example, the electronic device 101 may configure the image such as the image (for example, the edited image) including a face (for example, POI) of the main object is arranged at the lower end of the screen in accordance with a ratio of a cover display of the electronic device 101.

Figure 17A:
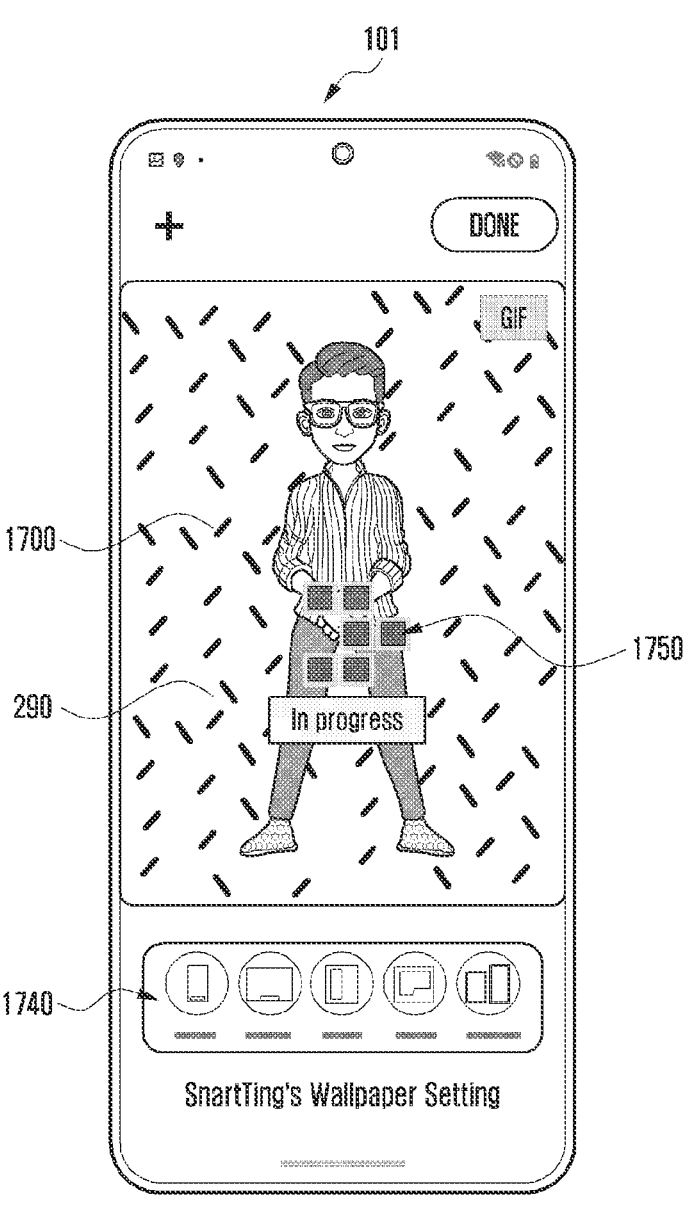
FIGS. 17A, 17B, and 17C are diagrams illustrating examples of providing an image according to a display of the electronic device according to various embodiments.
Figure 17B:
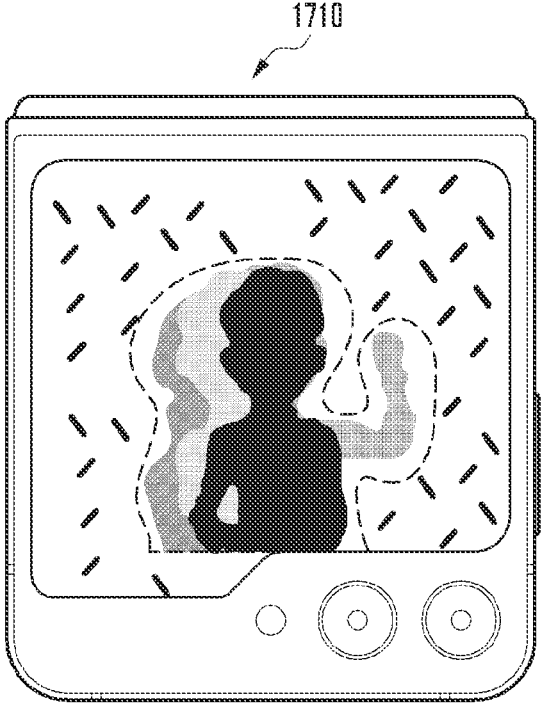
Figure 17C:
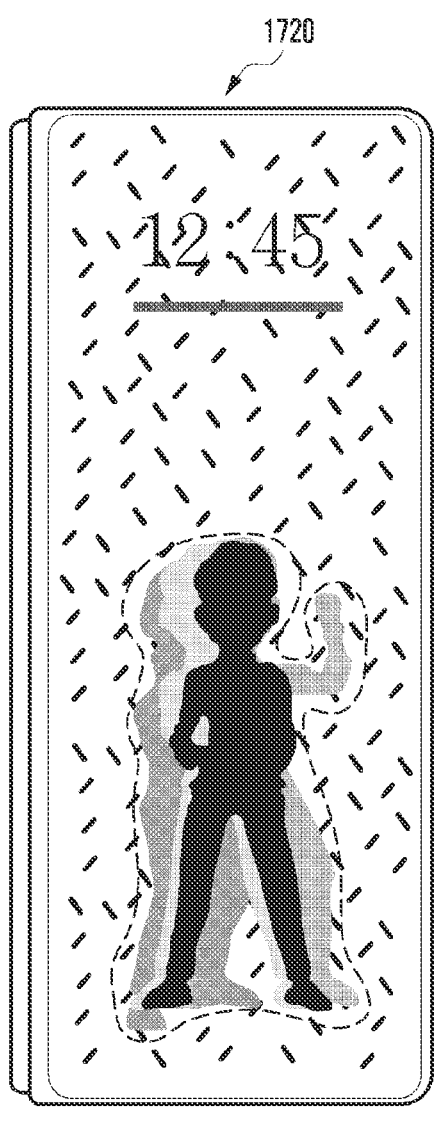

FIGS. 17A, 17B, and 17C are diagrams illustrating examples of providing an image according to a display of the electronic device according to various embodiments.

According to an embodiment, FIGS. 17A, 17B, and 17C illustrate examples of providing images edited in accordance with various displays (for example, configure the edited images as wallpaper) according to the form factor of the electronic device 101.

According to an embodiment, FIG. 17A illustrates an example of a relevant screen 1700 provided in response to a user input of editing an image in the electronic device 101. According to an embodiment, when executing image editing, the electronic device 101 may provide a progress object 1750 (for example, text and/or a moving icon) indicating a state of progress of image editing on the screen.

As illustrated in FIG. 17A, when executing image editing, the electronic device 101 may provide a menu 1740 for selecting a display (for example, a display size) to display an image (for example, configure wallpaper). According to an embodiment, the electronic device 101 may receive a user input of selecting a display (for example, a display for each form factor of the electronic device 101) (for example, phone, tablet, fold, flip, or rollable) to display the image, based on the menu 1740 and execute image editing in accordance with the selected display in response to the user input.

For example, the electronic device 101 may edit the image in accordance with the display of the electronic device 101 in response to the user selection and store the edited image in the memory 130 of the electronic device 101 and/or an external device (for example, a cloud server). For example, the electronic device 101 may edit the image in accordance with a display of an electronic device (for example, a first electronic device 1710 having a flip form factor) or a second electronic device 1720 (for example, an electronic device having a fold form factor) different from the electronic device 101 and store the edited image in the memory 130 of the electronic device 130 and/or the external device (for example, the cloud server and/or another electronic device 1710 or 1720) and/or share the same. Examples thereof are illustrated in FIGS. 17B and 17C.

According to an embodiment, FIG. 17B illustrates an example of editing and disposing the image (for example, the GIF image) in accordance with (or optimized for) the display (for example, the display ratio) of the electronic device 101 (for example, the first electronic device 1710). According to an embodiment, as illustrated in FIG. 17B, the image (for example, the edited image) including the face (for example, POI) of the main object in the original image is arranged and disposed at the lower end of the screen in accordance with the display (for example, the display ratio) of the first electronic device 1710.

According to an embodiment, FIG. 17C illustrates an example of editing, disposing, and displaying the image (for example, the GIF image) in accordance with (or optimized for) the display (for example, the display ratio) of the electronic device 101 (for example, the second electronic device 1720). According to an embodiment, as illustrated in FIG. 17C, the image (for example, the edited image) including the entire main object in the original image may be arranged and disposed at the lower end of the screen in accordance with the display (for example, the display ratio) of the second electronic device 1720.

Figure 18A:
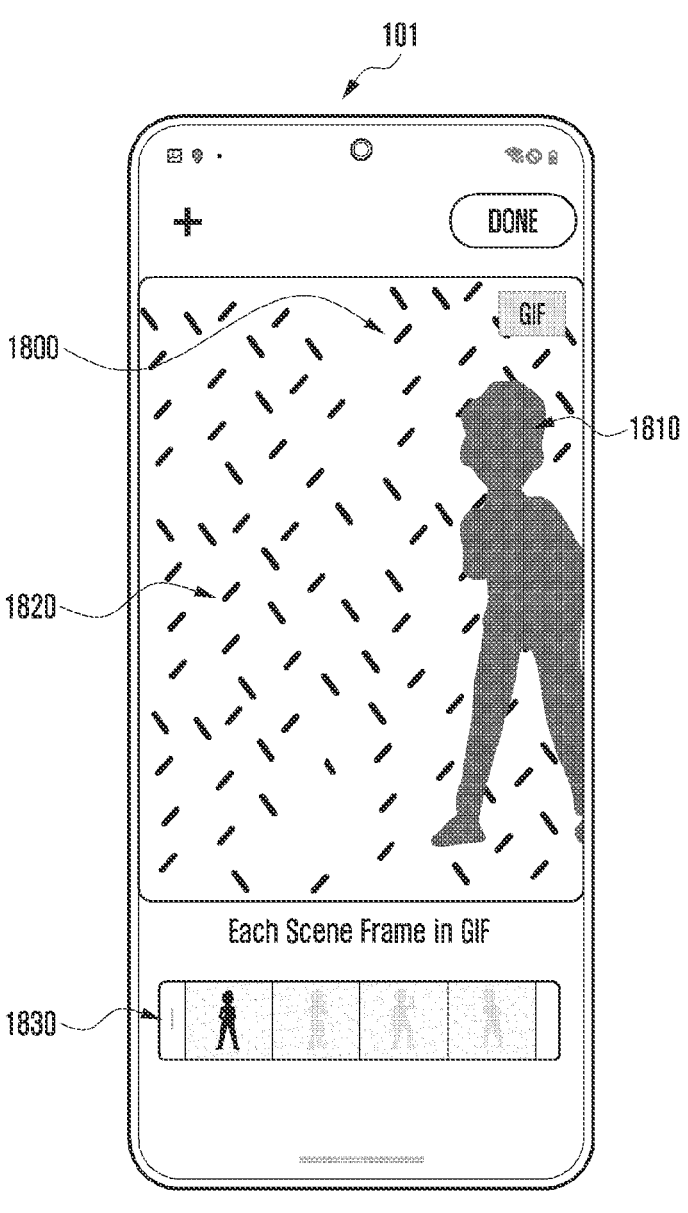
FIGS. 18A, 18B, and 18C are diagrams illustrating examples in which the electronic device provides an image according to the display size according to various embodiments.
Figure 18B:
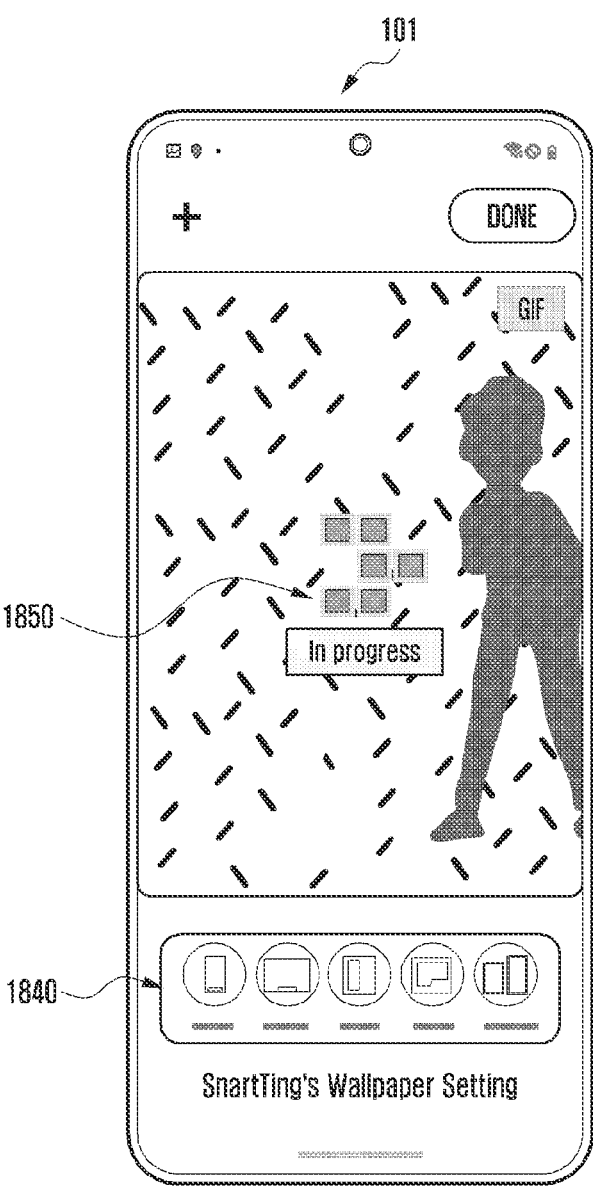
Figure 18C:
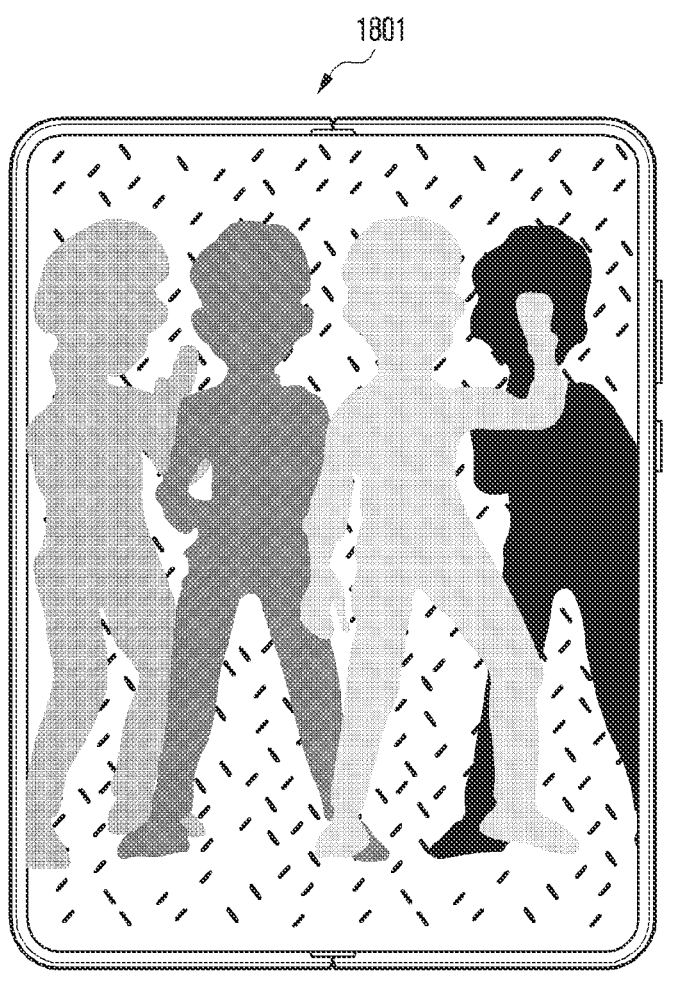

FIGS. 18A, 18B, and 18C are diagrams examples in which the electronic device provides an image according to the display size according to various embodiments.

In an embodiment, FIGS. 18A, 18B, and 18C illustrate examples in which the electronic device 101 edit (for example, reconfigure) the image in accordance with the size of the display to display the image (for example, the GIF image) and provide (for example, share) the same. For example, FIGS. 18A, 18B, and 18C illustrate examples of, for an image (for example, a GIF image) including four frames showing an object (for example, a person object) moving from a right edge to a left edge of the screen, configuring a new image (for example, a new GIF image) suitable for a display size of a predetermined display (For example, a main display of the fold-type electronic device 101) and providing (for example, sharing) the same.

According to an embodiment, FIGS. 18A, 18B, and 18C illustrate examples of analyzing a point of interest (POI) range (for example, a movement range from the right side to the left side) of the main object 1810 (for example, a person object) within the image (or content) 1800 (for example, the GIF image), and editing, rearranging, and providing the image in accordance with a display size (for example, a display ratio) of the display to display the image, based on the analysis result.

In an embodiment, FIG. 18A illustrates an example of a user interface (for example, an execution screen of a GIF image editing function (for example, GIF editing)) related to image editing of the electronic device 101. In an embodiment, FIG. 18A illustrates an example of displaying an image 1800 provided by the electronic device 101 through the display 290. According to an embodiment, FIG. 18A illustrates a moving image (for example, a GIF image) in which a main object 1810 and a background object 1820 are distinguished. According to an embodiment, when providing the image 1800, for the GIF image, the electronic device 101 may provide a sub image 1830 (for example, a scene frame) related to the corresponding GIF image through a predetermined area of the display 290. According to an embodiment, the sub image 1830 may indicate each scene frame included in the GIF image.

As illustrated in FIG. 18B, when executing image editing, the electronic device 101 may provide a menu 1840 for selecting a display (for example, a display size) to display an image (for example, to configure wallpaper and/or a lock screen). According to an embodiment, the electronic device 101 may receive a user input of selecting a display (for example, a display for each form factor of the electronic device) of the electronic device (for example, another electronic device 1801) (for example, phone, tablet, fold, flip, or rollable) to display the image, based on the menu 1840 and execute image editing in accordance with the selected display in response to the user input.

According to an embodiment, when executing image editing, the electronic device 101 may provide a progress object 1850 (for example, text and/or a moving icon) indicating the state in which image editing is being progressed on the screen. According to an embodiment, the electronic device 101 may perform motion analysis and/or scene analysis based on a sub image (for example, a scene frame) of the image 1800 (for example, the GIF image), based on execution of image editing corresponding to the display selected by the user.

According to an embodiment, the electronic device 101 may perform image editing and share the edited image with a predetermined external device (for example, another electronic device 1801). For example, the electronic device 101 may transmit the image to a predetermined external electronic device (for example, another electronic device 1801 and/or a cloud server) through a predetermined communication module (for example, the communication module 190 of FIG. 1), based on a predetermined user input for sharing the image.

According to an embodiment, FIG. 18C illustrates an example in which, for example, the electronic device 101 (for example, another electronic device 1801) acquires (for example, receive or download) an image from an external device (for example, another electronic device or a cloud server), dispose the image in accordance with the display of the electronic device 101, and provides the image. As illustrated in FIG. 18C, an image optimally reconfigured according to a display (for example, a display ratio) may be provided (for example, displayed) based on the main object (for example, person object) within the image. For example, the electronic device 101 may dispose and display the image (for example, edited image) including the main object at the center of the screen in accordance with the ratio of the main display of the electronic device 101.

Figure 19:
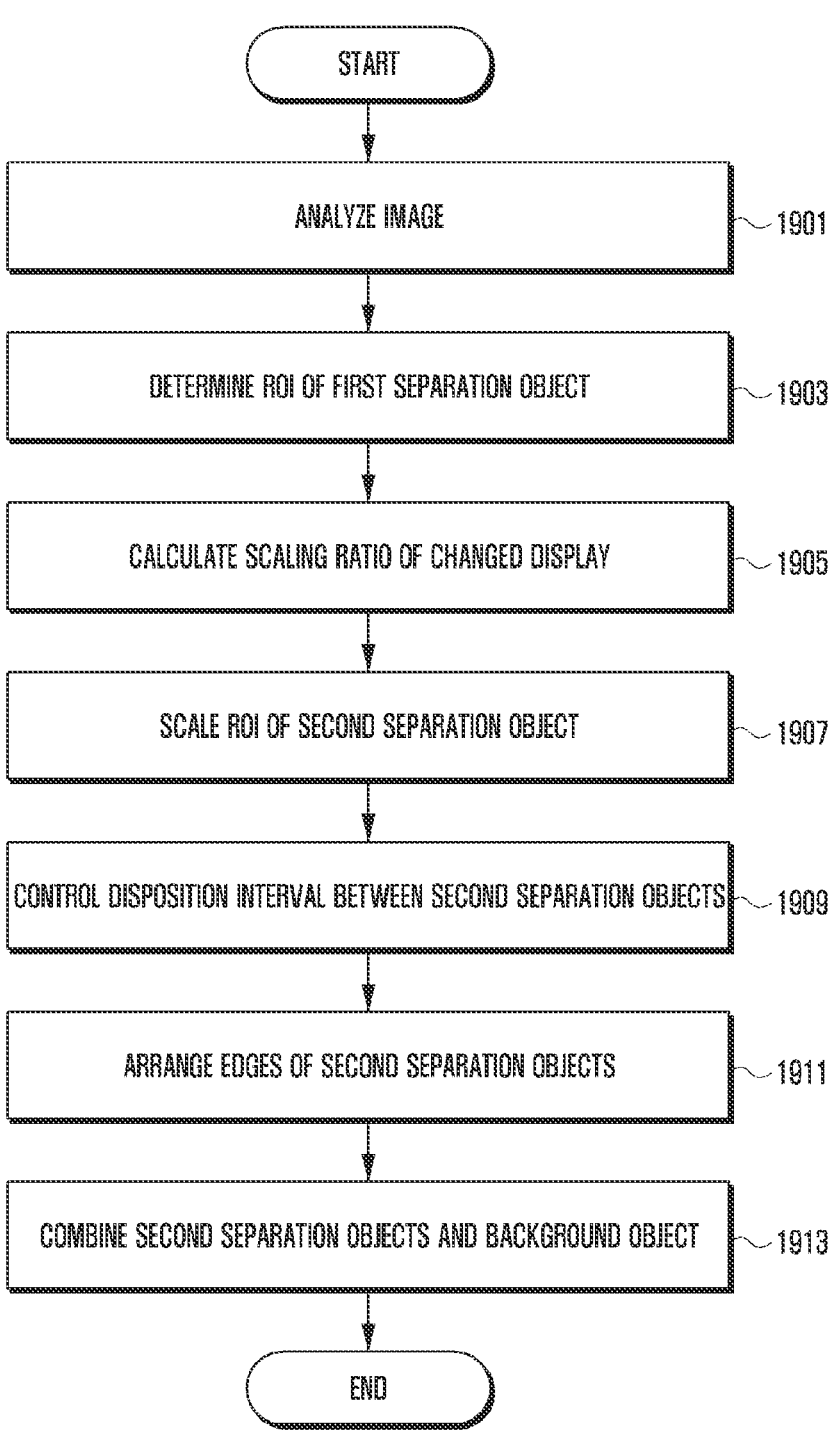
FIG. 19 is a flowchart illustrating an example method of operating the electronic device according to various embodiments.

FIG. 19 is a flowchart illustrating an example method of operating the electronic device according to various embodiments.

FIGS. 20A, 20B, 20C, 20D, 20E, 20F, 20G, and 20H are diagrams illustrating examples in which the electronic device supports image editing according to various embodiments.

According to an embodiment, FIG. 19 illustrates an example of a method by which the electronic device 101 separates a main object from background objects in the image and edits the image in accordance with the display size (for example, the display ratio). According to an embodiment, FIGS. 20A, 20B, 20C, 20D, 20E, 20F, 20G, and 20H illustrate examples of a screen related to an operation of supporting image editing in accordance with the display size of the electronic device 101.

A method by which an electronic device (for example, the electronic device 101 of FIG. 1 or 2) according to an embodiment of the disclosure may be performed according to, for example, a flowchart illustrated in FIG. 19. The flowchart illustrated in FIG. 19 is merely an example according to an embodiment of the operation of the electronic device 101, and the order of at least some operations may be changed or performed in parallel or performed as independent operations, or at least some other operations may be performed to compensate for at least some operations. According to an embodiment of the disclosure, operation 901 to operation 913 may be performed by at least one processor (for example, the processor 120 of FIG. 1 or 2) of the electronic device 101.

As illustrated in FIG. 19, an operation method performed by the electronic device 101 according to an embodiment may include operation 1901 of analyzing an image, operation 1903 of determining a region of interest (ROI) of a first separation object, operation 1905 of calculating a scaling ratio of the display to be changed, operation 1907 of scaling the an ROI of a second separation object, operation 1909 of controlling a disposition interval between second separation objects, operation 1911 of arranging an edge of the second separation object, and operation 1913 of combining the second separation object and background objects.

Referring to FIG. 19, in operation 1901, the processor 120 of the electronic device 101 may perform an operation of analyzing the image.

Figure 20A:
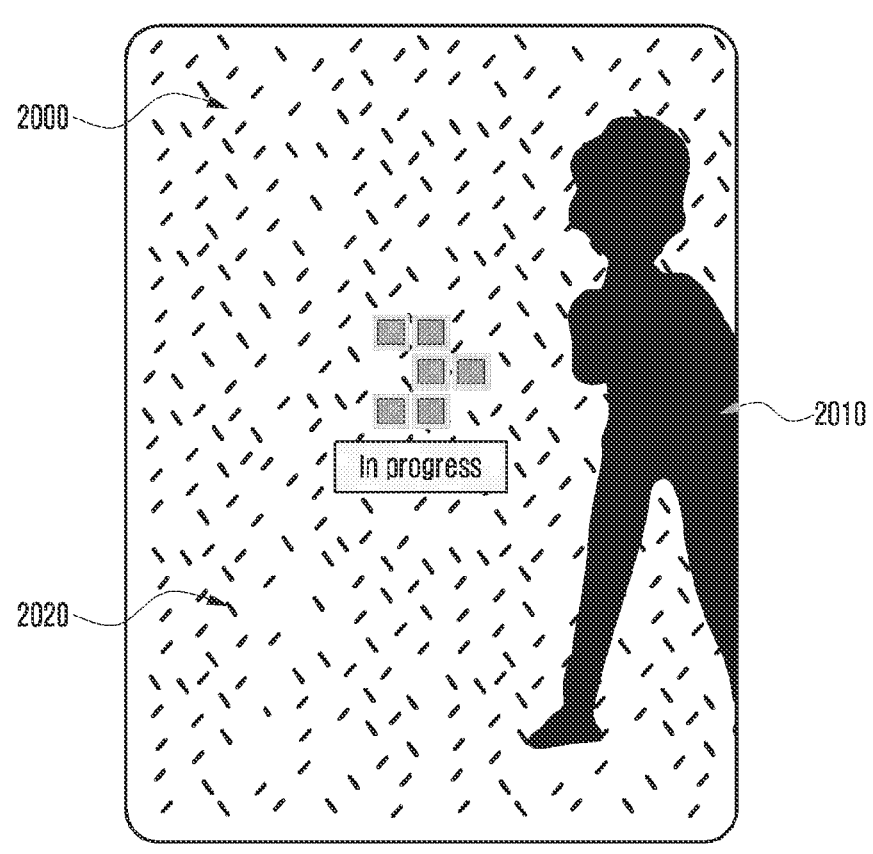
FIGS. 20A, 20B, 20C, 20D, 20E, 20F, 20G, and 20H are diagrams illustrating examples in which the electronic device supports image editing according to various embodiments.
Figure 20A:
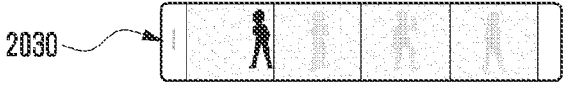

According to an embodiment, as illustrated in FIG. 20A, an image 2000 may indicate a moving image (for example, a GIF image) in which a main object 2010 and a background image 2020 are distinguished. According to an embodiment, when providing the image 2000, for the GIF image, the processor 120 may provide a sub image 2030 (for example, a scene frame) related to the corresponding GIF image through a predetermined area of the display. According to an embodiment, the sub image 2030 may indicate each scene frame included in the GIF image. According to an embodiment, when executing image editing, the electronic device 101 may provide a progress object (for example, text and/or a moving icon) indicating the state in which image editing is being progressed on the screen.

In operation 1903, the processor 120 may perform an operation of determining the ROI of the first separation object.

Figure 20B:
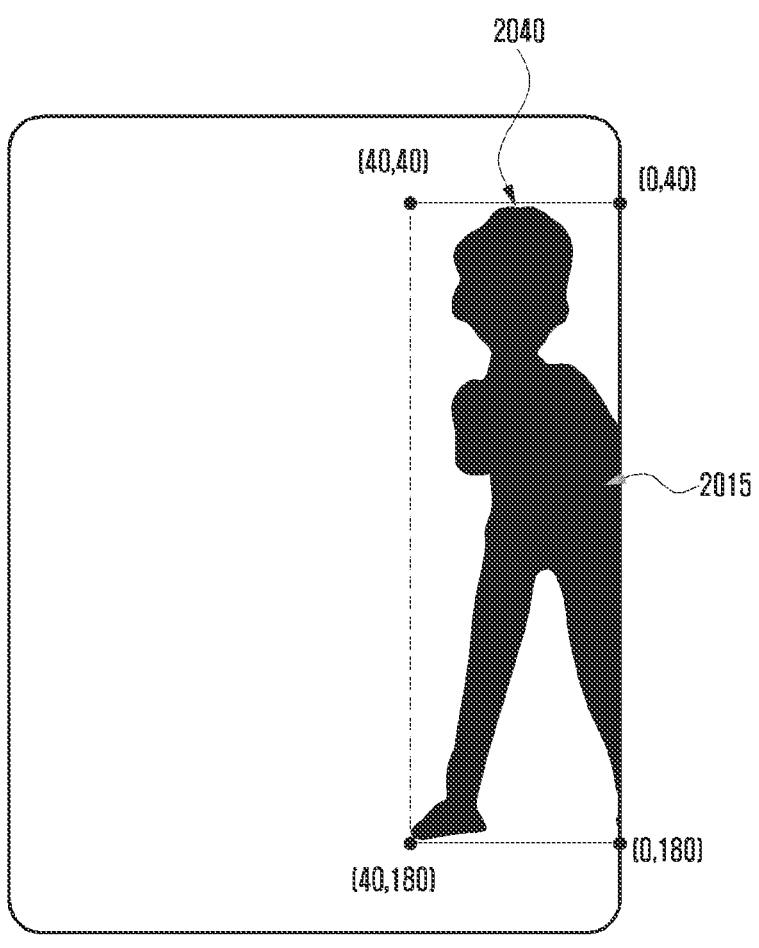

According to an embodiment, as illustrated in FIG. 20B, the processor 120 may identify a main object 2010 (for example, a person object), based on the sub image (for example, the scene frame) of the image 2000 (for example, the GIF image). According to an embodiment, the processor 120 may select a first separation object 2015 (for example, a representative scene) for reference of main objects for scenes among the main objects 2010 in various scenes. According to an embodiment, the ROI 2040 may be determined on the first separation object 2015. For example, the processor 120 may determine areas of (x, y) coordinates of approximately (40, 40), (0, 40), (0,180), and (40, 180), based on the first separation object 2015, as the ROI 2040.

In operation 1905, the processor 120 may perform an operation of calculating a scaling ratio of the display to be changed.

Figure 20C:
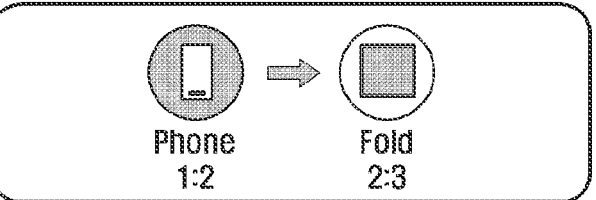

According to an embodiment, as illustrated in FIG. 20C, the processor 120 may calculate the scaling ratio of the display, based on the display (for example, the display ratio) in which the image is configured. For example, the processor 120 may determine the scaling ratio of the display in accordance with a ratio of "2:3" of the display (a change from a ratio of 1:2 of a first terminal to a ratio of 4:3 of a second terminal) in which the image is configured. For example, the processor 120 may determine the scaling ratio of the display in accordance with a ratio of "4:3" of the display (a change from a ratio of 18:9 of a third terminal to a ratio of 4:3 of a fourth terminal) in which the image is configured.

In operation 1907, the processor 120 may perform an operation of scaling the ROI of the second separation object.

Figure 20D:
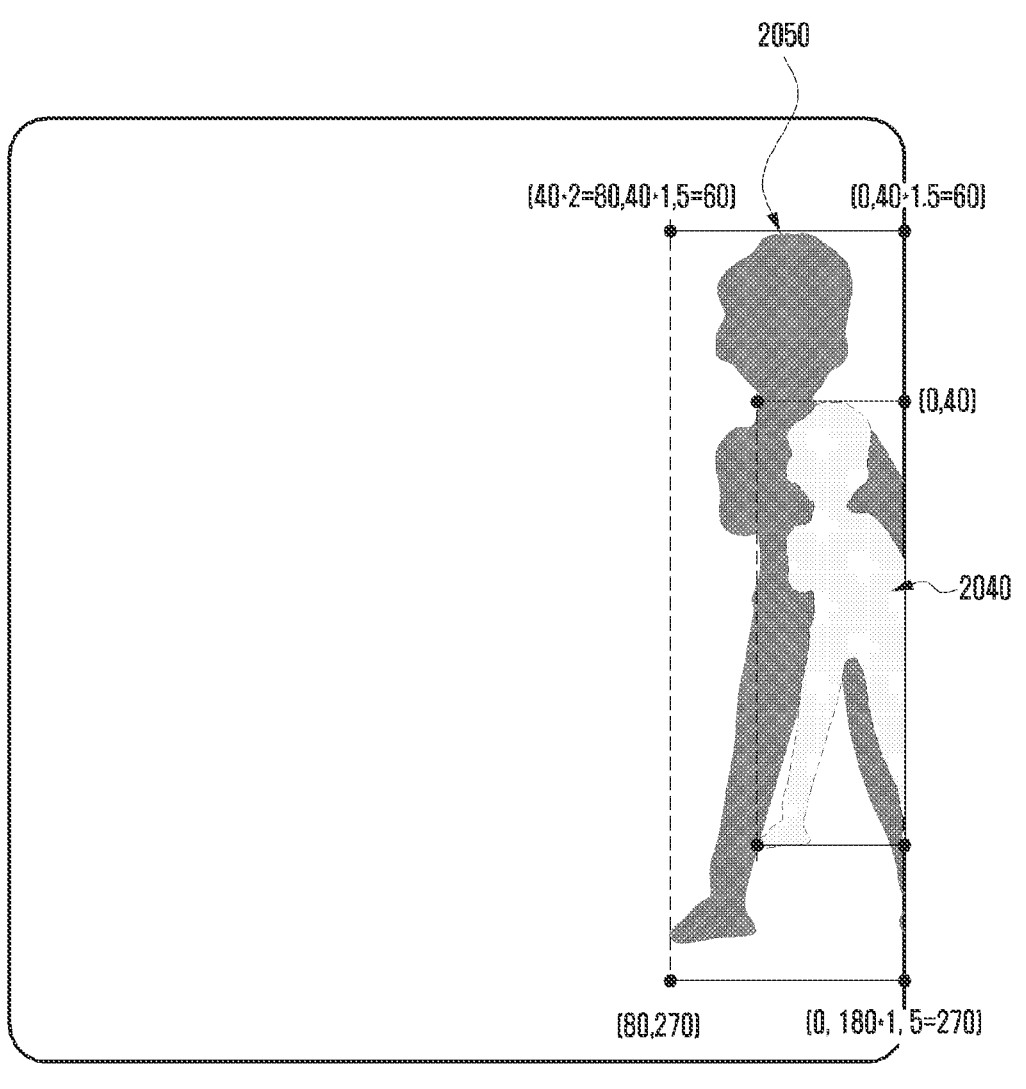

According to an embodiment, as illustrated in FIG. 20D, the processor 120 may scale the ROI 2040 of the first separation object 2015 according to the calculated scaling ratio. For example, the processor 120 may scale (for example, upscale) the ROI 2040 of the first separation object 2015 to an ROI 2050 for the second separation object.

In operation 1909, the processor 120 may perform an operation of controlling a disposition interval between second separation objects.

Figure 20E:
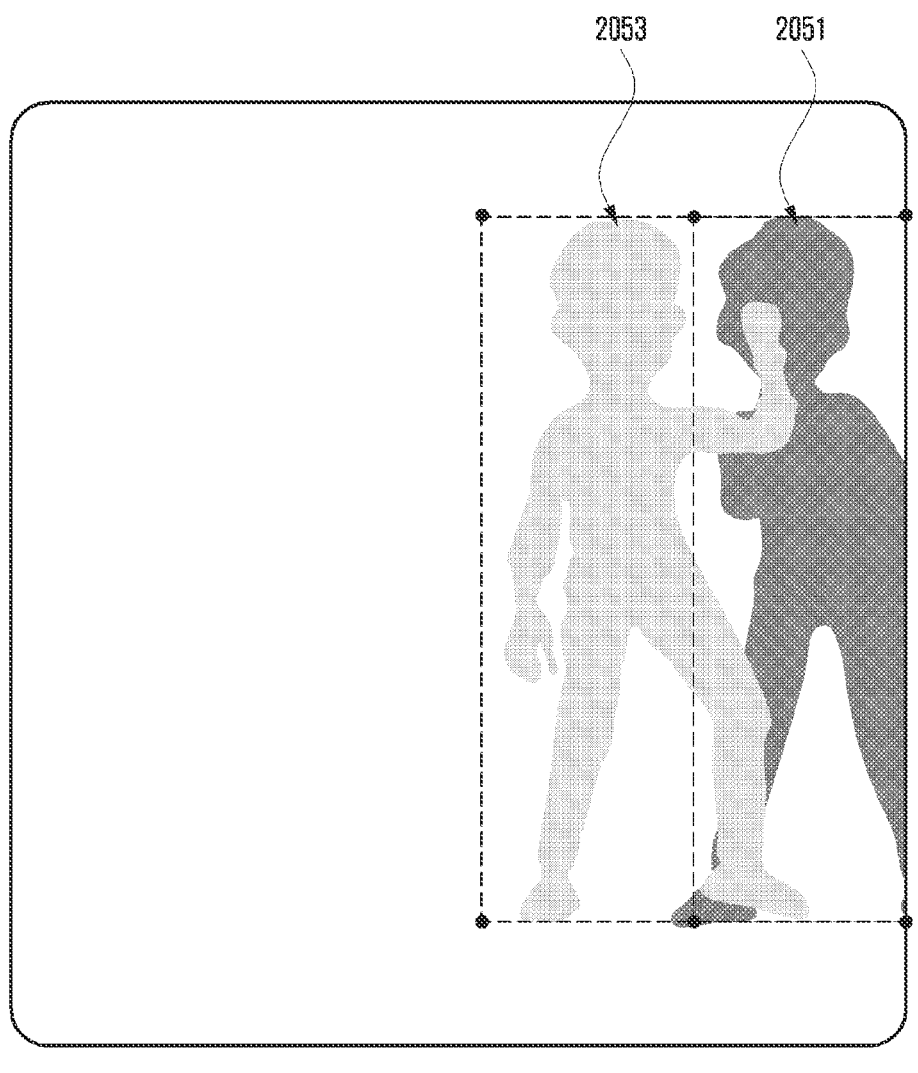

According to an embodiment, as illustrated in FIG. 20E, the processor 120 may control the disposition interval between second separation objects scaled according to the scaling ratio. According to an embodiment, the processor 120 may determine a disposition interval (for example, an overlapping interval) between separation objects 2051 and 2053 for respective scenes corresponding to the main objects 2010 in various scenes.

In operation 1911, the processor 120 may perform an operation of arranging the edge of the second separation object.

Figure 20F:
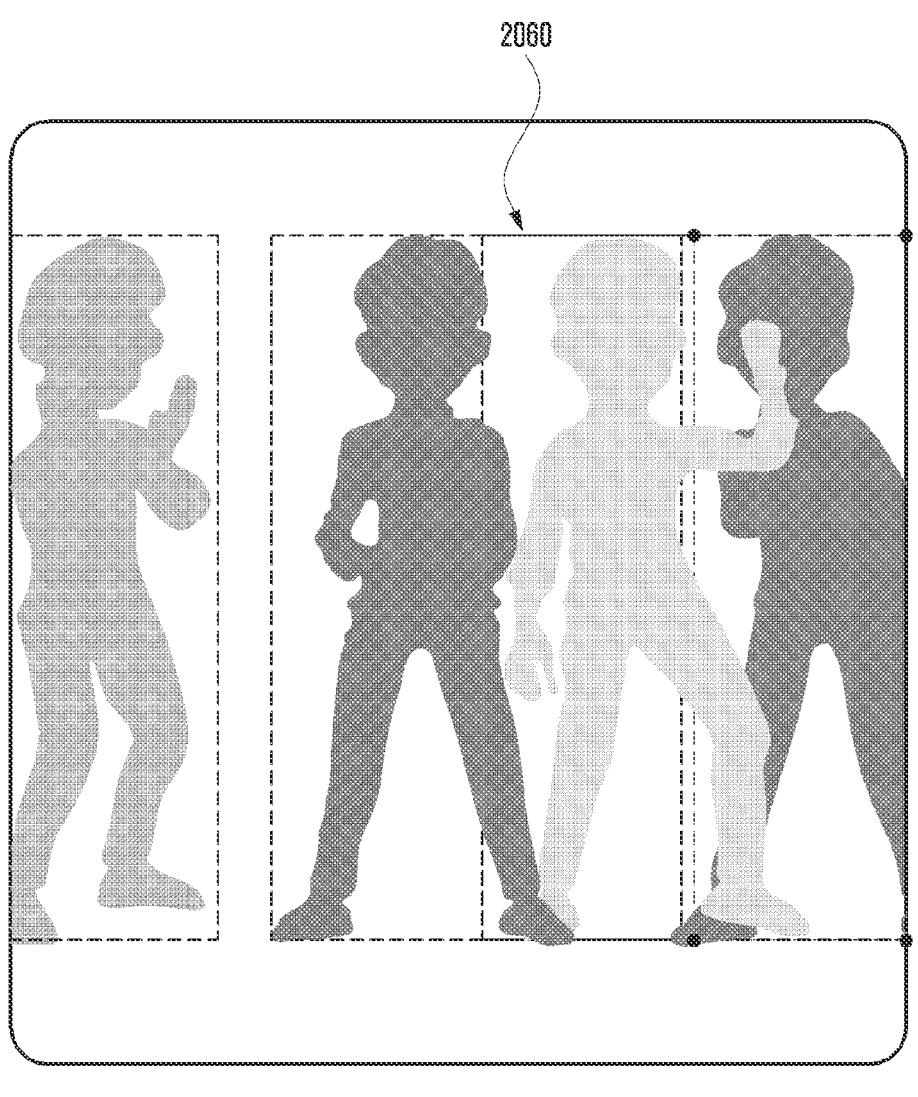

According to an embodiment, as illustrated in FIG. 20F, the processor 120 may perform edge alignment, based on the second separation object 2060. For example, the processor 120 may determine a disposition interval between a plurality of main objects 2060 (for example, the second separation objects) for various scenes and perform edge alignment to match edges (for example, heights) of the respective objects.

In operation 1913, the processor 120 may perform an operation of combining the second separation objects and background objects.

Figure 20G:
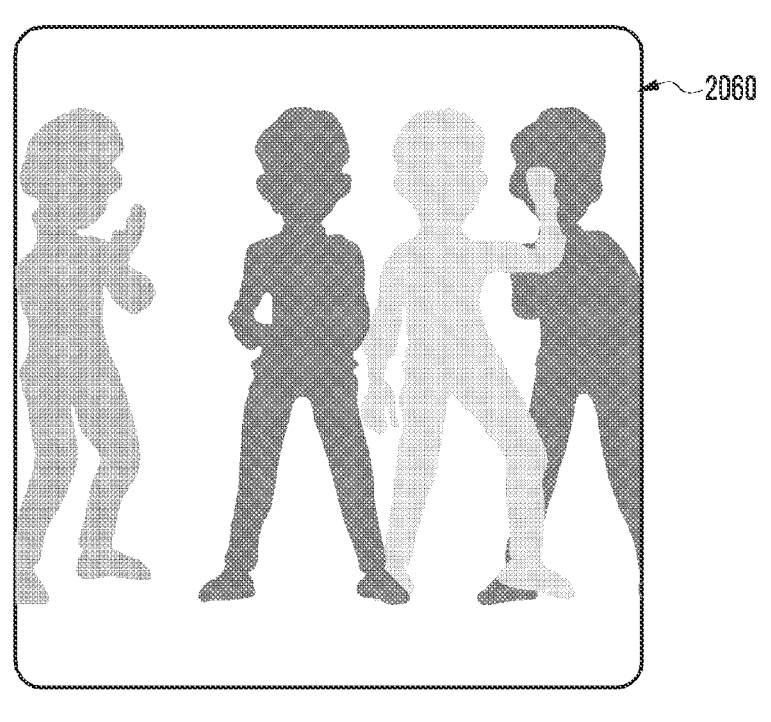
Figure 20G:
Figure 20G:
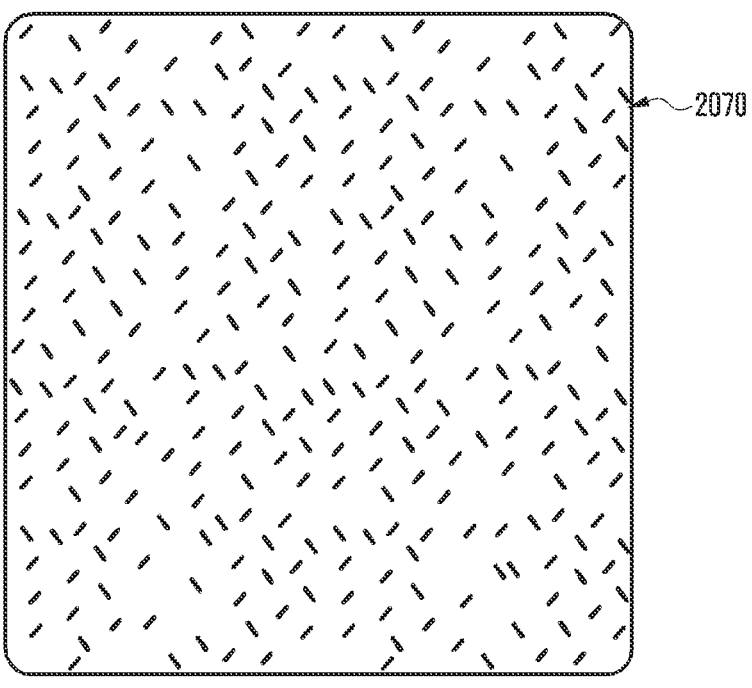

According to an embodiment, as illustrated in FIG. 20G, the processor 120 may combine the second separation objects 2060 and background objects 2070 edited (for example, outpainted or upscaled) according to the scaling ratio of the display. According to an embodiment, the processor 120 may perform an operation of combining the second separation objects 2060 edited based on the main object and the edited background objects 2070. According to an embodiment, the processor 120 may perform an operation of editing the image, based on image separation and combining back the edited objects. For example, the processor 120 may separate main objects and background objects in the image, independently edit the objects, and combine back the edited main objects (for example, 2060) and the edited background objects (for example, 2070).

Figure 20H:
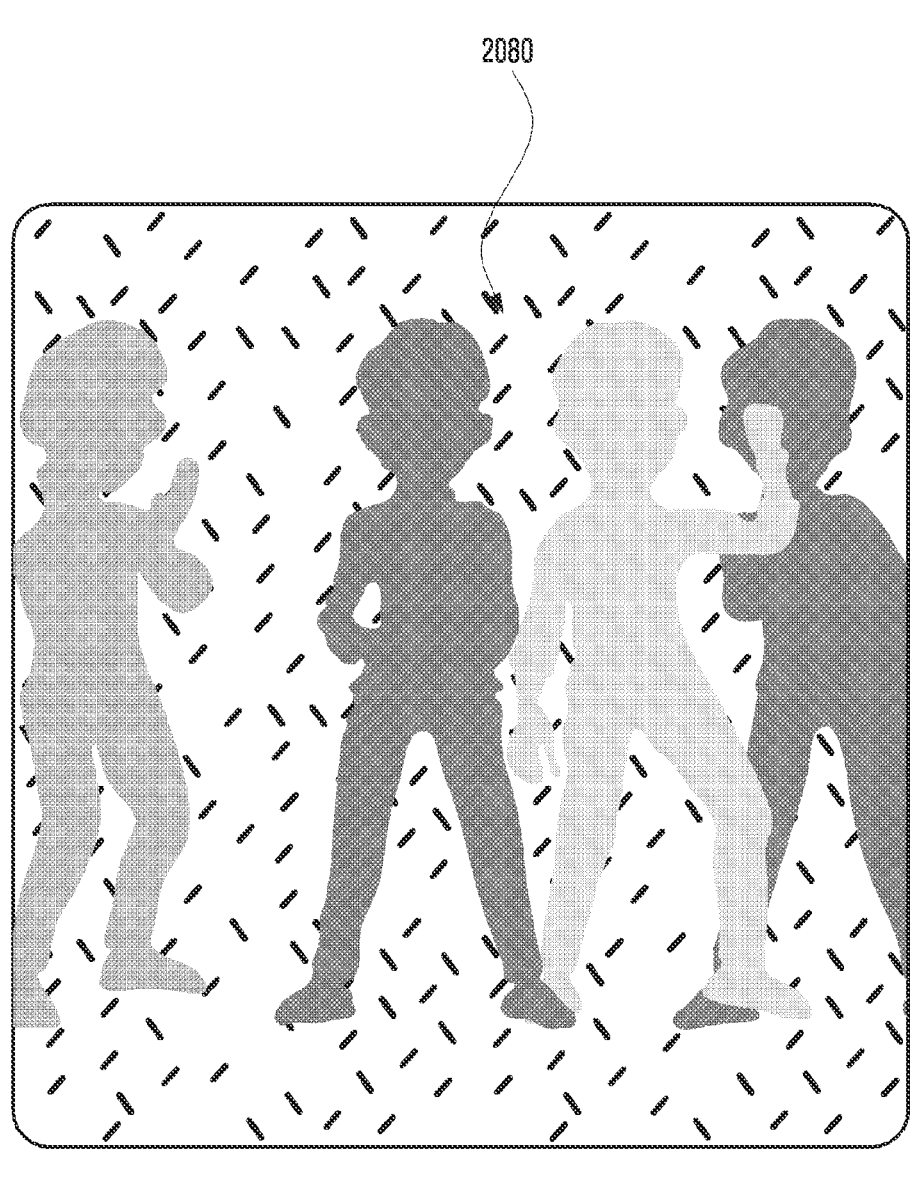

According to an embodiment, as illustrated in FIG. 20H, the processor 120 may provide an edited image 2080. According to an embodiment, the processor 120 may store the new image 2080 (for example, the image edited in accordance with the display size) obtained by combining the edited main objects and the edited background objects in the memory 130, display the image through the display, or share the image with an external device.

According to an embodiment of the disclosure, the electronic device 101 may separate main objects from background objects in the given image (for example, the original image), edit (or modify) the main objects, based on a display size of a display to display the image, and edit background objects except for the main objects, based on the display size of the display to display the image. According to an embodiment, the electronic device 101 may generate a new image optimized for the display size by combining the edited main objects and the edited background objects. For example, the electronic device 101 may optimize (for example, resize and dispose) the image for the display size of the display and display the optimized image. According to an embodiment, the electronic device 101 may reduce a capacity of the image and provide the image while improving the quality of the image (for example, calibrating a resolution and/or calibrating the quality) for the edited main objects and background objects. According to an embodiment, the electronic device 101 may reduce the capacity of the image through encoding using a predetermined encoding technology (for example, webp encoding). For example, when the quality of the image is improved (for example, the resolution is calibrated and/or the quality is calibrated) in accordance with the display size, the capacity of the image may increase but the increasing capacity may be improved through a high compression rate based on the predetermined encoding technology.

According to an embodiment, the electronic device 101 may separate objects in the image rather than simply resizing or calibrating the image, analyze sizes of the objects, locations, and/or whether there is a background, based on the separated objects, and perform rearrangement in accordance with a display size of a display to display the image, based on the analysis result.

A method of operating the electronic device according to an example embodiment of the disclosure may include: separating main objects from background objects in a given image; determining a display size of a specified display to display the image; editing (or modifying) each of the main object and the background object in accordance with the display size; combining the edited main object and the edited background object and generating an image edited in accordance with the display size of the specified display; and displaying the edited image through the predetermined display.

A method of operating the electronic device according to an example embodiment of the disclosure may include: displaying an image on a first display; separating the image into a main object and a background object; determining a second display to display an edited image; editing each of the main object and the background object based on a display size of the second display; generating the edited image by combining the edited main object and the edited background object; and displaying the edited image through the second display.

According to an example embodiment, the method may include improving a quality of the edited image, based on execution of a specified function for improving the quality of the image based on the edited image being generated.

According to an example embodiment, the method may include displaying an image designated on the display. According to an example embodiment, the method may include detecting an input for configuring wallpaper based on the specified image. The method may include determining a display size of the specified display in which the wallpaper is to be configured. The method may include editing the specified image based on the display size. The method may include configuring the edited image as the wallpaper of the specified display.

According to an example embodiment, the display may be configured to display the specified image and the specified display may have different displays having an equal display size or different display sizes.

According to an example embodiment, the determining the display size may include determining a display size of a selected display, based on an input selecting a display on which to display an image.

According to an example embodiment, the method may include: analyzing entire image frames of the image, determining the main object, based on the entire image frames, identifying remaining objects other than the main object as background objects in the image, and separating the main object from the background objects as independent objects in the image.

The electronic device according to various embodiments may be one of various types of electronic devices. The electronic devices may include, for example, a portable communication device (e.g., a smartphone), a computer device, a portable multimedia device, a portable medical device, a camera, a wearable device, a home appliance, or the like. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,""at least one of A and B,""at least one of A or B,""A, B, or C,""at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with,""coupled to,""connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic,""logic block,""part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Various embodiments of the disclosure illustrated in the disclosure and drawings present various examples to easily describe the technical content of the disclosure and aid in understanding of the disclosure but do not limit the scope of the disclosure. Accordingly, the scope of the disclosure should be understood as including all modifications or modified forms derived based on the technical idea of the disclosure, including the appended claims and their equivalents. It will also be understood that any of the embodiment(s) described herein may be used in conjunction with any other embodiment(s) described herein.

What is claimed is:

1. An electronic device comprising:

a first display configured to operate in a first state of the electronic device;

a second display configured to operate in a second state of the electronic device;

at least one processor comprising processing circuitry; and memory storing instructions that, when executed by the at least one processor, individually and/or collectively, cause the electronic device to:

display an image on the first display, separate the image into a first object and a second object, identify a display size of the second display, edit each of the first object and the second object based on the display size of the second display, determine whether the first object is entirely included in the image, in response to the first object being entirely included in the image, dispose the first object to be displayed at a center of the second display based on the display size of the second display, in response to the first object not being entirely included in the image, dispose the first object to be aligned with a cross section with which the first object is in contact, generate an edited image by combining the edited first object and the edited second object, and store the edited image as an image to be displayed on the second display.

2. The electronic device of claim 1, wherein the instructions, when executed by the at least one processor, individually and/or collectively, cause the electronic device to improve a quality of the edited image, based on execution of a specified function for improving the quality of the edited image when the edited image is generated.

3. The electronic device of claim 1, wherein the instructions, when executed by the at least one processor, individually and/or collectively, cause the electronic device to:

detect an input for configuring a wallpaper based on the image displayed on the first display, determine the display size of the second display in which the wallpaper is to be display, resize the edited image based on the display size of the second display, and configure the resized image as the wallpaper of the second display.

4. The electronic device of claim 1, wherein the instructions, when executed by the at least one processor, individually and/or collectively, cause the electronic device to determine the display size of the second display, based on an input of selecting the second display.

5. The electronic device of claim 1, wherein the instructions, when executed by the at least one processor, individually and/or collectively, cause the electronic device to:

analyze entire image frames of the image, and determine the first object, based on the entire image frames.

6. The electronic device of claim 5, wherein the instructions, when executed by the at least one processor, individually and/or collectively, cause the electronic device to:

based on the first object being determined, identify remaining objects other than the first object as second objects in the image, and separate the first object and second objects as independent objects in the image.

7. The electronic device of claim 6, wherein the instructions, when executed by the at least one processor, individually and/or collectively, cause the electronic device to:

edit the image into the first object and the second objects independently, wherein editing the first object includes first adjusting of the first object based on the display size of the second display, and wherein editing the second objects includes second adjusting of the second objects based on the display size of the second display.

8. The electronic device of claim 7, wherein the instructions, when executed by the at least one processor, individually and/or collectively, cause the electronic device to:

perform editing of resizing the first object and/or controlling a location of the first object so that the first object is displayed within the second display, and perform editing of drawing or cropping the second objects based on the first object.

9. The electronic device of claim 1, wherein the instructions, when executed by the at least one processor, individually and/or collectively, cause the electronic device to:

determine whether the first object is an animation object, in response to the first object being the animation object, determine whether the second object includes a specified condition, the specified condition comprising a condition in which the second object has a feature point including a color and/or pattern, in response to the second object not including the specified condition, determine whether the second object is animated with the first object, in response to the second object not being animated with the first object, determine that there is no second object and designate a location of the first object, and in response to the second object being animated with the first object, fill the edited image based on the display size of the second display through an outpainting technology.

10. The electronic device of claim 9, wherein the instructions, when executed by the at least one processor, individually and/or collectively, cause the electronic device to:

in response to the second object including the specified condition, determine whether the first object is entirely included in the image, in response to the first object being entirely included in the image, dispose the first object at a center of the edited image based on the display size of the second display and control a color and a pattern of the second object based on the display size of the second display in areas other than the first object, and in response to the first object not being entirely included in the image, dispose the first object to be aligned with a cross section with which the first object is in contact and control the color and the pattern of the second object based on the display size of the second display in the areas other than the first object.

11. A method of operating an electronic device, the method comprising:

displaying an image on a first display configured to operate in a first state of the electronic device;

separating the image into a first object and a second object;

identifying a display size of a second display configured to operate in a second state of the electronic device;

editing each of the first object and the second object based on the display size of the second display;

determining whether the first object is entirely included in the image, in response to the first object being entirely included in the image, disposing the first object to be displayed at a center of the second display based on the display size of the second display, in response to the first object not being entirely included in the image, disposing the first object to be aligned with a cross section with which the first object is in contact, generating an edited image by combining the edited first object and the edited second object; and storing the edited image as an image to be displayed on the second display.

12. The method of claim 11, comprising:

detecting an input for configuring a wallpaper based on the image displayed on the first display, determining the display size of the second display in which the wallpaper is to be displayed, resizing the edited image based on the display size of the second display, and configuring the resized image as the wallpaper of the second display.

13. The method of claim 11, comprising:

analyzing entire image frames of the image;

determining the first object, based on the entire image frames;

identifying remaining objects other than the first object as second objects in the image; and separating the first object from the second objects as independent objects in the image.

14. A non-transitory computer-readable recording medium storing a program which, when executed, causes an electronic device to perform operations comprising:

displaying an image on a first display configured to operate in a first state of the electronic device, separating the image into a first object and a second object, identifying a display size of a second display configured to operate in a second state of the electronic device, editing each of the first object and the second object based on the display size of the second display, determining whether the first object is entirely included in the image, in response to the first object being entirely included in the image, disposing the first object to be displayed at a center of the second display based on the display size of the second display, in response to the first object not being entirely included in the image, disposing the first object to be aligned with a cross section with which the first object is in contact, generating an edited image by combining the edited first object and the edited second object, and storing the edited image as an image to be displayed on the second display.

* * * * *